US007895080B2

(12) United States Patent
Haynes et al.

(10) Patent No.: US 7,895,080 B2
(45) Date of Patent: Feb. 22, 2011

(54) APPARATUS AND METHOD FOR FACILITATING THE SELECTION OF PRODUCTS BY BUYERS AND THE PURCHASE OF THE SELECTED PRODUCTS FROM A SUPPLIER

(75) Inventors: Leonard Steven Haynes, Dallas, TX (US); Kevin Frederick Lippincott, Dallas, TX (US); William Craig Dunlap, Dallas, TX (US)

(73) Assignee: Omnicom Holdings Inc., San Francisco, CA (US)

( * ) Notice: Subject to any disclaimer, the term of this patent is extended or adjusted under 35 U.S.C. 154(b) by 213 days.

(21) Appl. No.: 11/437,039

(22) Filed: May 19, 2006

(65) Prior Publication Data

US 2006/0218052 A1 Sep. 28, 2006

Related U.S. Application Data

(63) Continuation of application No. 10/337,167, filed on Jan. 6, 2003, now abandoned.

(60) Provisional application No. 60/427,660, filed on Nov. 19, 2002.

(51) Int. Cl.
*G06Q 30/00* (2006.01)
(52) U.S. Cl. .......................... 705/26; 705/27
(58) Field of Classification Search ................ 705/26, 705/28, 27
See application file for complete search history.

(56) References Cited

U.S. PATENT DOCUMENTS

| 4,992,940 | A | * | 2/1991 | Dworkin | ....................... 705/26 |
| 6,023,683 | A | | 2/2000 | Johnson et al. | |
| 6,128,600 | A | * | 10/2000 | Imamura et al. | .............. 705/27 |
| 6,154,738 | A | | 11/2000 | Call | |
| 6,324,522 | B2 | | 11/2001 | Peterson et al. | |
| 6,535,880 | B1 | | 3/2003 | Musgrove et al. | |
| 6,578,012 | B1 | | 6/2003 | Storey | |
| 6,618,705 | B1 | | 9/2003 | Wang et al. | |
| 6,631,356 | B1 | | 10/2003 | Van Horn et al. | |
| 6,679,421 | B2 | | 1/2004 | Shin et al. | |

(Continued)

FOREIGN PATENT DOCUMENTS

EP   00311326   6/2001

(Continued)

OTHER PUBLICATIONS

U.S. Appl. No. 09/815,451, Burton, et al.

(Continued)

*Primary Examiner*—Vanel Frenel
(74) *Attorney, Agent, or Firm*—Cowan, Liebowitz & Latman, P.C.; Mark Montague, Esq.

(57) ABSTRACT

A method is disclosed for managing the sale of a plurality of items from a plurality of corresponding suppliers to at least one buyer, wherein the one buyer determines a description of the item to be purchased. The method enables each of the plurality of suppliers to store at least one catalogue of its items in a database and responding to a search request of the one buyer to identify any item in the catalogues stored in the database with a description that matches the item description of the buyer.

7 Claims, 81 Drawing Sheets

U.S. PATENT DOCUMENTS

| | | | |
|---|---|---|---|
| 6,714,933 B2 | 3/2004 | Musgrove et al. | |
| 6,850,900 B1 * | 2/2005 | Hare et al. | 705/26 |
| 6,871,198 B2 | 3/2005 | Neal et al. | |
| 7,139,724 B1 * | 11/2006 | Dworkin | 705/14 |
| 2004/0236639 A1 * | 11/2004 | Candadai et al. | 705/27 |

FOREIGN PATENT DOCUMENTS

| | | |
|---|---|---|
| EP | 01123601 | 4/2002 |
| EP | 01932916 | 3/2003 |
| EP | 02255930 | 3/2003 |
| EP | 02255696 | 4/2003 |
| EP | 02256822.4 | 7/2003 |
| WO | PCT/US99/26868 | 11/1999 |
| WO | PCT/US99/26872 | 11/1999 |
| WO | PCT/US00/11667 | 4/2000 |
| WO | PCT/US00/17860 | 6/2000 |
| WO | PCT/US00/20080 | 7/2000 |
| WO | PCT/US00/31021 | 11/2000 |
| WO | PCT/US01/14246 | 5/2001 |
| WO | PCT/US01/19695 | 6/2001 |
| WO | PCT/IB/00201843 | 5/2002 |
| WO | PCT/ZA/00200180 | 11/2002 |
| WO | PCT/GB/00301075 | 3/2003 |
| WO | PCT/US03/00310706 | 4/2003 |

OTHER PUBLICATIONS

U.S. Appl. No. 09/925,147, Bible, et al.
U.S. Appl. No. 09/993,285, Johnston.
U.S. Appl. No. 09/810,210, Yang.
U.S. Appl. No. 10/076,189, Stutts, et al.
U.S. Appl. No. 09/791,712, Yang.
U.S. Appl. No. 09/795,598, Morea, et al.
U.S. Appl. No. 09/826,744, Tam, et al.
U.S. Appl. No. 10/119,311, Musgrove, et al.
U.S. Appl. No. 10/222,436, Wray.
U.S. Appl. No. 09/920,592, Bodmer, et al.
U.S. Appl. No. 10/227,987, Fisher.
U.S. Appl. No. 10/289,538, Pal.
U.S. Appl. No. 10/370,237, Mesaros.
U.S. Appl. No. 10/047,804, Cales, et al.
U.S. Appl. No. 10/059,283, McGee.
U.S. Appl. No. 10/185,134, Roberts.
U.S. Appl. No. 10/226,068, Katz.
U.S. Appl. No. 10/302,738, Engberg.
U.S. Appl. No. 10/182,755, Russell, et al.
U.S. Appl. No. 10/461,556, Nguyen.
U.S. Appl. No. 10/188,353, Baker, et al.
U.S. Appl. No. 10/441,844, Stolfo, et al.
U.S. Appl. No. 10/217,871, Ling.
U.S. Appl. No. 10/002,841, Gravett, et al.
U.S. Appl. No. 10/646,676, Prescott.
U.S. Appl. No. 10/228,506, Schwartzman.
U.S. Appl. No. 10/267,475, Agrawal, et al.
U.S. Appl. No. 09/747,454, Shimogori.
U.S. Appl. No. 10/373,881, Musgrove, et al.
U.S. Appl. No. 10/416,142, Strydom, et al.
U.S. Appl. No. 10/416,095, Malcolm, et al.

* cited by examiner

244e'

Specify Quantities and Continue

504+   $2.59

Supplier Information

TicToc Test    1999 Bryan Street Suite 1900    Courtney Williamson    E-mail Supplier
               Dallas TX 75201                  214.259.3107          Chat with Supplier about tic toc   help   faq   contact us   terms of service   privacy policy Tic Toc Marketplace ™
Registered Trade Mark of Tic Toc
© Tic Toc an Omnicom Group company, 2002 All rights reserved

FIG. 3H-2

FIG. 3V order history

| Order | Supplier | Status | Adjusted Total | Order Total | Date |
|---|---|---|---|---|---|
| 1978 | TicToc_Test | Completed | $462.00 | $482.00 | 11/26/2002 |
| 1924 | TicToc_Test | New Order | $23.00 | $29.00 | 11/8/2002 |
| 1964 | TicToc_Test | Pending Buyer Approval | $8,500.00 | $8,825.00 | 10/31/2002 |
| 1955 | TicToc_Test | Completed | $112,850.00 | $112,882.00 | 10/23/2002 |
| 1953 | TicToc_Test | Completed | $2,150.00 | $2,200.00 | 10/18/2002 |
| 1949 | TicToc_Test | Completed | $105,000.00 | $105,100.00 | 10/10/2002 |
| 1948 | TicToc_Test | Completed | $10,500.00 | $10,540.00 | 10/10/2002 |
| 1940 | TicToc_Test | Shipped | $1,900.00 | $1,900.00 | 9/19/2002 |
| 1935 | TicToc_Test | Completed | $19,000.00 | $19,000.00 | 9/18/2002 |
| 1883 | TicToc_Test | Completed | $950.00 | $1,000.00 | 8/22/2002 |
| 1881 | TicToc_Test | Completed | $2,150.00 | $2,220.00 | 8/20/2002 |
| 1879 | TicToc_Test | Completed | $3,800.00 | $3,900.00 | 8/19/2002 |
| 1878 | TicToc_Test | Completed | $2,925.00 | $3,075.00 | 8/19/2002 |
| 1875 | TicToc_Test | Completed | $1,900.00 | $1,950.00 | 8/15/2002 |
| 1873 | TicToc_Test | Completed | $3,800.00 | $3,855.00 | 8/14/2002 |
| 1869 | TicToc_Test | Shipped | $4,250.00 | $4,300.00 | 8/13/2002 |
| 1866 | TicToc_Test | Completed | $2,150.00 | $2,200.00 | 8/12/2002 |
| 1865 | TicToc_Test | Completed | $1,798.00 | $1,798.00 | 8/9/2002 |
| 1861 | TicToc_Test | Completed | $959.00 | $959.00 | 8/9/2002 |
| 1858 | TicToc_Test | Completed | $1,900.00 | $1,950.00 | 8/8/2002 |
| 1855 | TicToc_Test | Completed | $4,495.00 | $4,595.00 | 8/8/2002 |
| 1853 | TicToc_Test | Completed | $15,800.00 | $16,350.00 | 8/6/2002 |
| 1852 | TicToc_Test | Completed | $3,800.00 | $3,850.00 | 8/6/2002 |

FIG. 4C

| Order Number | Status | Buyer Company Name | Total | Date |
|---|---|---|---|---|
| 1978 | Completed | TicToc | $462.00 | 12/5/2002 |
| 1977 | New Order | TicToc | $736.77 | 12/12/2012 |
| 1976 | New Order | TicToc | $37.50 | 12/12/2012 |
| 1975 | New Order | TicToc | $37.50 | 12/12/2012 |
| 1974 | New Order | TicToc | $29.00 | |
| 1971 | New Order | TicToc | $1250.00 | |
| 1970 | Pending Buyer Approval | TicToc | $1109.00 | 11/15/2002 |
| 1969 | Canceled Order | TicToc | $1455.00 | 11/11/2002 |
| 1968 | New Order | TicToc | $600.00 | |
| 1964 | Pending Buyer Approval | TicToc | $8825.00 | 12/5/2002 |
| 1962 | Shipped | TicToc | $7116.25 | 11/4/2002 |
| 1960 | Pending Buyer Approval | TicToc | $4690.00 | 12/12/2012 |
| 1959 | Pending Buyer Approval | TicToc | $190.00 | 12/30/2002 |
| 1958 | Completed | TicToc | $22.00 | 12/21/2002 |
| 1957 | Work In Progress | TicToc | $1032.61 | 12/20/2002 |
| 1955 | Completed | TicToc | $112882.00 | 10/25/2003 |
| 1953 | Completed | TicToc | $2200.00 | 12/12/2002 |
| 1949 | Completed | TicToc | $105100.00 | 10/20/2002 |
| 1948 | Completed | TicToc | $10540.00 | 10/20/2002 |
| 1945 | Pending Buyer Approval | TicToc | $47.50 | 12/12/2012 |

List total: 245  Page: 1/13

FIG. 4D

Order Detail DEBUG d r v |TRUE:FALSE:

view printable version
▼ Order Information —— 401

| Field | ID | Value |
|---|---|---|
| Order is ready for buyer's approval | 401a | ☑ Yes |
| Order is being processed | 401b | ☒ Yes |
| Entire order has been shipped | 401c | ☒ Yes |
| Status | 401d | New Order |
| Order Number | 401e | 1978 |
| Buyer's Name | 401f | Travis Horton |
| Buyer's personal email | 401g | travish@tictocusa.com |
| Buyer's phone number | 401h | 214.259.3105 |
| Buyer's fax number | 401i | 214.259.3052 |
| Buyer's Organization Name | 401j | TicToc |
| Billing Address | 401k | Tic Toc |
| Buyer's Preferred Shipping Method | 401l | Airborne Express 10:30 Urgent A.M. |
| Buyer's Shipping Account Number | 401m | |
| Freight Forwarder | 401n | |
| Buyer's payment information | 401o | Purchase Order. Available once the buyer approves the order. |
| Buyer's purchasing guidelines | 401p | Browse to download purchasing guidelines. |
| Discount on order (%) | 401q | 0 |
| Discount: | 401r | 0.00 |
| Subtotal | 401s | 462.00 |
| Setup Charge (detailed below) | 401t | 20.00 |
| Setup Description | 401u | rush charge |
| Tax | 401w | 0.00 |

List of Orders DEBUG d r v (TRUE/FALSE)

Search by status: All Orders

| Order Number | Status | TicToc | Price | Date |
|---|---|---|---|---|
| 1978 | Pending Buyer Approval | TicToc | $482.00 | 12/5/2002 |
| 1977 | New Order | TicToc | $736.77 | 12/12/2012 |
| 1976 | New Order | TicToc | $37.50 | 12/12/2012 |
| 1975 | New Order | TicToc | $37.50 | 12/12/2012 |
| 1974 | New Order | TicToc | $29.00 | |
| 1971 | New Order | TicToc | $1250.00 | |
| 1970 | Pending Buyer Approval | TicToc | $1109.00 | 11/15/2002 |
| 1969 | Canceled Order | TicToc | $1455.00 | 11/11/2002 |
| 1968 | New Order | TicToc | $600.00 | |
| 1964 | Pending Buyer Approval | TicToc | $8825.00 | 12/5/2002 |
| 1962 | Shipped | TicToc | $7116.25 | 11/4/2002 |
| 1960 | Pending Buyer Approval | TicToc | $4690.00 | 12/12/2012 |
| 1959 | Pending Buyer Approval | TicToc | $190.00 | 12/30/2002 |
| 1958 | Completed | TicToc | $22.00 | 12/21/2002 |
| 1957 | Work In Progress | TicToc | $1032.61 | 12/20/2002 |
| 1955 | Completed | TicToc | $112882.00 | 10/25/2003 |
| 1953 | Completed | TicToc | $2200.00 | 12/12/2002 |
| 1949 | Completed | TicToc | $105100.00 | 10/20/2002 |
| 1948 | Completed | TicToc | $10540.00 | 10/20/2002 |
| 1945 | Pending Buyer Approval | TicToc | $47.50 | 12/12/2012 |

List total: 245

Page: 1 /13

Order Detail DEBUG d r v (TRUE/FALSE)

View printable version
▼ Order Information

460

| Field | ID | Value |
|---|---|---|
| Order is ready for buyer's approval | 461a | ☑ Yes |
| Order is being processed | 461b | ☑ Yes |
| Entire order has been shipped | 461c | ☐ Yes |
| Status | 461d | Buyer Approval |
| Order Number | 461e | 1978 |
| Buyer's Name | 461f | Travis Horton |
| Buyer's personal email | 461g | travish@tictocusa.com |
| Buyer's phone number | 461h | 214.259.3105 |
| Buyer's fax number | 461i | 214.259.3052 |
| Buyer's Organization Name | 461j | TicToc |
| Billing Address | 461k | Tic Toc |
| Buyer's Preferred Shipping Method | 461l | Airborne Express 10:30 Urgent A.M. |
| Buyer's Shipping Account Number | 461m | |
| Freight Forwarder | 461n | |
| Buyer's payment information | 461o | Purchase Order. Available once the buyer approves the order. |
| Buyer's purchasing guidelines | 461p | Browse to download purchasing guidelines. |
| Discount on order (%) | 461r | 0 |
| Discount | 461s | 0.00 |
| Subtotal | 461t | 462.00 |
| Setup Charge (detailed below) | 461u | 20.00 |
| Setup Description | 461v | rush charge |
| Tax | 461w | 0.00 |

FIG. 4H

List of Orders DEBUG d : v (TRUE/FALSE) — 471a

Search by status: [All Orders] 471b

470

| Order# | Status | | Price | Date |
|---|---|---|---|---|
| 472a | 472b | 472c | 472d | 472e |
| 1978 | Work in Progress | TicToc | $482.00 | 12/5/2002 |
| 1977 | New Order | TicToc | $736.77 | 12/12/2012 |
| 1976 | New Order | TicToc | $37.50 | 12/12/2012 |
| 1975 | New Order | TicToc | $29.00 | 12/12/2012 |
| 1974 | New Order | TicToc | $1250.00 | |
| 1971 | Pending Buyer Approval | TicToc | $1109.00 | 11/15/2002 |
| 1970 | Canceled Order | TicToc | $1455.00 | 11/11/2002 |
| 1969 | New Order | TicToc | $500.00 | |
| 1968 | Pending Buyer Approval | TicToc | $8825.00 | 12/5/2002 |
| 1964 | Shipped | TicToc | $7116.25 | 11/4/2002 |
| 1962 | Pending Buyer Approval | TicToc | $4690.00 | 12/12/2012 |
| 1960 | Pending Buyer Approval | TicToc | $190.00 | 12/30/2002 |
| 1959 | Completed | TicToc | $22.00 | 12/21/2002 |
| 1958 | Work in Progress | TicToc | $1032.61 | 12/20/2002 |
| 1957 | Completed | TicToc | $112882.00 | 10/25/2003 |
| 1955 | Completed | TicToc | $2200.00 | 12/12/2002 |
| 1953 | Completed | TicToc | $105100.00 | 10/20/2002 |
| 1949 | Completed | TicToc | $10540.00 | 10/20/2002 |
| 1948 | Pending Buyer Approval | TicToc | $47.50 | 12/12/2012 |
| 1945 | | | | |

List total: 245

Page: 1/13

FIG. 4I-1

Order Detail DEBUG d r v (TRUE/FALSE)

View printable version
- Order Information

| Field | Ref | Value |
|---|---|---|
| Order is ready for buyer's approval | 491a | ☑ Yes |
| Order is being processed | 491b | ☑ Yes |
| Entire order has been shipped | 491c | ☑ Yes |
| Status | 491d | Work In Progress |
| Order Number | 491e | 1978 |
| Buyer's Name | 491f | Travis Horton |
| Buyer's personal email | 491g | travish@tictocusa.com |
| Buyer's phone number | 491h | 214.259.3105 |
| Buyer's fax number | 491i | 214.259.3052 |
| Buyer's Organization Name | 491j | TicToc |
| Billing Address | 491k | Tic Toc |
| Buyer's Preferred Shipping Method | 491l | Airborne Express 10:30 Urgent A.M. |
| Buyer's Shipping Account Number | 491m | |
| Freight Forwarder | 491n | |
| Buyer's payment Information | 491o | Purchase Order. Available once the buyer approves the order. |
| Buyer's purchasing guidelines | 491p | Browse to download purchasing guidelines. |
| Discount on order (%) | 491r | 0 |
| Discount | 491s | 0.00 |
| Subtotal | 491t | 462.00 |
| Setup Charge (detailed below) | 491v | 20.00 |
| Setup Description | 491u | rush charge |
| Tax | 491w | 0.00 |

List of Orders DEBUG d : v (TRUE/FALSE)  — 500

Search by status: [All Orders] — 501a, 501b

| Order Number | Status | Organization Name | Total | Order Date |
|---|---|---|---|---|
| 1978 | Shipped | TicToc | $482.00 | 12/5/2002 |
| 1977 | New Order | TicToc | $736.77 | 12/12/2012 |
| 1976 | New Order | TicToc | $37.50 | 12/12/2012 |
| 1975 | New Order | TicToc | $37.50 | 12/12/2012 |
| 1974 | New Order | TicToc | $29.00 | |
| 1971 | New Order | TicToc | $1250.00 | |
| 1970 | Pending Buyer Approval | TicToc | $1109.00 | 11/15/2002 |
| 1969 | Canceled Order | TicToc | $1455.00 | 11/11/2002 |
| 1968 | New Order | TicToc | $600.00 | |
| 1964 | Pending Buyer Approval | TicToc | $8825.00 | 12/5/2002 |
| 1962 | Shipped | TicToc | $7116.25 | 11/4/2002 |
| 1960 | Pending Buyer Approval | TicToc | $4690.00 | 12/12/2012 |
| 1959 | Pending Buyer Approval | TicToc | $190.00 | 12/30/2002 |
| 1958 | Completed | TicToc | $22.00 | 12/21/2002 |
| 1957 | Work In Progress | TicToc | $1032.61 | 12/20/2002 |
| 1955 | Completed | TicToc | $112882.00 | 10/25/2003 |
| 1953 | Completed | TicToc | $2200.00 | 12/12/2002 |
| 1949 | Completed | TicToc | $105100.00 | 10/20/2002 |
| 1948 | Completed | TicToc | $10540.00 | 10/20/2002 |
| 1945 | Pending Buyer Approval | TicToc | $47.50 | 12/12/2012 |

502a, 502b, 502c, 502d, 502e

List total: 245

Page: 1/13 — 503 r:[0]0/0 s:7/0 a:41

FIG. 8D

Buyers Logo Upload Process

FIG. 10C

Advanced Search Process

FIG. 14C

Buyer Communications Process

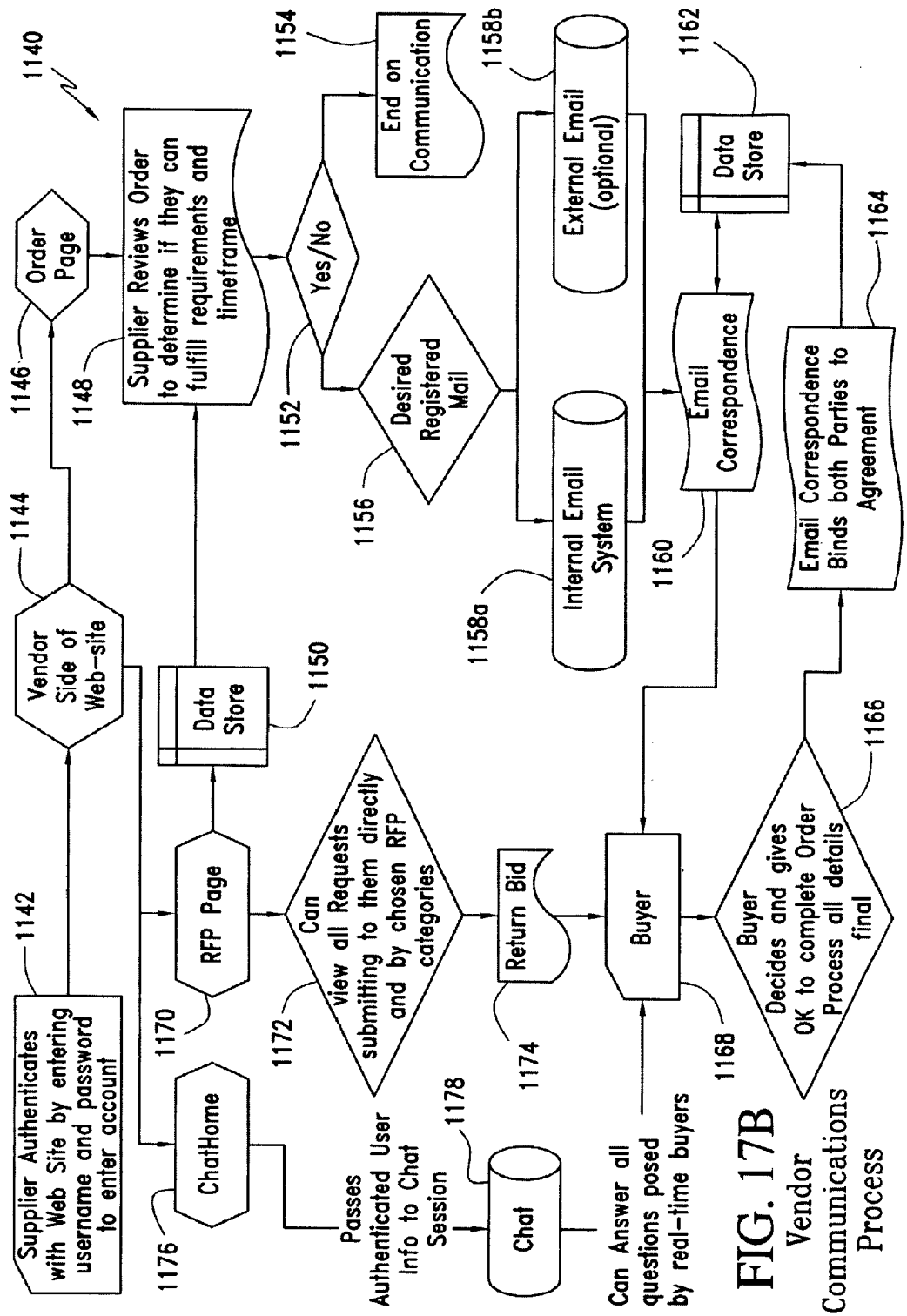
FIG. 17B Vendor Communications Process

Buyer Side: Adding Product to Basket

APPARATUS AND METHOD FOR FACILITATING THE SELECTION OF PRODUCTS BY BUYERS AND THE PURCHASE OF THE SELECTED PRODUCTS FROM A SUPPLIER

RELATED APPLICATION

This continuation application is related to and depends for priority from: 1) U.S. Non-Provisional application Ser. No. 10/337,167, filed Jan. 6, 2003 now abandoned in the names of Leonard Steven Haynes, Kevin Frederick Lippincott and William Craig Dunlap, entitled "APPARATUS AND METHOD FOR FACILITATING THE SELECTION OF PRODUCTS BY BUYERS AND THE PURCHASE OF THE SELECTED PRODUCTS FROM SUPPLIERS" and 2) U.S. Provisional Application No. 60/427,660, filed Nov. 19, 2002 in the names of Leonard Steven Haynes, Kevin Frederick Lippincott and William Craig Dunlap, entitled "APPARATUS AND METHOD FOR FACILITATING THE SELECTION OF PRODUCTS BY BUYERS AND THE PURCHASE OF THE SELECTED PRODUCTS FROM SUPPLIERS", and incorporated herein by reference.

FIELD OF THE INVENTION

This invention relates to systems and methods for conducting sales transactions involving the sale of items, e.g., products and/or services, involving a plurality of purchasers and a plurality of suppliers of the items. In an illustrative embodiment of this invention, the system and apparatus are implemented in a network or Internet environment. Such embodiments have been popularly referred to as E-commerce.

BACKGROUND OF THE INVENTION

The advent of the Internet has given rise to E-Commerce, whereby buyers and sellers may offer goods and/or services for sale, select the goods and/or services to be purchased and to consummate the sale by arranging for the payment of the services and/or goods. The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g. a HyperText Transfer Protocol ("HTTP") request). The request is forwarded to the web server that supports that web page. When the web server receives the request, it sends that web page to the client computer system. When the client computer system receives that web page, it typically displays the web page using a browser. A browser is a special-purpose application program that effects the requesting of web pages and the displaying of web pages.

Currently, web pages are typically composed using HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other web pages available on that server computer system or other server computer systems.

The World Wide Web or Internet is especially conducive to conducting commerce, commonly referred to as E-Commerce. Web Servers have been programmed to permit vendors to provide a wide array of products and services for sale over the Internet. A user, who is a potential purchaser, may browse one or more web sites, which provide lists of products or services for sale, much like a catalogue. A purchaser may preview these lists to select a desired product or services to be purchased. When the user has completed selecting the items to be purchased, the server computer system then prompts the user to enter information to complete the ordering of the selected items. This purchase generally deals with how and where the selected items may be delivered to the purchaser and how the purchaser will pay for the selected items.

E-Commerce has also been used to facilitate the distribution and purchase of promotional items such as clothing, writing utensils, and a variety of other goods and services. Typically, a marking such as a trademark, a logo or the like phrase may be added to a selected promotional product. For example, the buyer may select from a list or catalogue of products a particular product and then insert, superimpose or otherwise attach the selected marking to the product. One of the problems associated with the distribution and sale of promotional products and/or services is the difficulty in providing a representation of the promotional product with the selected marking superimposed thereon to the perspective buyer. Before the advent of E-Commerce, a promotional products distributor would physically superimpose the selected marking on to the selected product and forward that sample product to the perspective buyer, thus permitting the perspective buyer to preview the composite image before placing an order for a quantity of such customized products.

E-commerce has permitted a service to be marketed over the Internet that involves the superimposing of one image on another to permit the prospective purchaser to preview the composite image before buying. TOMAX USA.com (www-.tomaxusa.com/e-sample/) is an example of such a service, where a second image of a logo of a business, a company or an athletic team for example may by superimposed on a first image in the form of promotion merchandize such as a watch, clock, calculators or other electronics. Initially, a second image logo is forwarded to TOMAX. The logo may be in the form of a photograph, e.g., a black and white color separated artwork of the logo, and, in that form, would be forwarded by mail to TOMAX. Alternatively, the logo may be scanned and converted to a digital signal, before being formatted by Adobe Illustrator into an EPS format or by Adobe PhotoShop; the formatted signals are then transmitted to TOMAX USA.com. If E-mailed, an indication of the PMS color also needs to be transmitted to permit the logo to be reproduced at the processing site in its precise colors. At the processing site, the received image of the logo is converted back to a hard copy, before it is assembled with the selected promotional product and a photograph of the logo superimposed on the product is taken. In turn, the photograph is scanned and the converted, and the rasterized image is transmitted as an E-mail attachment to the user's browser, where it may be previewed. TOMAX USA indicates that the superimposing process will require 60 hours or perhaps less, depending on workload. In addition, a security code number is transmitted with the superimposed image to the purchaser, while the superimposed image is also uploaded to the web site of TOMAX USA. The purchaser may use that security code to access on line the superimposed image from TOMAX USA's web site. Similarly, the purchaser may give that security code to another person, a customer of the purchaser for example, whereby the customer may also view the superimposed image from this web site. A drawback to the technique described above is that the superimposing is performed photographically and, as a result, requires a significant amount of time.

U.S. Pat. No. 6,334,853, assigned to the same assignee of this invention, describes an E-Commerce system comprising a client's system for one or more potential buyers, and at least one server to support the client's system or systems. The server includes at least first and second libraries for respectively storing first images of promotional goods, products and/or services, and markings, e.g., logos, trademarks or the like. The server is programmed to construct a first web page with a description of at least one of the promotional products, and a second web page with a description and/or an image of the marking to be superimposed on a product. The first and second web pages are downloaded to the client system, whereby the perspective buyer may browse the offered products and select one of the promotional products and one of the markings to be superimposed upon the selected product to provide a composite image. The composite image is in turn embedded in a third web page, which is downloaded to the client system, whereby the composite image may be displayed upon the client's system and the perspective buyer may preview the composite image before purchasing.

International Patent Publication No. WO 01/23989 describes an E-Commerce system for distributing promotional products, which may be used by the following entities: 1) a user (e.g., customer or buyer); 2) a distributor who may control the server; and 3) a supplier of the promotional goods and/or services. The distributor uses icons to display the promotional items, which are included in a view and sent to a user. By activating one of these icons, the user sends to the distributor a signal to display the different styles of the promotional products. The supplier may pay an additional fee to the distributor to have its promotional products more prominently displayed so that a user would be more inclined to order it. Further, the distributor can determine which supplier or suppliers will provide a particular promotional product. Further, a user sends to the receiver an order that includes an electronic file comprised of the promotional product and a marking. Then, the distributor combines the promotional item with the marking to create a representation of how the marking should appear on the promotional product. If the user has a further interest in the displayed promotional item, the user sends to the distributor a signal to display further information about the promotional product. Further, the distributor can determine which supplier or suppliers will provide a promotional product at a particular icon. If the user wishes to order a particular product it will input further details of the particular promotional product. As such details are input by the user, they are sent to the receiver, whereby the user can see how prices are changing as information is changed. In particular, the screen includes a view of a quantity section with various quantity levels that correspond to various prices. When the user determines the quantity of a particular promotional item that he or she desires, he or she will enter the proper quantity into the system. After the user has provided its authorization to the distributor, the distributor in turn sends order information to the supplier. Maintenance of the database used for a promotional items web site can be performed in part by the distributor, the supplier or both. Typically, the distributor will control the database but may allow limited access to the supplier. Both the distributor and the supplier may send an electronic signal to add or remove items from the database. When the order is placed, the distributor sends appropriate information to the suppliers. However, the user may not even know that different suppliers are being used. Because the ordering can be done over the Internet, it allows the order to move more quickly and be processed by the supplier.

The above identified International Publication notes the difficulty in facilitating a purchaser to find a particular promotional product due to the number of suppliers and promotional items that are available. Typically there are a large number of distributors and an even larger number of promotional items. Each distributor has at least one catalogue listing products and/or services which are selected by a distributor from a supplier and incorporated into the distributor's catalogue.

Various economic models are employed to compensate the various entities for their participation in the distribution and sale of promotional products and/or goods. One of the most common economic models is to permit the distributor to provide a mark up of the supplier's price; typically, such mark up may be fifty or more percent of the supplier's price, thus resulting in a significant increase in the price to a buyer. In the above noted International Application, there is described a system involving the buyer, the distributor, the supplier and an intermediary. The supplier and distributor in such a system can pay a commission or other fees to the intermediary based on the use (monitored by hits or central processing unit time) or by orders made using the system. In another embodiment, order information is sent to the distributor and the supplier. Alternatively, financial information for the order is sent by the intermediary to the supplier. When consideration is received by the supplier from the buyer, the supplier keeps it's share and pays a portion of the consideration to the distributor and another portion to the intermediary.

OBJECT OF THE INVENTION

It is an object of this invention to provide new and improved method and apparatus for facilitating the sale to any of a plurality of buyers of a large number of items supplied by a plurality of suppliers.

It is a further object of this invention to eliminate from the purchasing process any distributor or middle-man and their markup charges.

It is a still further object of this invention to provide apparatus and method that permits any of the plurality of buyers to communicate directly with any of the plurality of suppliers.

It is a still further object of this invention to carry out the purchasing process of this invention in a network and, in particular, an Internet environment whereby this invention's apparatus and method may be automated for cost efficiency, speed of process and increasing significantly the number of items (products and/or services) that are readily available for sale to potential buyers.

SUMMARY

In accordance with these and other objects of this invention, there is disclosed a method of managing the sale of a plurality of items from a plurality of corresponding suppliers to at least one buyer, wherein the one buyer determines a description of the item to be purchased. The method enables each of the plurality of suppliers to store at least one catalogue of its items in a database and responding to a search request of the one buyer to identify any item in the catalogues stored in the database with a description that matches the item description of the buyer.

In a further aspect of the invention, there is disclosed a system for carrying out a transaction involving at least one item supplied by at least one supplier and potentially purchased by at least one buyer. Each of the one supplier and the one buyer has a terminal connected to a network. The system comprises at least one interface including a database and at least one server that is connected to the network and is programmed to provide a buyer web site to permit the one buyer to communicate over the network between the buyer's terminal and the interface. The server is further programmed to provide a supplier web site to permit the supplier to communicate over the network between the supplier's terminal and the interface, whereby one of the buyer and supplier may transmit a message related to the one item from its terminal to the interface and further transmit the message from the interface to the terminal of the other of the buyer and supplier.

In another aspect of this invention, there is described a method of constructing a searchable database that stores at least one catalogue of items that may be bought by at least one buyer and are supplied by at least one supplier. The method comprises the steps of the one supplier selecting which of its items that are to be included in its catalogue, the supplier attaching to each selected item a description of that item and, then, storing each item and attached description in a database. Thus the buyer is entitled to search the catalog of items stored in the database based on the descriptions of the items.

In a still further feature of this invention, there is described a method of managing a system to carry out transactions involving the purchase by each of a plurality of buyers of selected of a plurality of items, selected of the plurality of items being supplied by corresponding ones of a plurality of suppliers. Each of the plurality of buyers and each of said plurality of suppliers is assigned a unique ID. The system comprises a server and a database. First, the method initially obtains from each of the plurality of buyers and suppliers their unique ID, and receives and compares the ID of each of the plurality of buyers who seeks access to the system. If there is a match, the method grants to that buyer or supplier access to the system.

In a still further aspect of this invention, there is described a method of managing the selecting and purchasing at least one item by a buyer, wherein each of the plurality of distinct items is associated with a definition which defines the variables of its item, and then constructing a screen displaying the variables of the selected item in accordance with the definition of the selected item.

In another feature of this invention, there is disclosed a method of constructing a unique screen that displays a price matrix for at least one particular item. The item includes a definition of the variables associated with the item. The method of constructing comprises the steps of reiteratively changing each of the plurality of variables for each reiteration of each of the variables a corresponding price matrix dependent on the values of each of the plurality of variables for that reiteration. Then, the values for each of the corresponding variables and the corresponding price matrix are stored in a database for each reiteration. Finally, a screen is construed for a set of variables of particular values by accessing the database to determine the price matrix corresponding to the set of variable of the particular values. The screen includes the set of values for the variables and the corresponding price matrix.

In a still further aspect of this invention, a database structure is provided to facilitate communications over a network between any of a plurality of suppliers of items and any of a plurality of buyers of the items. The database structure includes a buyers' memory structure comprising a plurality of sections, one section for each buyer for storing an ID unique to its buyer and the orders initiated by that buyer, and a supplier memory structure comprising a plurality of sections, one for each supplier for storing an ID unique to that supplier and at least one catalog of the items of each supplier.

In another feature of this invention, a method is disclosed for controlling communications over a network between at least one supplier of at least one item and at least one buyer to whom that one item is offered for sale. The method comprises the steps of receiving and storing a message in a memory from the buyer that relates to the item and includes an identification of the supplier that supplies the item, and searching the memory for all messages with an identification that matches that of the supplier of the item.

In another feature of this invention, a method is disclosed for operating a searchable database to facilitate at least one buyer to select a certain one of a plurality of items that matches a description of the item sought by the one buyer, wherein the plurality of items is variously supplied by a plurality of suppliers and each supplier supplies a set of its items. The method includes the steps of storing a plurality of files in the searchable database, wherein each of the plurality of files comprises an identification of at least one item, a description of the one item and an identification of the particular supplier that supplied the one item. Next, each of the plurality of buyers is enabled to search the plurality of files stored in the searchable database for an item whose description matches the description of the one buyer and to withdraw from the database any file with an item that matches the buyer's description.

In a still further aspect of this invention, a method is described for constructing a searchable database to facilitate each of a plurality of buyers to select certain ones of a plurality of items that matches an item description of each buyer. The plurality of items is variously supplied by a plurality of suppliers, and each supplier supplies a set of its items. The constructing method includes the steps of constructing for each of the plurality of items an identification of the one item, a description of the one item to be matched with the item description of one of the plurality of buyers, and an indication of the particular supplier that supplied the one item. Next, the construction step is repeated for each item of the set of items for each supplier. Then, the files are stored for a particular supplier in a distinct section of the database.

In a still further aspect of this invention, a method is described for controlling the communications over a network between at least one supplier of at least one item and at least one buyer to whom that one item is offered for sale. The method comprises the steps of receiving a first message from the buyer that relates to the one item and includes an identification of the supplier that supplies the one item, storing the first message in a memory and responding to the storing of the first message in the memory to send a second message to the supplier identified by the supplier identification to indicate that the first message has been stored in the memory.

BRIEF DESCRIPTION OF THE DRAWINGS

The forgoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which:

FIGS. 4A-4J are screens generated by the E-Commerce system of FIG. 1 and downloaded to the terminal of a particular supplier;

FIGS. 8A-8D are screens generated by the E-Commerce system of FIG. 1 and are used by the process shown in FIG. 7 to edit the items that were previously added to the catalog(s) of a particular supplier and stored in the data warehouse;

FIGS. 10A-10D are screens generated by the E-Commerce system of FIG. 1 and used by the process shown in FIG. 9 to facilitate a buyer to select and upload a marking to be combined with a selected item;

FIG. 14A-14D are screens generated by the E-Commerce system of FIG. 1 and are used by the process shown in FIG. 13 to conduct an advanced search of the items;

FIG. 17B is a flow diagram that illustrates a process for the supplier to variously communicate with a selected buyer.

DETAILED DESCRIPTION OF A PREFERRED EMBODIMENT OF THE INVENTION

Figure 1:
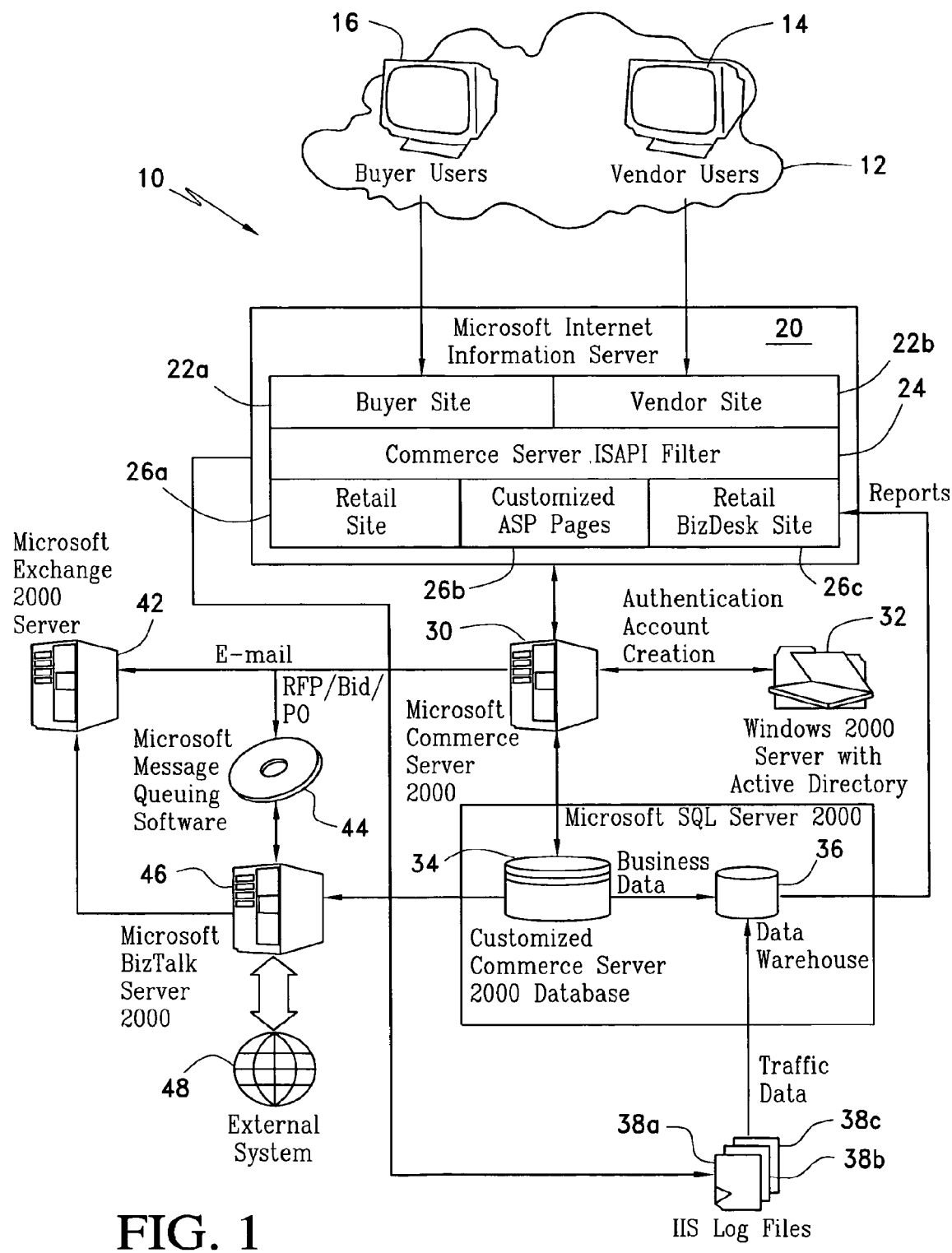
FIG. 1 is a functional block diagram of the arrangement of servers (computers) and databases for storing the data involved in the E-Commerce system of this invention and which is programmed to permit bi-directional communication between selected of the buyers and selected of the suppliers.

Referring now to the drawings and in particular to FIG. 1, there is shown an E-Commerce system 10, which is programmed to permit any of a plurality of users to select the desired products and/or services of a particular supplier, to receive information about at least one product and/or service, to purchase the selected product and/or service and to effect payment therefore. The E-Commerce system 10 is connected via an information communication network 12 to a terminal 16 of a buyer and to a terminal 14 of a vendor or supplier of the products and/or services. Though only a single terminal 14 is shown for a vendor, it is appreciated that the system 10 may be connected to a plurality of such vendor terminals 14. Likewise though only a single buyer terminal 16 is illustrated in FIG. 1, it is appreciated that the system 10 may be connected to a plurality of such buyer terminals 16. In an illustrative embodiment of this invention, the system 10 may be coupled to a large number of vendors and an even larger number of buyers. It is contemplated that tens of thousands and more users may be so coupled and that thousands of vendors or suppliers may be so coupled to the system 10. The E-Commerce system 10 of this invention differs from those systems described above, in that the system 10 of this invention is adapted to operate with not only a different set of entities, but also carries out a different economic model than those systems described above. As described above, the prior systems were programmed to interact with a buyer, a supplier or vendor and a distributor. The system 10 of this invention does not operate in conjunction with a distributor in the sense as described by the systems above. Rather there is included in this system a vendor or supplier, a buyer and a service provider, which primarily acts to service the E-Commerce system 10 of this invention. In one embodiment of this invention, service providers of this invention are compensated by a percentage of the value of the purchases made by the buyers. In particular, the E-Commerce system is programmed to establish an interface between at least one buyer and at least one supplier of the products and/or the services, whereby a bi-directional transmission of data is established between the one buyer and the one supplier. Such an interface permits a buyer to search a catalogue of products and/or services of a particular supplier, select particular products and/or services for purchase, facilitate the purchase of the particular products or services, provide financial information to facilitate the buyers providing the supplier with financial information and effect payment to the supplier, authorize the purchase of the selected products and/or services, and provide an indication of the status of the current transaction.

Figure 3A:
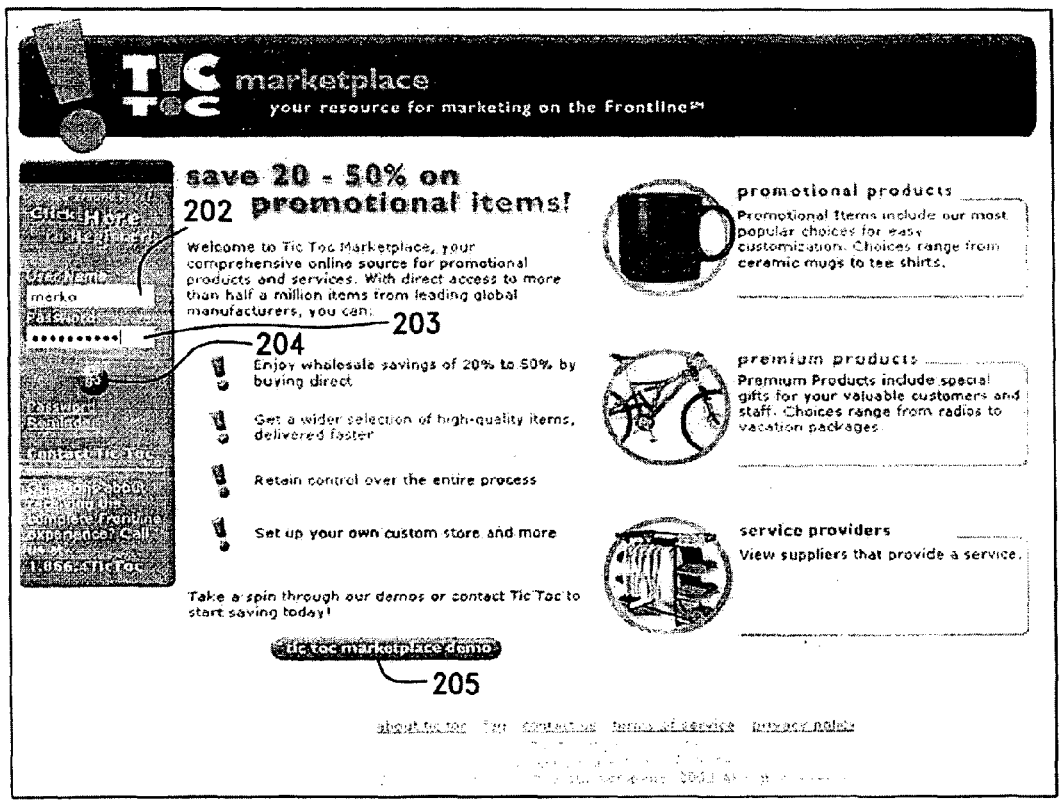
FIGS. 3A-3V are respectively screens generated by the E-Commerce system of FIG. 1 and downloaded to the terminal of a particular buyer.

As shown in FIG. 1, each of the buyers' terminals 16 and each of the vendors' or suppliers' terminals 14 is coupled to a web server 20, which in one illustrative embodiment of this invention may take the form of a Microsoft Internet information server. In particular the server 20 is programmed to manage a buyer site 22a and a vendor or supplier site 22b. In particular, the buyer site 22a generates and transmits certain web pages or screens to a selected one of the buyer terminals 16. The buyer screens are shown in FIG. 3 and facilitate, in a general sense, each buyer to conduct a search for at least one, particular product and/or service, to obtain if needed further information about the preliminarily chosen product or service, to combine with a further marking such as a trademark, logo or the like if needed, and to place an order, which is transmitted through an interface to that vendor of the selected product or service.

Figure 4A:
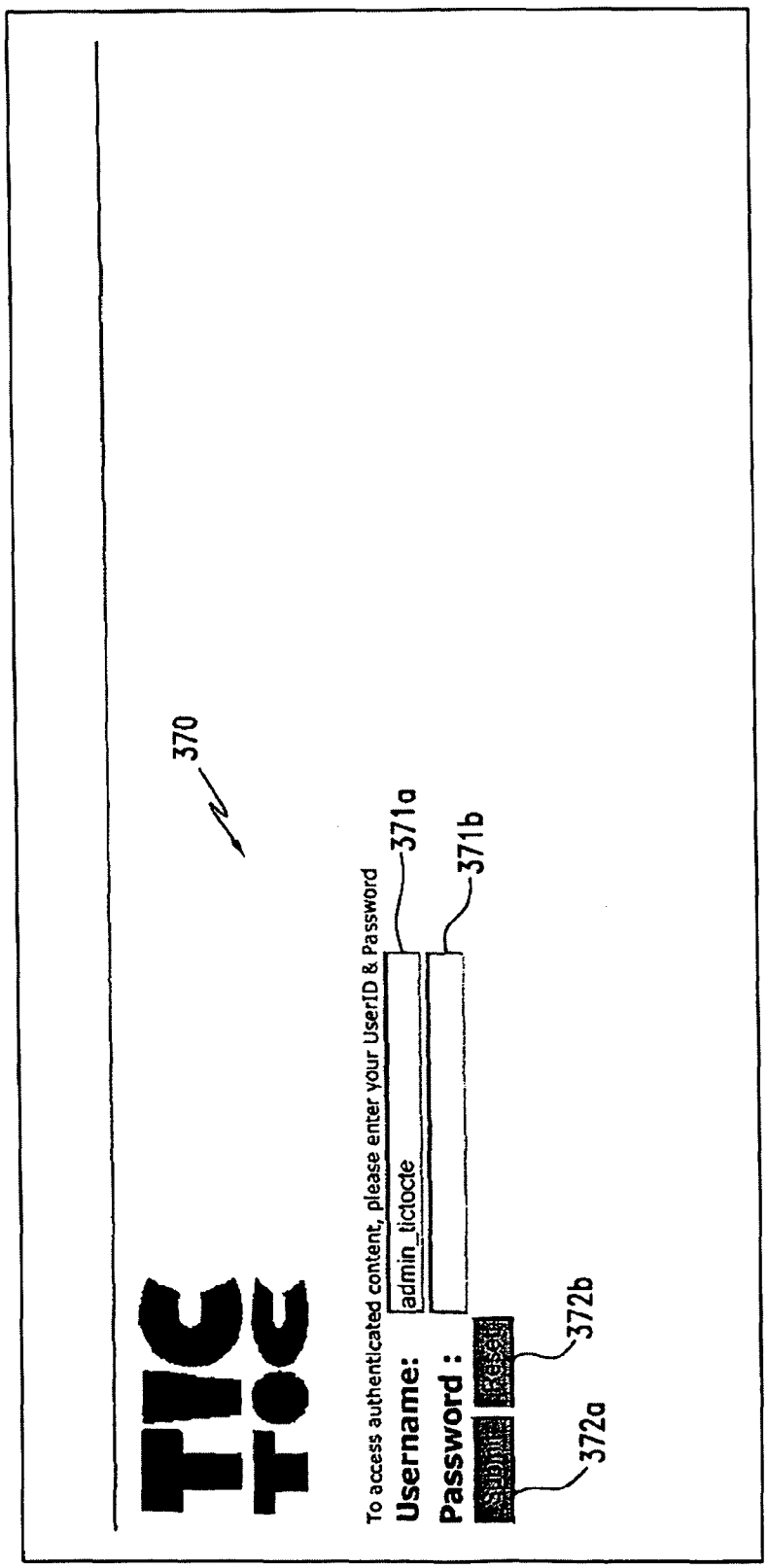
Figure 4B:
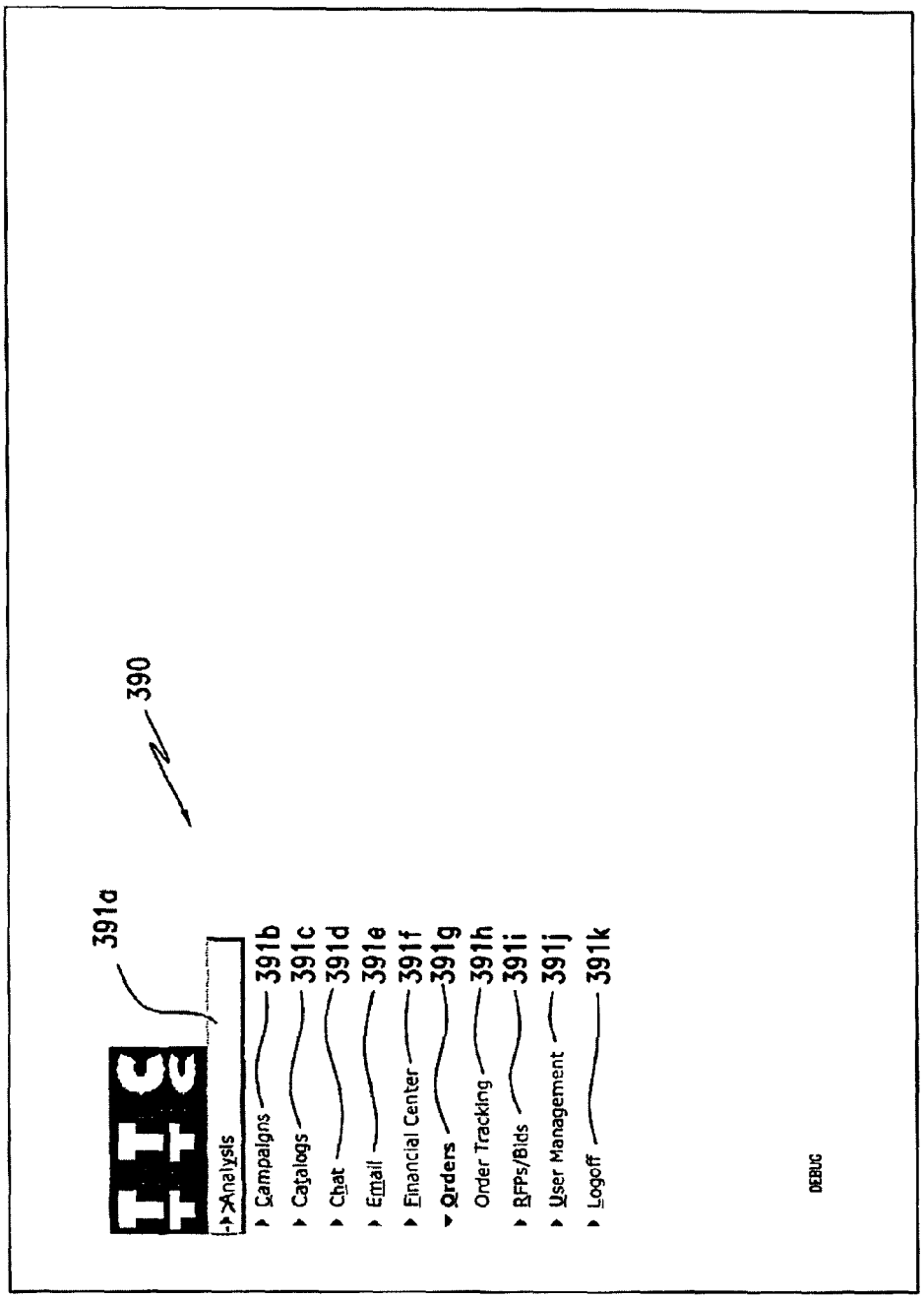

The vendor site 22*b* is programmed to generate a plurality of web pages or screens as shown in FIG. 4 that are particularly adapted to display information to the vendor, whereby each vendor may view this information upon it's terminal 14. Such information includes generally information about the order placed by a buyer for a particular product or service of that vendor. Each of the buyer site 22*a* and vendor site 22*b* is programmed to provide security for the information that is input and output to the Internet information server 20. In particular, each buyer and each vendor is assigned a password, which must be entered before that buyer or that vendor is permitted access to the E-Commerce System and, in particular, to the Internet information server 20. The Internet information server 20 further includes a filter 24, which may be implemented in an illustrative embodiment of this invention by a commerce server ISAPI of Microsoft. The filter 114 is programmed to functionally track the transmissions of messages between a buyer at it's terminal 16 and a vendor or supplier at it's terminal 14. The filter 24 further implements the security of the system by checking the passwords of each of the buyers and vendors, and authenticates these passwords before permitting either the buyer or the vendor access to this system 10. The filter 24 further includes a retail site 26*a*, a site for customizing active server pages (ASP), and an interface site 26*c*. In particular, the retail site 26*a* is programmed to connect each buyer through its terminal 16 to the buyer's homepage 200 as shown in FIG. 3A. In an illustrative embodiment of this invention, a screen for each of the buyers may be generated from a common template, which is personalized by embedding in the template data and information which is characteristic of a particular buyer. In an illustrative embodiment, the interface site 26*c* may be implemented by a BizDesk@server 2000 of Microsoft and is programmed to connect each vendor or supplier to it's own web page or site. The web page for each vendor is generated from a common template which is programmed with data and information characteristic of it's vendor. The programmed functionality of the block 26*b* implemented by the use of Active Server Pages (ASP) each of the buyer screens as shown in FIGS. 3A through 3V and the vendor screens as shown in FIGS. 4A through 4I without the time consuming construction of a web page by writing code in the HTML language as would be a common way of providing such screens. In one illustrative embodiment of this invention, there are approximately 100 ASP pages, which are used to generate screens for different purposes. For example, each vendor has a catalogue of products. A screen for each of these products is generated by populating a template with data from an ASP page. In this fashion, it is not necessary to generate a web page for each product of each vendor, thus reducing significantly the time and labor costs of generating these web pages. Further, there is an ASP page for each of the suppliers and buyers, the homepage, and a set of screens to permit each buyer and each supplier to send and to receive emails. Further, an ASP page is used to generate screens that are used to carry out the customizing and order functions of this system 10.

The code for these ASP pages is stored and accessed in a data warehouse 36 under the control of a database server 34. In an illustrative embodiment of this invention, the SQL Server 2000 technology of Microsoft and a customized Commerce Server 2000 of Microsoft may be employed to implement the data warehouse 36 and the database server 34. The code carried by the ASP pages is stored in the data warehouse 36. In other words, all data associated with the buyers and vendors is stored in the data warehouse 36. In particular, the data stored in the warehouse 36 includes the identification for each of the buyers and suppliers that has logged onto the E-Commerce System 10. Also included are all of the catalogues for each of the suppliers. These catalogues include pictures of each of the products, prices for each of the products, written descriptions of the products, the software necessary to display the pictures in either two or three dimensions, data indicative of the various characteristics of the products, and the underlying data that enables the generation of price matrixes. The generation of price matrixes requires a significant amount of data. In one illustrative embodiment of this invention, a screen for a single product will need code to accommodate seventeen hundred variations of that product. If that product were for example a shirt, the variations would include color, the pattern of the cloth from which the shirt is made, the various sizes in which the shirt may appear, the type of imprintings that may be made upon the shirt, and the different prices for different numbers of shirts. With such a capability, a screen may be generated with a price matrix that is dependent upon each of these variants or variations. It is appreciated that even if one of these characteristics of the shirt is changed, that there will be a resulting change in it's price matrix.

A server 30 is connected to an Internet information server 20 and is programmed to control the purchasing of the products and/or services from the suppliers. In an illustrative embodiment of this invention the server 30 may take the form of a Microsoft Commerce Server 2000. In particular, the server 30 captures a wide range of commerce information, e.g., the purchasing of the various products and/or services of particular buyers and transmits such data to particular suppliers at their terminals 14. In addition, the server 30 is programmed to track the accessing by a particular buyer of a particular product web page within the catalogue of a particular supplier. In addition, the server 30 enables the E-Commerce System 10 to be scalable, whereby the system 10 may accommodate and service tens of thousands (or more) users and at least thousands of suppliers.

The database server 34 is connected to the server 30 to facilitate the bi-directional transmission of data there between. In turn, the database server 34 is coupled to input data into the data warehouse 132. As described above, the coding for the ASP pages is stored in the data warehouse 36 and, in particular, the code for the pages associated with the buyer screens as shown in FIG. 3 and the supplier or vendor screens as shown in FIG. 4, as well as the catalogues of each of the suppliers are stored in the data warehouse 36. It is understood that such storage enables a buyer to search the products and/or services that are contained in all of the catalogues of all the suppliers and to selectively purchase at least one product and/or service from a particular supplier. In an illustrative embodiment of this invention, the database server 34 and the data warehouse 36 may take the form of a Microsoft SQL Server 2000; in particular, the database server 34 may take the form of a Customized Commerce Server 2000 database.

Further, the E-Commerce System 10 includes a set of files 38*a-c*, which are connected to receive data from the Internet information server 20. In particular, the files 38 track the transmission of data between the suppliers and the vendors. In particular, the files 38 collect data to provide a history of the activity of the buyers and, in particular, to provide a history of the transactions of the buyers to purchase certain products and/or services. In an illustrative embodiment of this invention, such files 38 may be used to develop a profile of the particular preferences of each of the buyers. The files 38 are connected to the data warehouse 36, whereby traffic data of the buyers and/or suppliers may be stored therein.

The E-Commerce System 10 also includes an active directory 32, which is connected to the server 30 in a manner to facilitate the bi-directional transmission of data there between. In particular, the directory 32 accumulates and stores the passwords of each of the buyers and/or suppliers associated with the system 10. The active directory 32 is programmed to authenticate each of the system's buyers and sellers, before access to the system 10 is granted to any buyer and/or seller. In particular, this authentication is carried out by asking each buyer or supplier, prior to access to the system 10, to enter it's password, which is transmitted via the Internet information server 20 and the server 30 to the active directory 32 and is there compared with the previously entered passwords of the authorized buyers and/or suppliers. If there is a match with a previously stored password, then an authorization signal is transmitted back via the server 30 to the Internet information server 20, whereby the user seeking access to the system is authorized.

Further, the E-Commerce System 10 includes a server 42, which provides an email capability for the system 10, whereby any of the buyers may transmit emails from their terminals 16 to any of the suppliers at their terminals 14. As shown in FIG. 1, the server 42 is coupled via the server 30 and the Internet information server 20 to each of the buyers and it's terminal 16 and to each of the suppliers and it's terminals 14. Further, the server 42 is also coupled to a further server 46, which will be described below. In particular, the server 42 may in an illustrative embodiment of this invention take the form of a Microsoft Exchange 2000 Server and provides an email engine to sort and route emails over the Internet 12 between selected of the buyer terminals 16 and the vendor terminals 14.

The server 46 provides a connection to another, external system 48. In an illustrative embodiment of this invention, the system 48 may be directly connected to a database of each of the suppliers' terminals 14. In an illustrative embodiment of this invention, the server 46 may take the form of a Microsoft BizTalk Server 2000. In operation, the catalogue of each of the suppliers may be stored in a memory or database of it's terminal 14. Though not shown in FIG. 1, the external system 48 may be coupled to a terminal 14 of a selected supplier, whereby it's catalogue of products and/or services may be downloaded to the system 10 and, in particular, applied to the server 46, which in turn transmits such data via the database server 34 to the data warehouse 36, where the product and/or services catalogue of the suppliers are stored.

Figure 2:
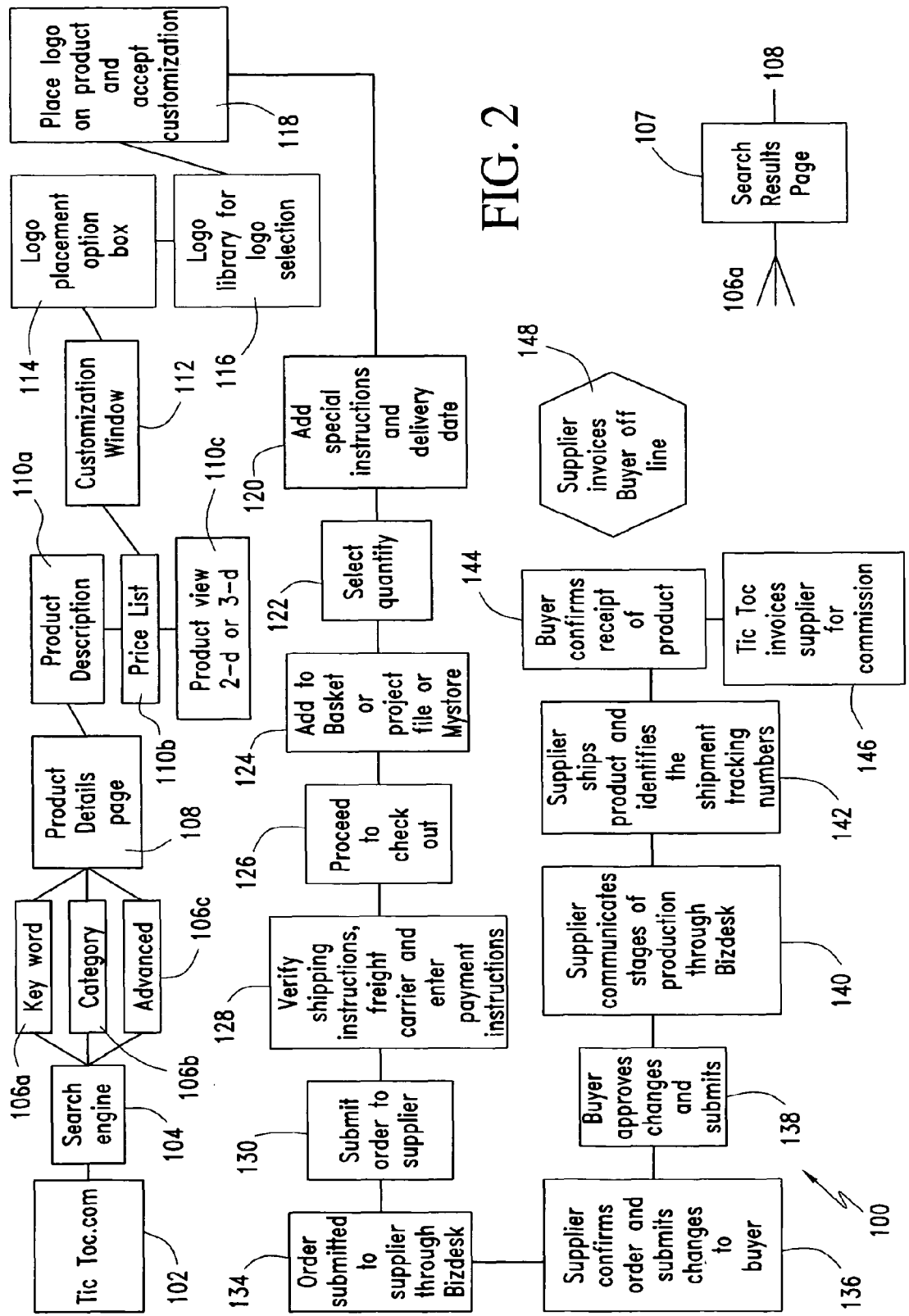
FIG. 2 is a flow diagram illustrating how the E-Commerce system of FIG. 1 is programmed to permit any of the users to identify a particular product and/or service from any of the suppliers, to purchase same and to arrange for payment of such purchase.

Referring now to FIG. 2, and FIG. 3, there is respectively shown a flow diagram of the operation of the E-Commerce System 10 as discussed above with respect to FIG. 1, and the web pages which are to be displayed at the terminal 16 to the buyer. Initially a buyer by use of it's terminal 16 (FIG. 1) brings up upon it's display a system homepage 200, as shown in FIG. 3A. The system homepage 200 permits the buyer access to the system 10. In particular, the buyer is prompted to click on a button 201. If that buyer is new to the system 10, the new buyer is registered and a password chosen by the buyer and stored in the files 38 (FIG. 1). If the buyer has previously registered in the system 10, the buyer enters it's user name and password in the boxes 202 and 203 respectively, before actuating the "go" button 204. The system homepage 200 includes a further button 205, which a new user may actuate to receive a demonstration of the operation of the E-Commerce System 10.

Upon actuation of the button 205, the program 100 (FIG. 2) moves to step 104, wherein the web page 210 is displayed. The page 210 prompts a buyer to initiate a search for a particular product or service among those stored in the data warehouse 36 (FIG. 1). In particular, the buyer has an option as to the type of search that he/she would like to conduct. The web page 210 bears a menu 211, which has a plurality of boxes which the buyer may click on to initiate that particular type of search. In particular, the menu 211 includes a box 211a for a category search, a box 211b for an advanced search, a box 211c for a key word search, and a box 211d for entering words that will describe the type of product and/or service desired. After the buyer has actuated one of these boxes, he/she may then actuate a "go" box 211e, whereby the program 100 moves to one of the searches that are performed in steps 106a, b and c. In particular, upon actuating the box 211a, the program 100 will move to the step 106b, whereby the buyer is permitted to search for a particular product and/or service of a particular category as will be described below in detail with respect to FIGS. 11, and 12A-12D. Upon actuating the box 211b, the program 100 will move to step 106c, whereby an advanced search will be conducted as will be explained in detail below with respect to FIGS. 13, and 14A-14D. Similarly, when a buyer actuates the box 211c, the program 100 moves to step 106a, whereby a key word search is conducted as will be described below in greater detail with respect to FIGS. 15, 16A-16D.

Further, the homepage 210 bears a menu 223 that functions as a tool box whereby a number of functions may be carried out. The tool box 223 includes a plurality of buttons 223a-g, select of which may be actuated by the buyer to effect a corresponding function. In an example where the buyer is an employee of a store, the buyer may actuate the My Store box 223a to select a number of products for sale to the regular customers of that store. In an example where the buyer is an employee of a company, the buyer may hit the "Company Store" box 223b, to select certain products and/or services for sale to the employees of the company. In particular, such selected products and/or services may be customized by placing the logo or trademark of that company on the selected promotional products. If the buyer actuates a "Project Files" button 223c, the selected products and/or services may be put into a file in the nature of a "shopping cart" for sale to the buyer. If the buyer hits a "Request for Proposal" button 223d, the buyer causes a message describing a particular product to be transmitted to selected suppliers with a request for bid from each of those designated suppliers for the particular product. Upon receipt of the responses from the suppliers, the buyer then may select the most advantageous response. If the buyer actuates a "categories" box 223e, the supplier may select which categories that may be used by either the buyer or the supplier to search for a particular product. If the buyer actuates a "Logo Library" box 223f, the buyer initiates a process for uploading particular markings such as a trademark, logo or the like into a dedicated library that is established within the data warehouse 36 (FIG. 1). Further, the buyer may set limitations upon the use of these markings as by example, the markings are limited for use by a selected group of people, the employees of a particular buyer, or may authorize unrestricted use of certain markings. Further, if the buyer hits a "My Account" box 223g, the buyer may access it's account. Illustratively a buyer's account may include a profile of the buyer, the previous history of orders placed by the buyer including the status of the orders and designates others who may have access to the buyer's account. For example, if the buyer is a company, it's administrator (and others) may be given access to the employer's account. If a buyer actuates a "Reference Guide" box 223h, the user is given access to a reference section, which may include (for example) the definition of terms that are used by the suppliers, descriptions of the processes that are carried out by the E-Commerce System 10, a glossary of industry terms, a glossary of Internet terms and the like.

Figure 3B:
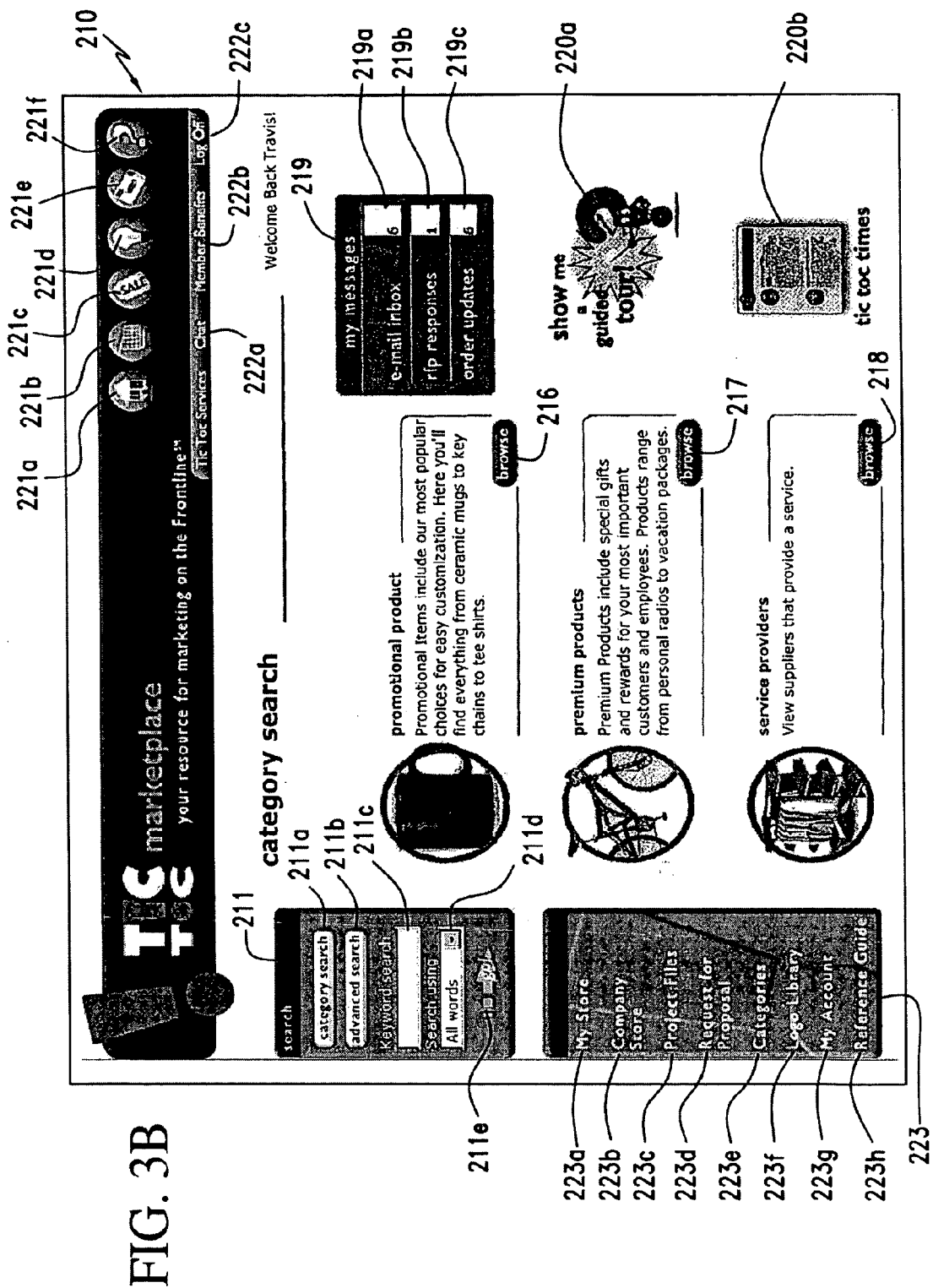

Still referring to FIG. 3B, the user homepage 210 further includes a menu 219 that permits a particular user to monitor its emailing activity and, in particular, includes a box 219a for indicating the number of the users' messages, a box 219b for indicating the number of responses to the buyer's request for purchases, and a box 219c for the number of order updates that the buyer has made. Further, the page 210 further includes a button 216 that may be actuated by the buyer to permit the buyer to browse promotional products, a button 217 actuated by the buyer to browse premium products, a button 218 actuated by the user to view the various services of the suppliers, a button 220a that may be actuated by the buyer to receive a guided tour of the E-Commerce System 10 and a button 220b that may be actuated by the buyer to permit the display of various notices and information about the E-Commerce System 10. Further, there is a tool bar which comprises buttons 221a-221f to facilitate the buyer by it's service provider to implement the functionality of these buttons. The page 210 has a second tool bar, which includes a button 222a that may be actuated by the buyer to enter a chat room, a button 222b that may be is actuated to cause the display of the benefits that are available to the buyer by using the E-Commerce System 10, and a button 222c that permits the buyer to log off of the system 10.

If the buyer clicks on the category search button 211a (FIG. 3B), the program 100 moves from step 104 to step 106b as shown in FIG. 2, wherein a category search web page 210 is displayed on the buyer's terminal 16 as shown in FIG. 3B. In a category search, the buyer may actuate a browse button 216 to review a plurality of promotional items, a browse button 217 to inspect a series of premium products, and/or a browse button 218 to review the services of identified suppliers. Also see FIGS. 11 and 12A-12D for a more detailed description of a category search.

Figure 3C:
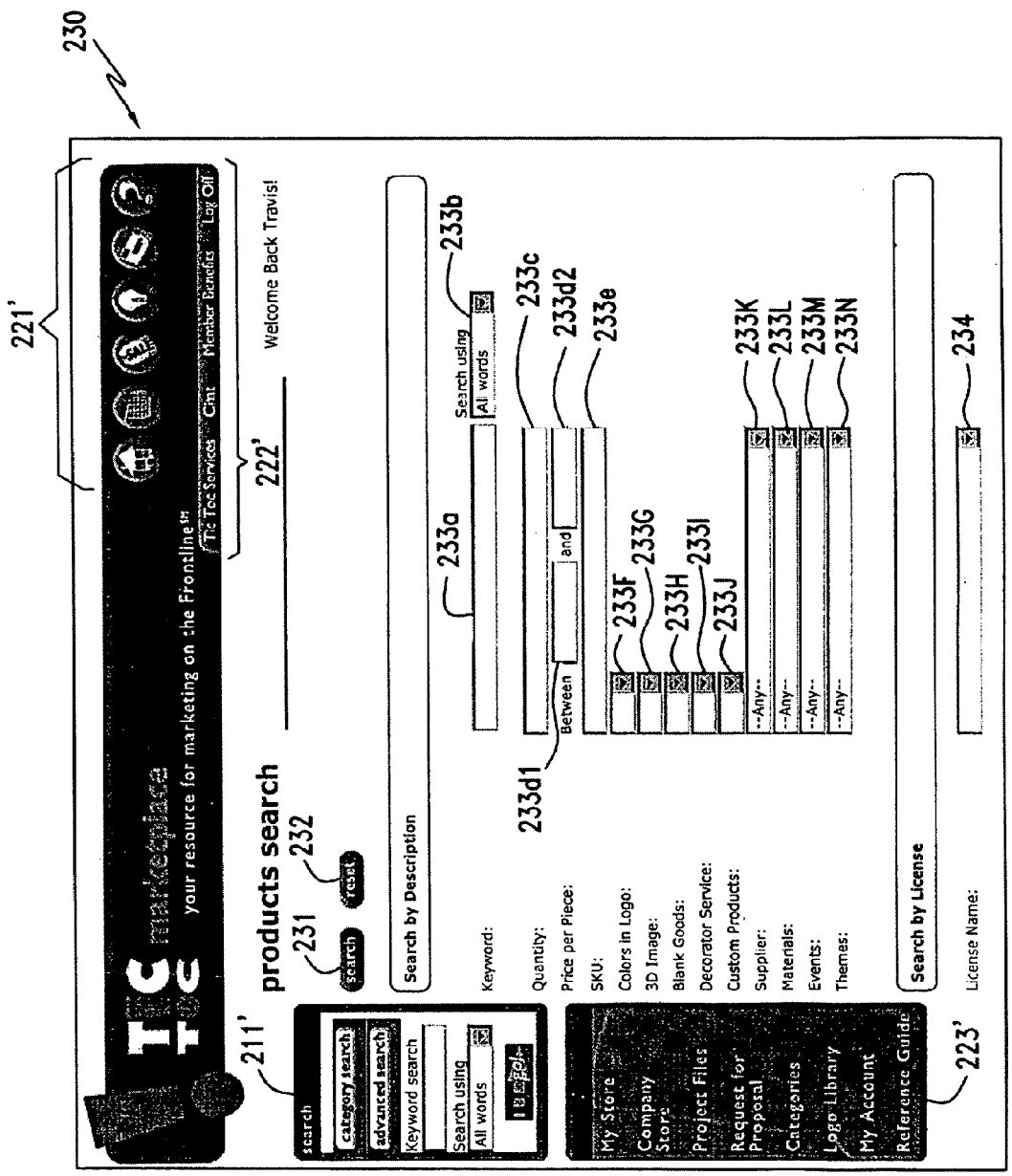

On the other hand, if the buyer actuates the advanced search button 211b, the program 100 moves from step 104 to step 106c as shown in FIG. 2. In the advanced search 106c as will be explained below with respect to FIG. 3C, a web page 230 is displayed on the buyer's terminal 16, which facilitates the buyer to enter words descriptive of the product and/or service desired to be purchased. The advanced search 106c may be carried out by developing the description of the various desired characteristics of the product and/or by identifying the supplier of the product or products upon which a licensee will permit the placement of its marking, trademark, logo or the like. In particular, the web page 230 includes the following boxes 233a-n for receiving respectively a buyer's input as to its key word, the quantity of products and/or services to be used, the price per piece, the SKU, colors in logo, a 3D image, blank goods, decorator service, custom products, supplier, materials, events and themes. Further, there is included a license name block 234, whereby the buyer may enter a particular marking, licensed name, logo, trademark or the like. The search by description will then proceed to identify those products and/or services, which the licensor of the name has licensed or otherwise authorized to be used with it's marking. For example, the licensor Coors has authorized it's trademark, "Coors", to be used with a limited number of products, which the search would find and identify. A more detailed description of the advanced search is provided below with respect to FIGS. 13 and 14A-14D.

In a similar fashion, the buyer may actuate the key word search button 211c (FIG. 3B) to move the program 100 from step 104 to step 106a (FIG. 2), whereby a search of products and/or services according to the entered key words is carried out as will be described below in detail with respect to FIGS. 15 and 16A-16D.

Figures 1, 3D:
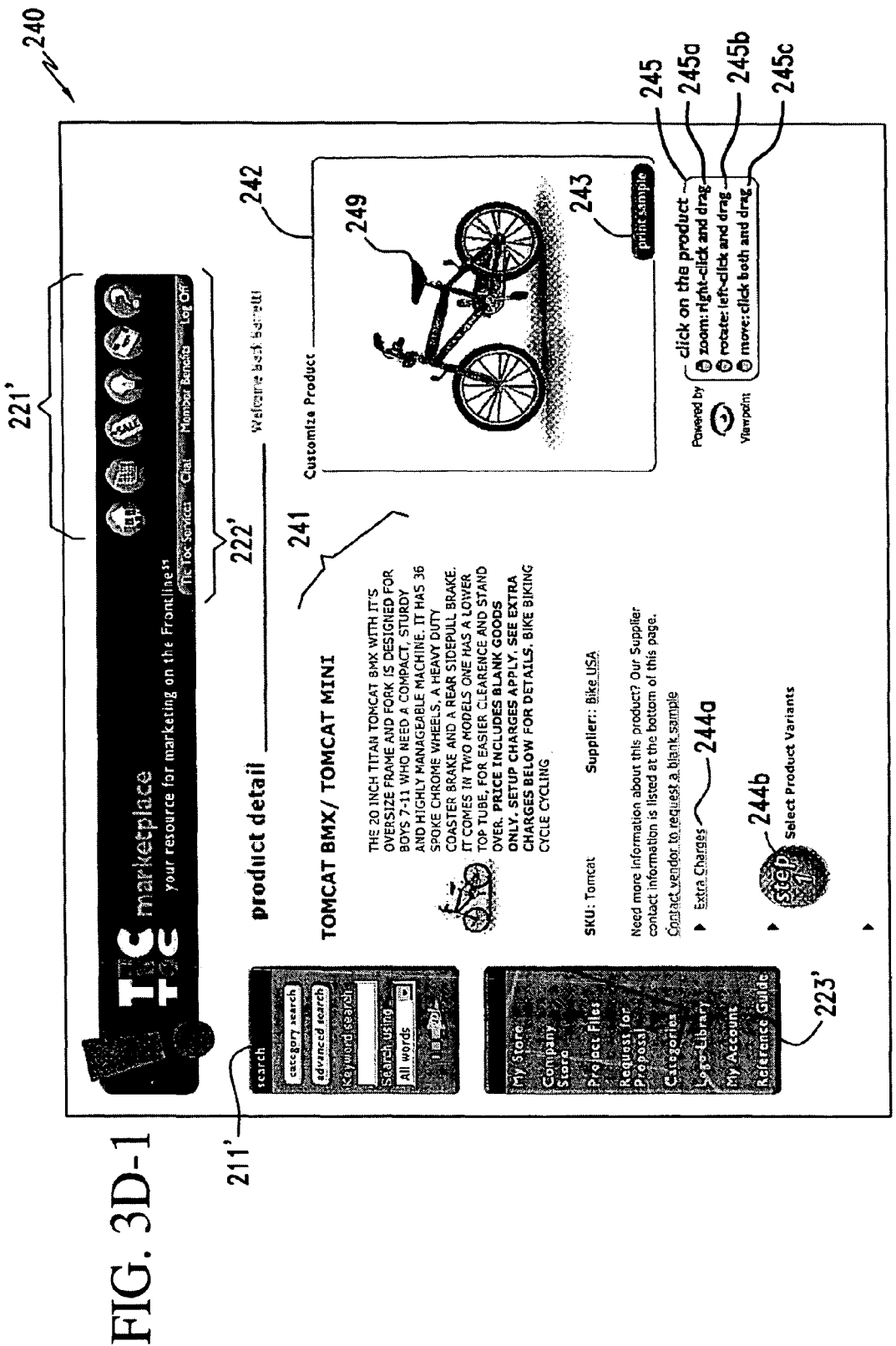
Figures 2, 3D:
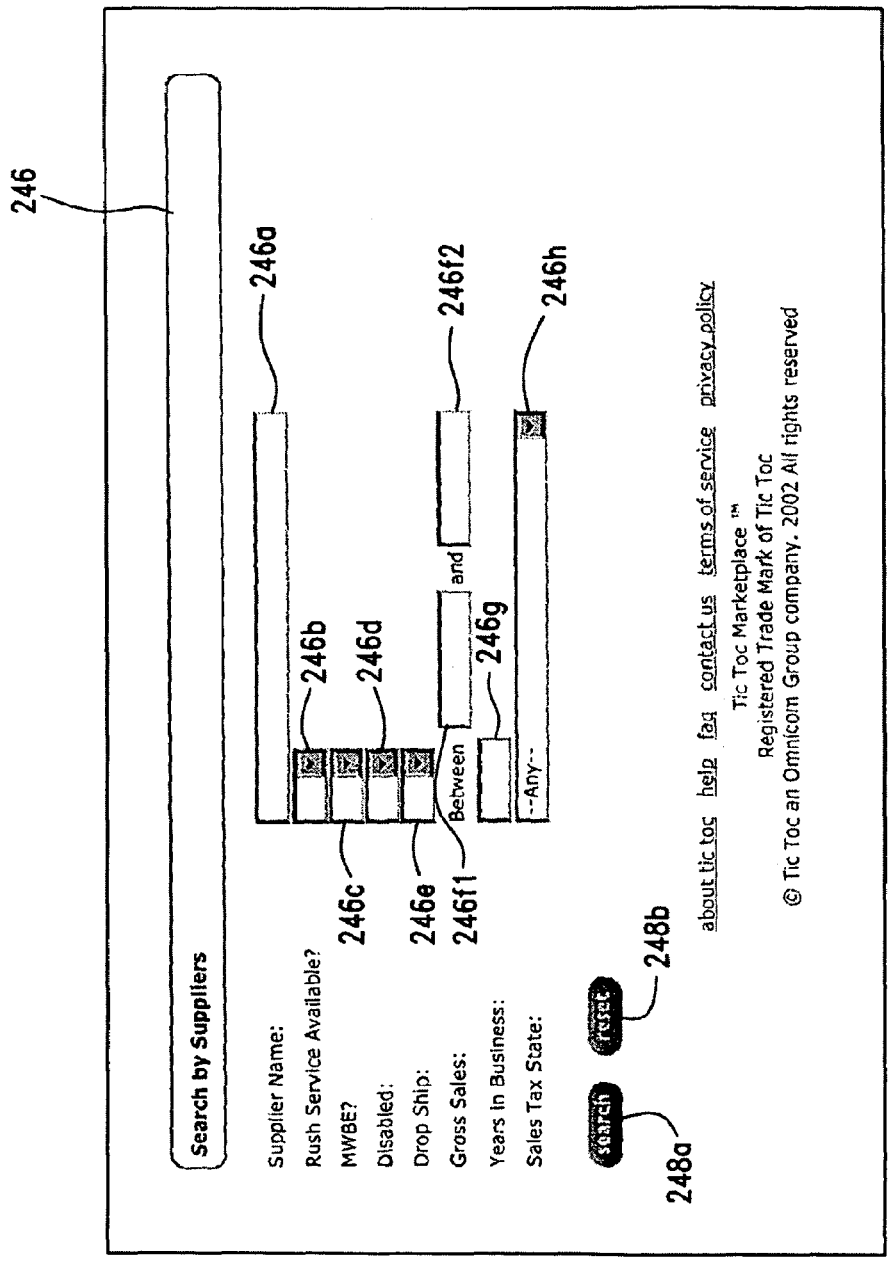
Figures 3, 3D:
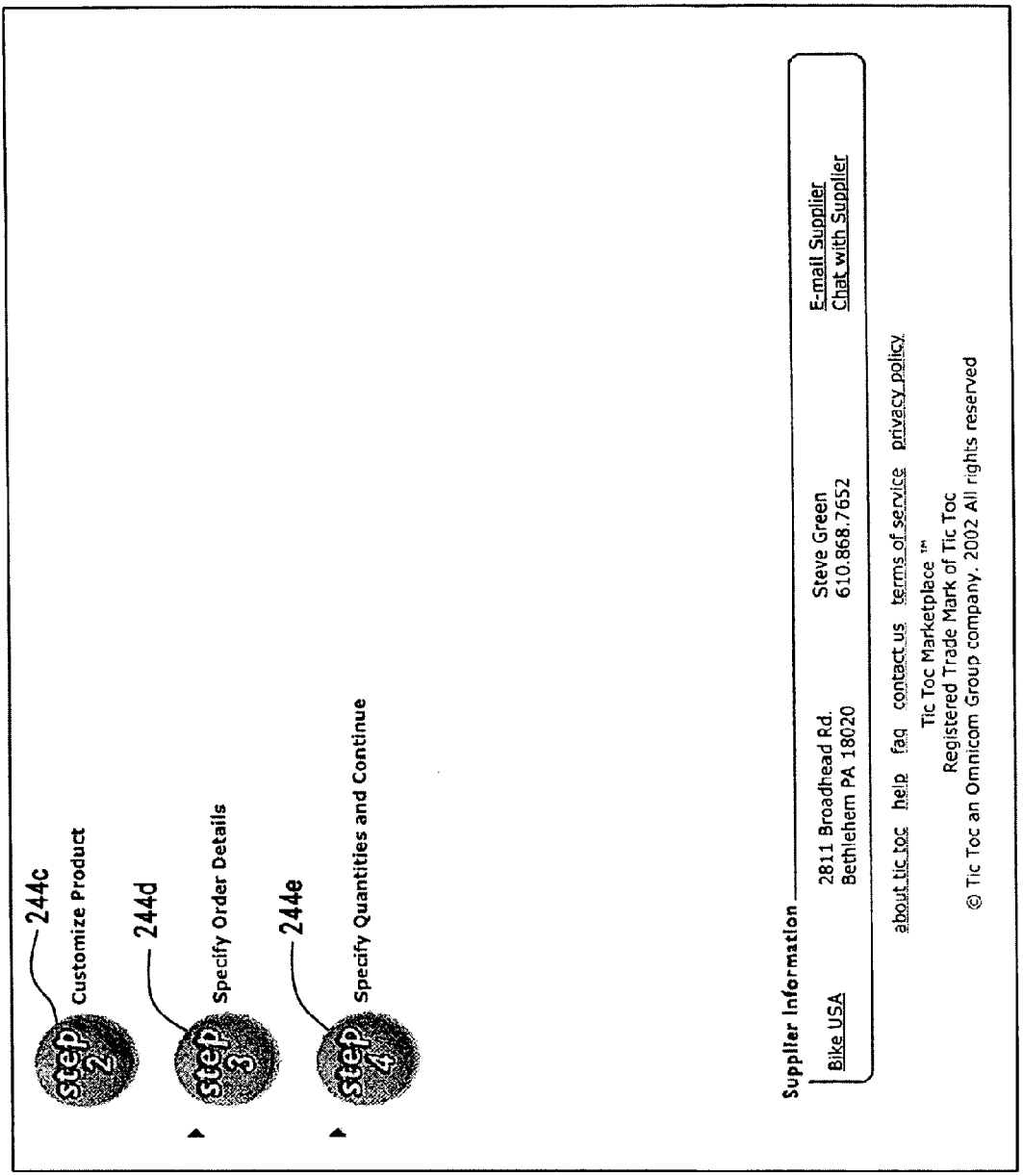

After any one of the key word search 106a, the category search 106b or the advanced search 106c (FIG. 2) is selected, the selected search is conducted through the products and/or services stored in the data warehouse 36 (FIG. 1) and one or more products and/or services are identified. The buyer selects from the drop down screen one of the displayed products about which further information is needed before purchasing. The identified items of each of the searches 106a, b and c are displayed in step 108 on a dropdown screen (not shown) of it's web page 240 as shown in FIG. 3D. Upon clicking on the selected product, the program 100 goes to step 108, wherein a product details web page 240 is displayed on the buyer's terminal 106. Next in step 10a, a detailed description 241 and a relatively large image 242 of the selected product are displayed. As will be explained, the image 242 is sufficiently large to permit the customer to customize it. Next information concerning the selected product and/or service is collected in the data warehouse 36 and is displayed as the web page 240 as shown in FIG. 3D on the buyer's terminal 16. In particular, the web page 240 provides a written description 241 of the selected product, e.g., a TomCat bicycle. Further, an image 249 of the selected product 249 may be displayed within a window 242. The buyer can click on a print sample box 243, whereby a printout of the image 249 may be obtained.

Figures 1, 3E:
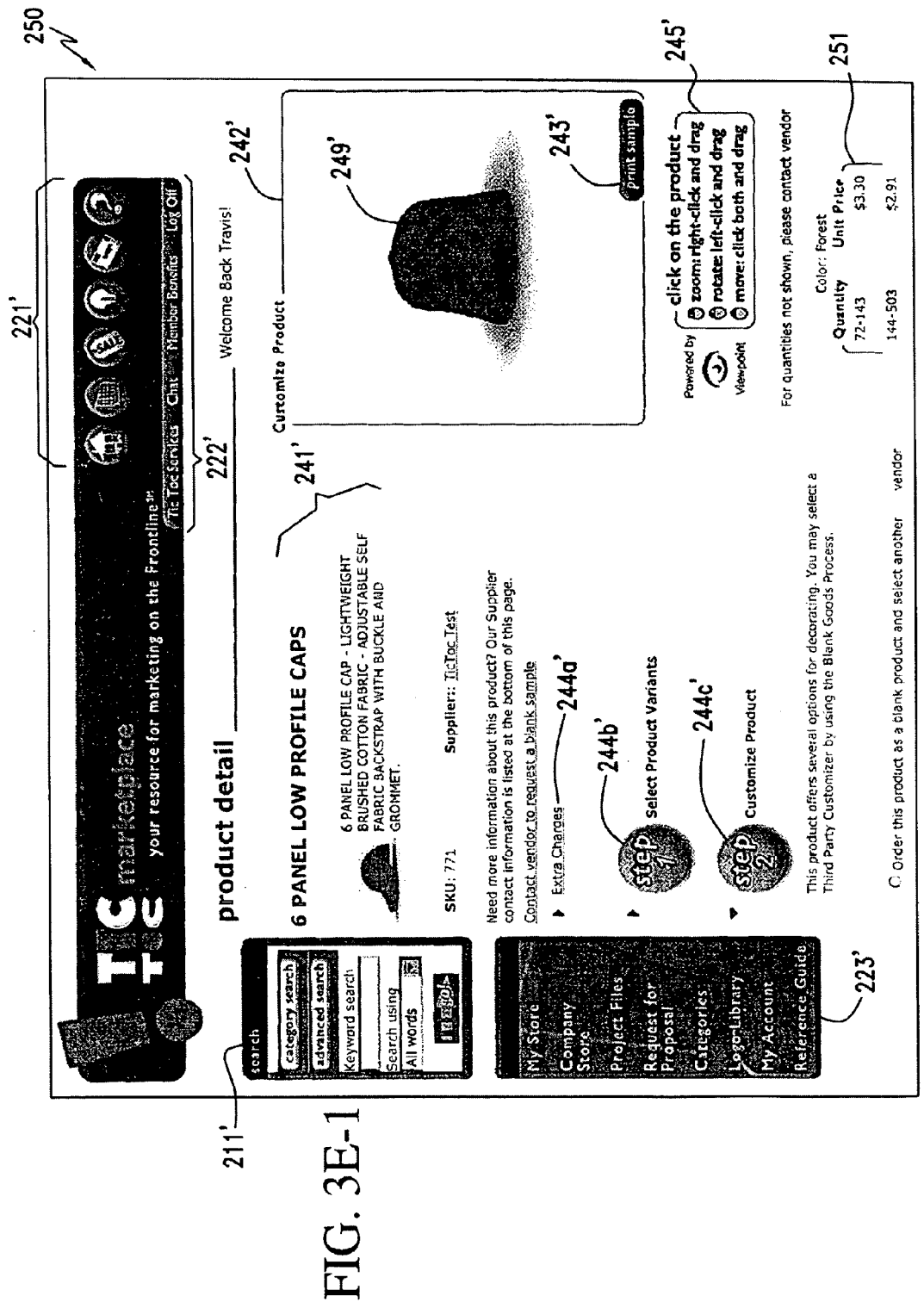
Figures 2, 3E:
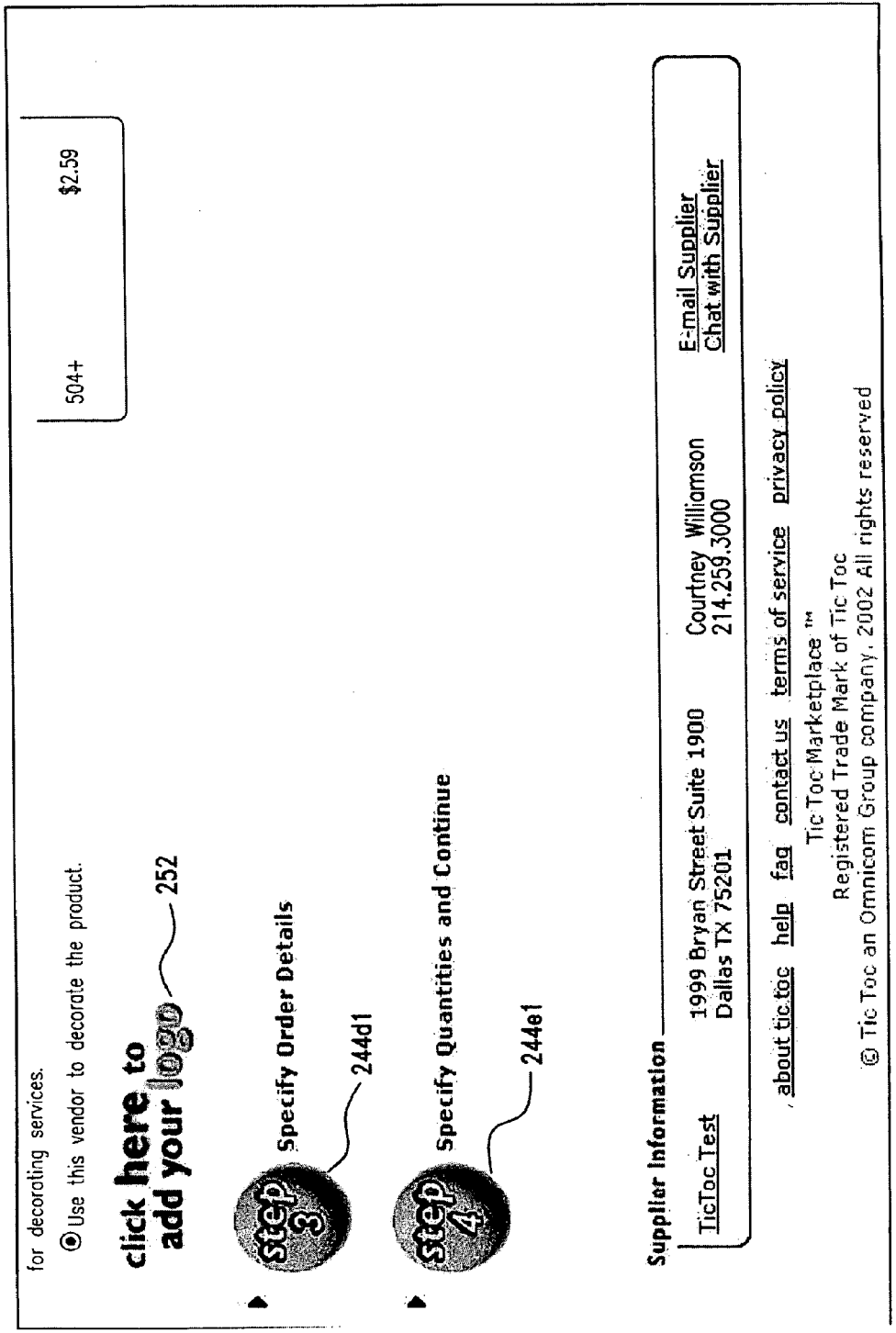

The product details web page 240 further includes an extra charges button 244a, which the buyer may actuate to obtain an indication of extra charges that may be involved in the purchase of the product 249. Further, the web page 240 may include a series of step buttons 244b, c, d and e, which may be actuated by the buyer to control some attribute of the product 249 or to initiate the placement of an order for the product 249. In particular, the buyer may actuate the button 244b to select a particular variant of the product 249. Next in step 112, the buyer may actuate the button 244c to initiate the customizing of the product, e.g., to select and place a marking or logo on the product 249. In particular, step 112 customizes the product viewed in the customization image or window 242 by the use of the tool bar 245. The tool box 245 facilitates the superimposing of a licensed name or marking upon the product image 249 and, in particular, positioned by the buyer in a desired relationship with respect to the product. It is appreciated that the licensed name or mark as obtained by entering a license name into block 234 may be the marking that is positioned or superimposed on the product 249. In particular, there is a zoom box 245a, which may be actuated to zoom in on a particular part of the product 249, a rotate button to rotate the image 249, and a move box 245c whereby the user can move or drag the marking to a particular location and orientation with respect to the product image 249. After the product has been selected and its characteristics defined, the button 244d initiates the preparation of the details of an order for that product and/or service. In particular, step 110c generates a product image 249, which may be either a two-dimensional or a three-dimensional view of the selected product 249. Finally, actuation of the button 244e permits the desired quantity of the product to be determined and the order to be finalized and sent. Once the box 244e is clicked on by the buyer and the buyer inputs via its terminal 16 the number of desired products, step 110b generates a price list or matrix 251, as shown in FIG. 3E, to reflect the range of quantities for each of a plurality of prices. Still further, the product details web page 240 includes an array 246 of boxes 246a-h for receiving the name and characteristics of suppliers that may be entered into the boxes. In particular, the price matrix places in the quantity column a range of the numbers for the corresponding price of a particular product. Upon entry of this information into the boxes 246, the buyer may actuate a search button 248a, whereby a list of suppliers meeting the inputted criteria is provided to the buyer. If the buyer desires to obtain another list of suppliers, he/she may hit a reset button 248b, before again inputting a different set of supplier criteria.

Figure 3F:
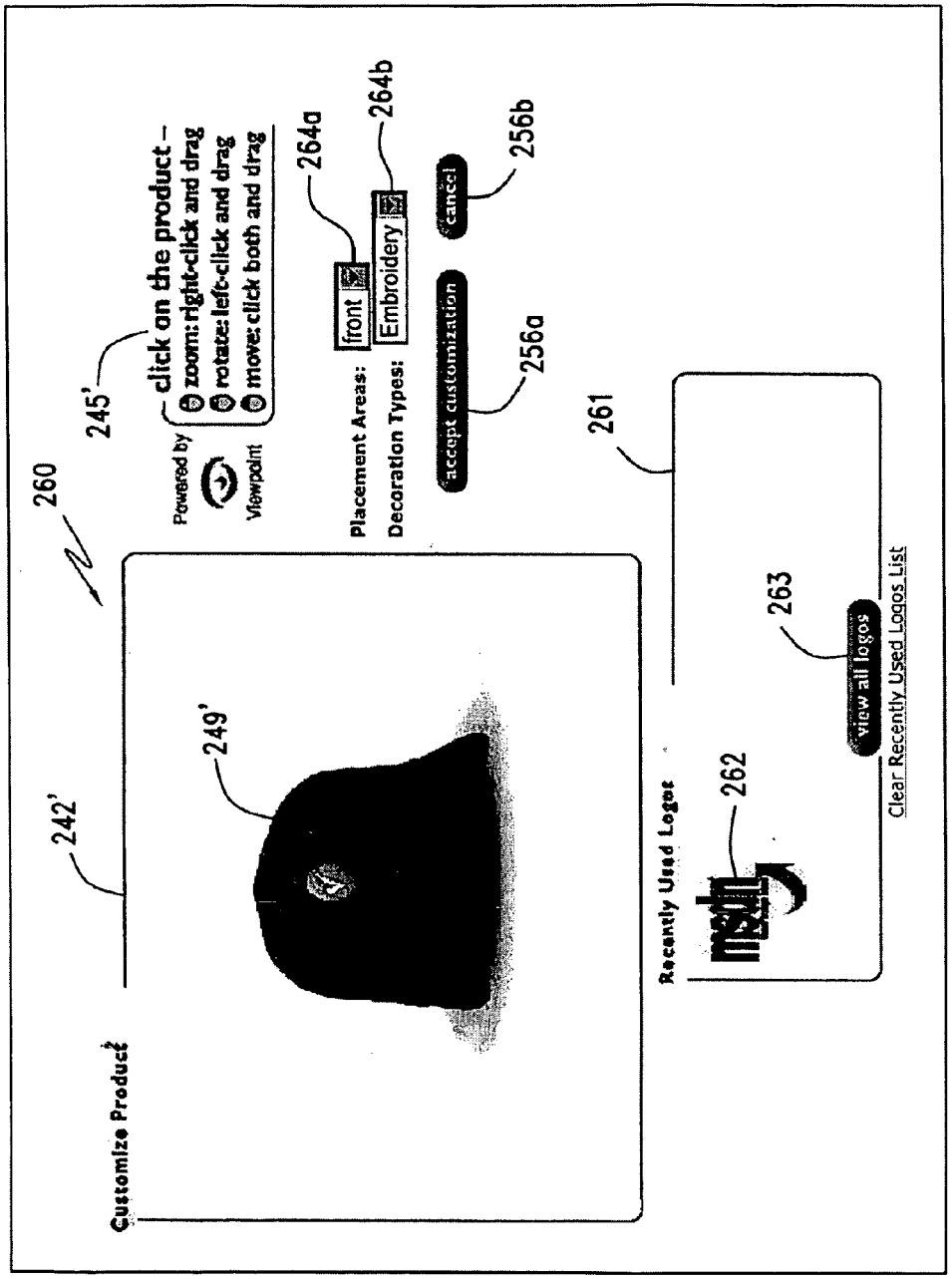
Figures 1, 3G:
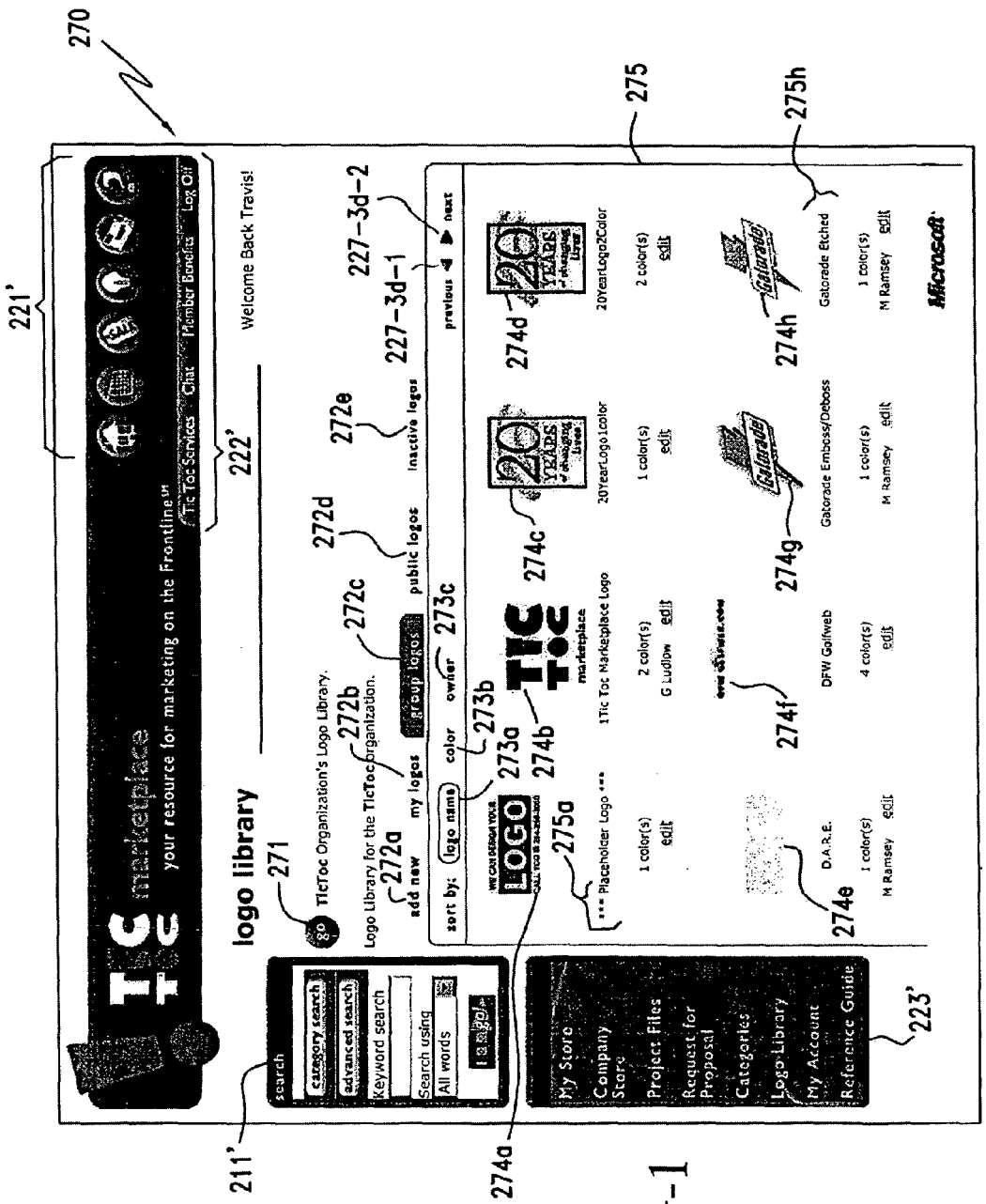
Figures 2, 3G:
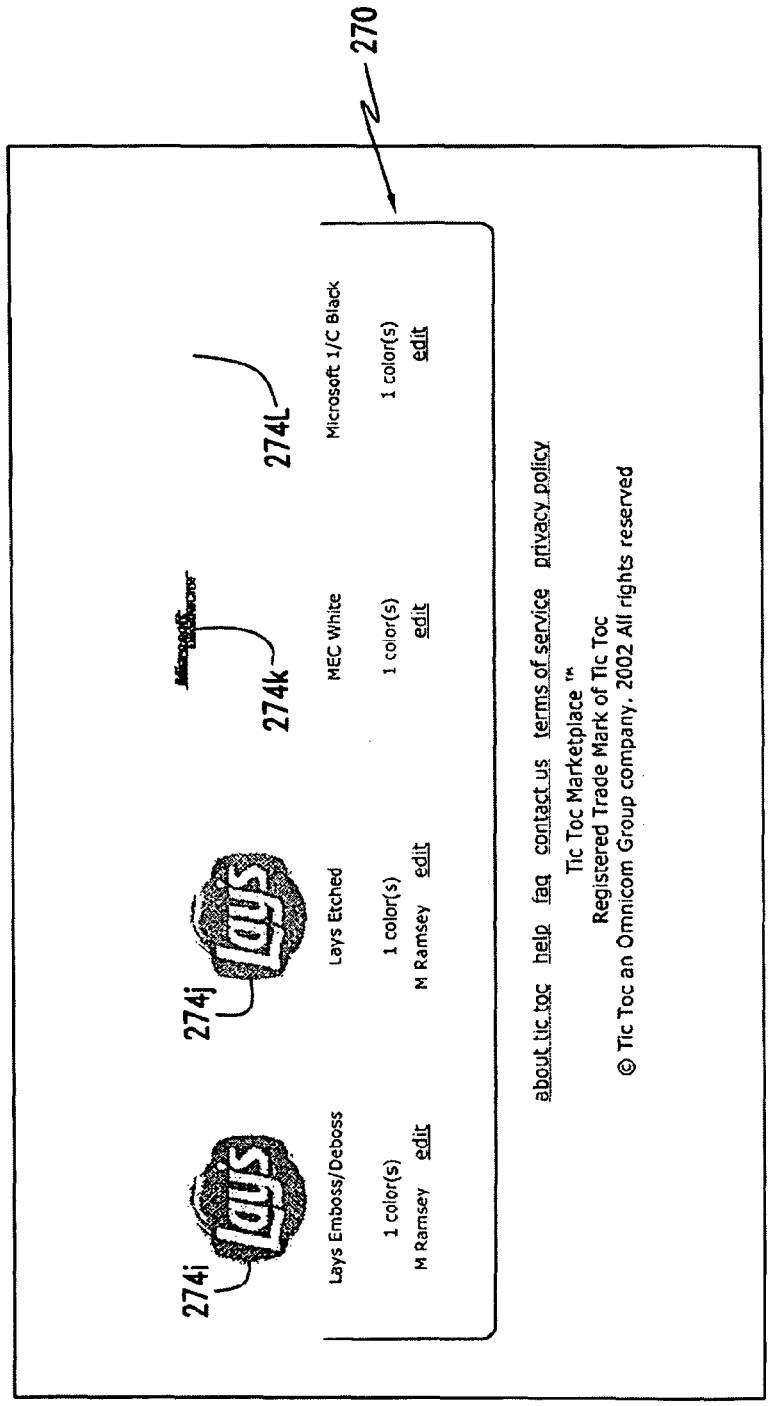

Next in step 116, the web page 260 is displayed as shown in FIG. 3F upon the buyer's terminal 16, wherein there is shown a window 261 containing the recently used logos. If the buyer wants to review other logos, he/she presses the "view all logos" button 263 to initiate step 116 and to display a logo library web page 270 on the buyer's terminal 16. Each buyer has a library of the logos that it's buyer is authorized to use, and that are stored in the data warehouse 26, as shown in FIG. 3G. Thus when the buyer actuates the "view all logos" button 263, the buyer's library in the data warehouse 26 is accessed and all of the authorized logos 274a-1 are displayed in a frame or window 275. Further, the programming underlying the window 270 permits a buyer to sort by buttons 273a, b and c to sort the logos by logo name, color and owner. Further, the buyer has an option to add new logos by actuating the button 272a, to pull up the logos of the buyer in step 272b, to identify a particular group of logos by actuating button 272c, to display public logos by actuating the button 272d, and to display the inactive logos by actuating button 272e. Further, the active one of the buttons may be changed by pressing the arrows 227-3d-1 and 227-3d-2.

Figures 1, 3H:
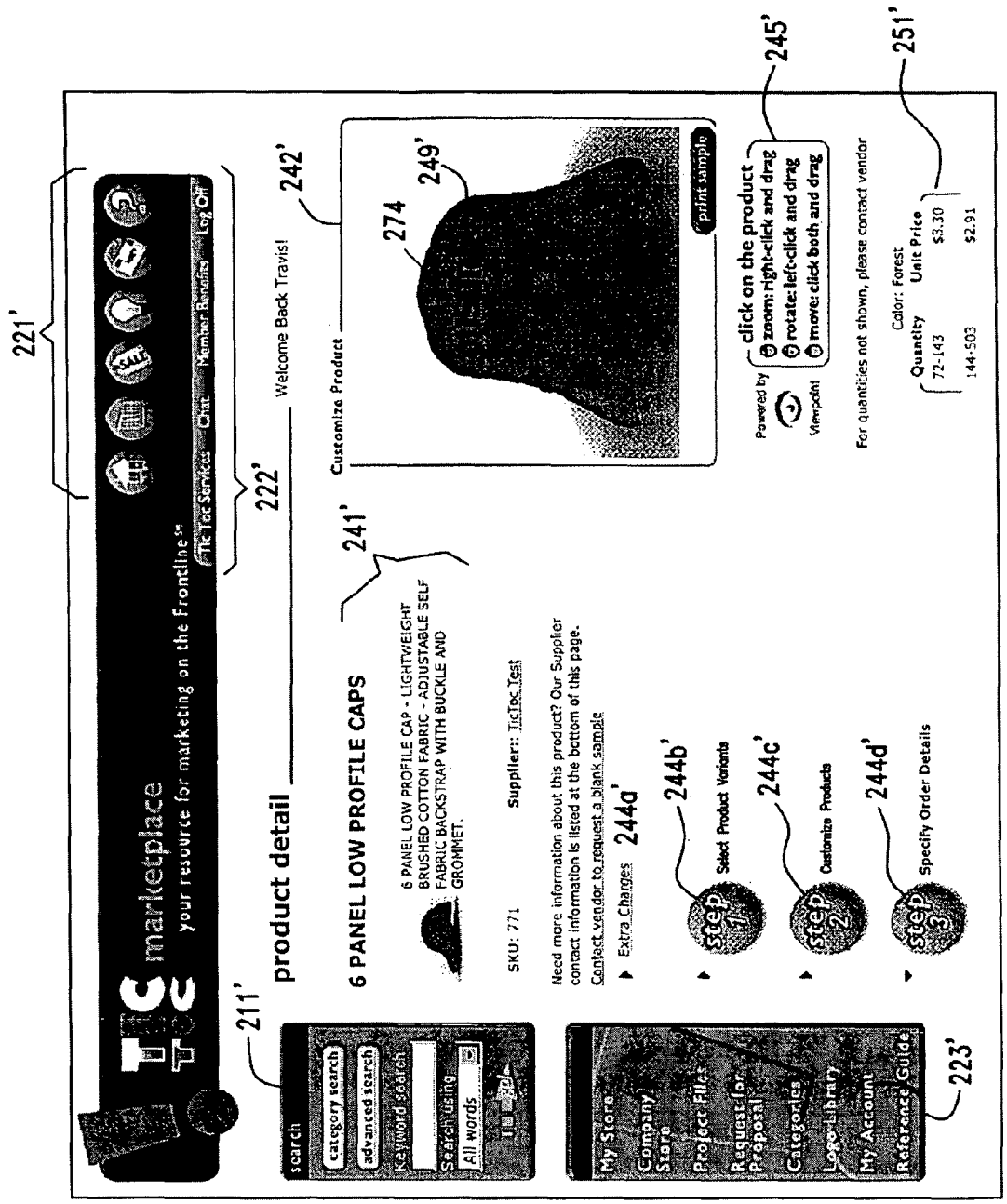

When the buyer clicks on to one of the markings 274a-1 (FIG. 3G) in step 116, the program moves to step 118, wherein the product detail web page 280 is displayed as shown in FIG. 3H upon the buyer's terminal 16 (FIG. 1). The web page includes a window 242', wherein the superimposed images of the selected product 249' and the selected logo 274 are shown. At this point in the process, the customizing of the particular product 249' has been completed, and the buyer clicks on to the "specify order details" button, whereby the product details may be viewed. For example, if the buyer would like to change the color of the product 249', he/she would again actuate the "select product variants" button 244b', whereby the various characteristics of the product 249 are displayed and may be changed as explained above.

Figures 1, 3I:
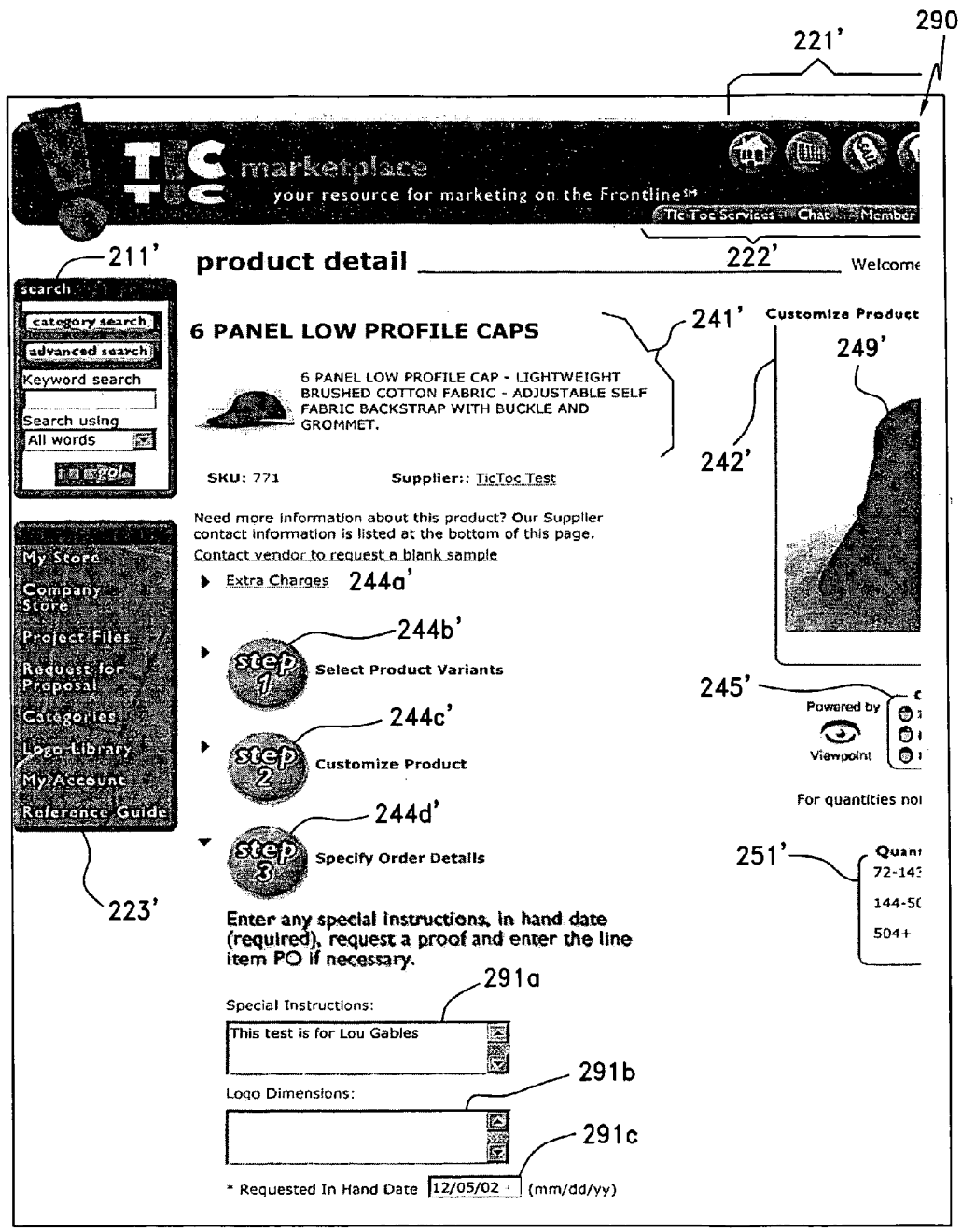
Figures 2, 3I:
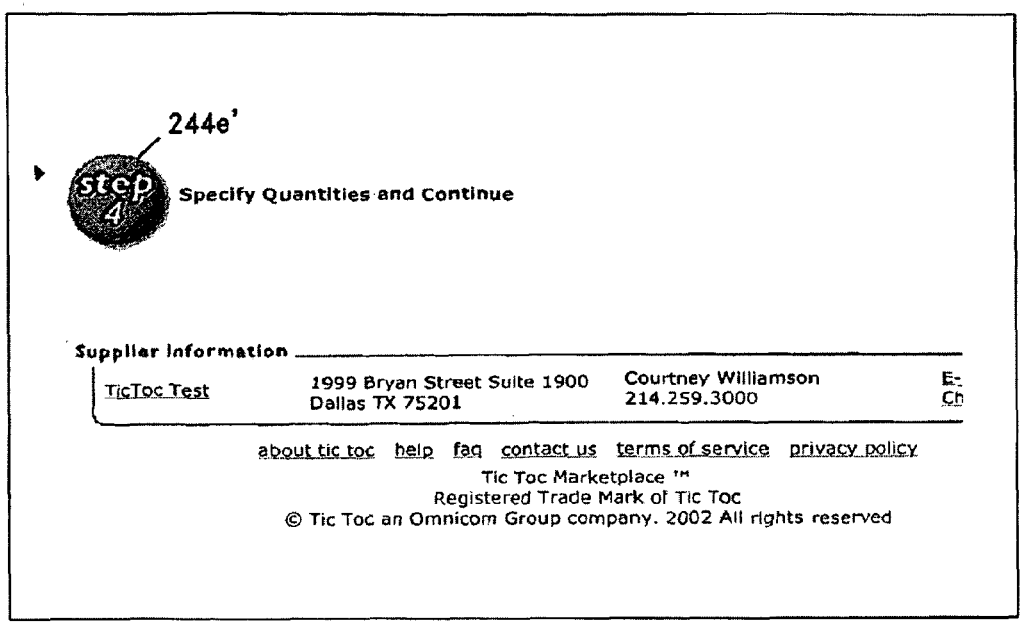

If the product 249' with the marking 274 thereon is acceptable, the buyer actuates the button 244e', whereby the program 100 moves to step 120, wherein any special instructions and/or the delivery date of the buyer are entered. In particular, a product detail web page 290 is displayed as shown in FIG. 3I on the buyer's terminal 16. The web page 290 includes a "special instructions" box 291a whereby a particular instruction with respect to the product 249' may be entered, a "logo dimensions" box 291b for permitting the entry of the dimensions of the logo, and a "delivery date" box 21c is provided to permit the buyer to enter the desired delivery date. To use these features, the buyer actuates the "specify order details" box 244d' and then enters it's instructions into the box 291a, or the logo dimensions into box 291b or the delivery date into box 291c. If the buyer is satisfied with the displayed product 249', the particular marking 274 and the relative position thereof, the buyer actuates the "specify quantities and continue" button 244e'.

Figure 3J:
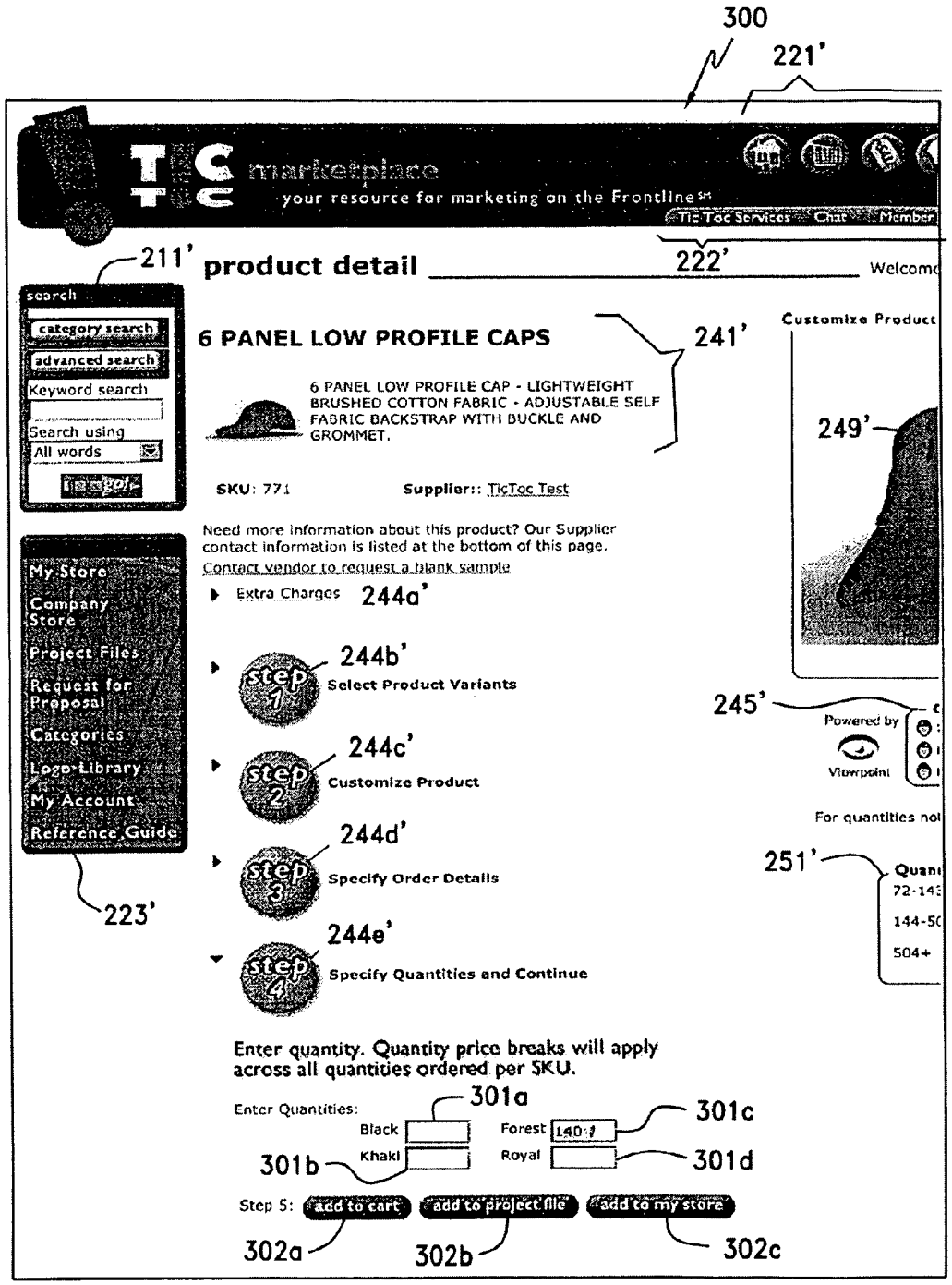

Upon actuating the button 244e' (FIG. 3I), the program 100 moves to step 122, wherein the desired quantity of the products is set. In particular, the product detail web page 300 is displayed as shown in FIG. 3J on the buyer terminal 16 and includes an array of boxes 301a-d, each representing a separate color of the product and permitting the entry by the buyer to a number of the products of a particular color which are desired. The web page 300 further includes an "add to cart" button 302a, an "add to project file" button 302b and an "add to my store" button 302c. If the buyer wishes to enter the quantity of products needed, he/she actuates the "specify quantities and continue" button 244e', and then inserts the number or quantity of products 249' into one or more of the boxes 301a-d depending on the color of the desired product.

Figure 3K:
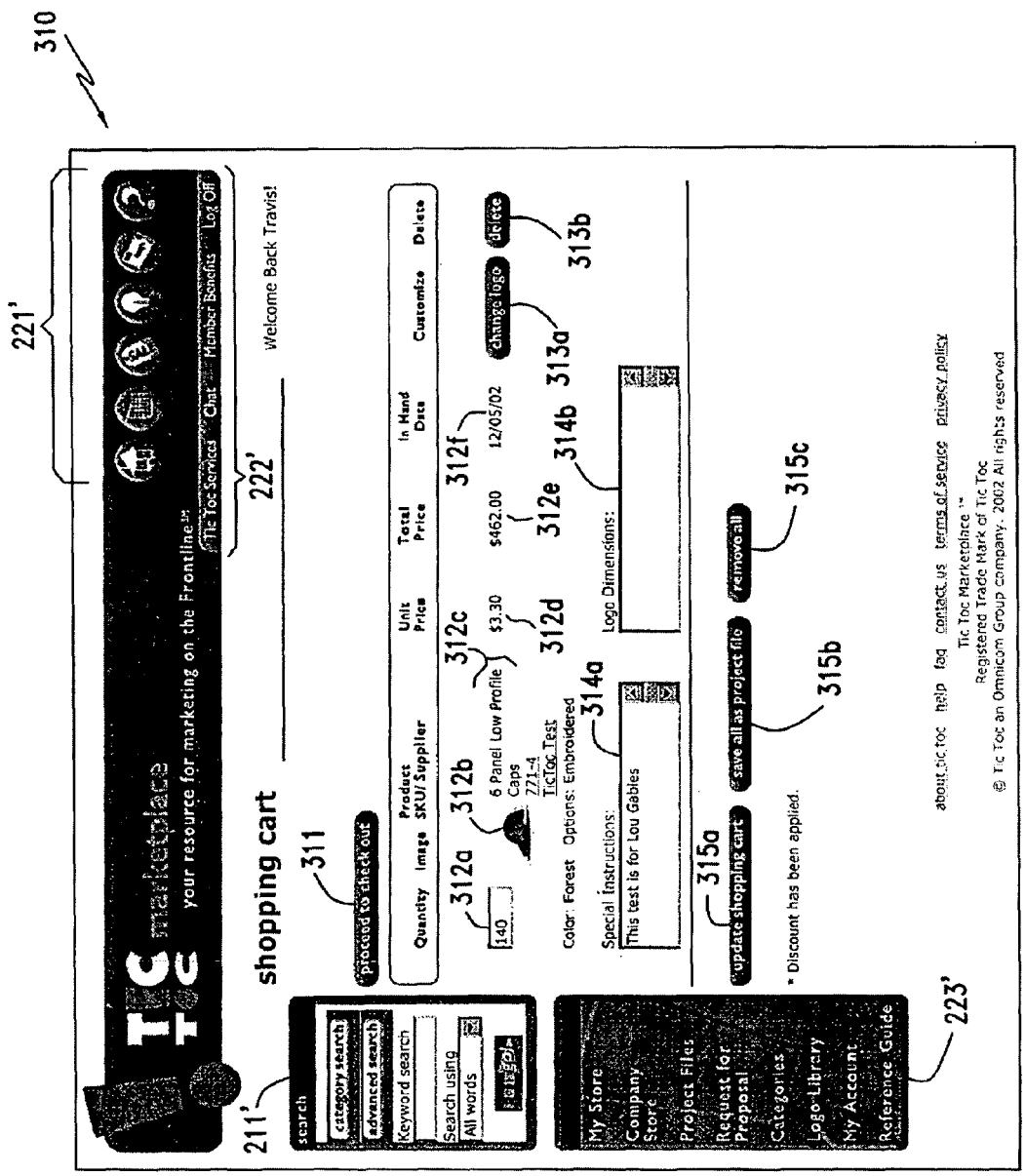

Upon pressing the "add to cart" button 302a (FIG. 3J), the program 100 moves from step 122 to step 124, wherein the shopping cart web page 310, as shown in FIG. 3K, is displayed upon the buyer's terminal 16. The web page 310 also displays a summary of the details of the buyer's order and includes boxes 312a-f for respectively displaying the quantity, product image, model and supplier, unit price, total price and delivery or in-hand date. Further, the buyer may enter special instructions into a box 314a and logo dimensions into a box 314b. Further, there is "change logo" box 313a and "delete" box 313b, whereby the buyer can change or delete a logo or marking. Thereafter, the buyer may enter special instructions in the box 314a or the logo dimensions in box 314b. If the product order has been changed, then the buyer will actuate the "update shopping cart" 315a. Further, it is appreciated that the order data may also be saved as a project file or a file for the MyStore feature. In particular the buyer can actuate the "save all as project file" button 315b whereby the data is saved in the project file. Still further, the buyer may hit the "remove all" button 315c to remove the previously entered order data. After the buyer has reviewed the order information and has found it to be satisfactory, he/she may hit a "proceed to checkout" button 311.

Figure 3L:
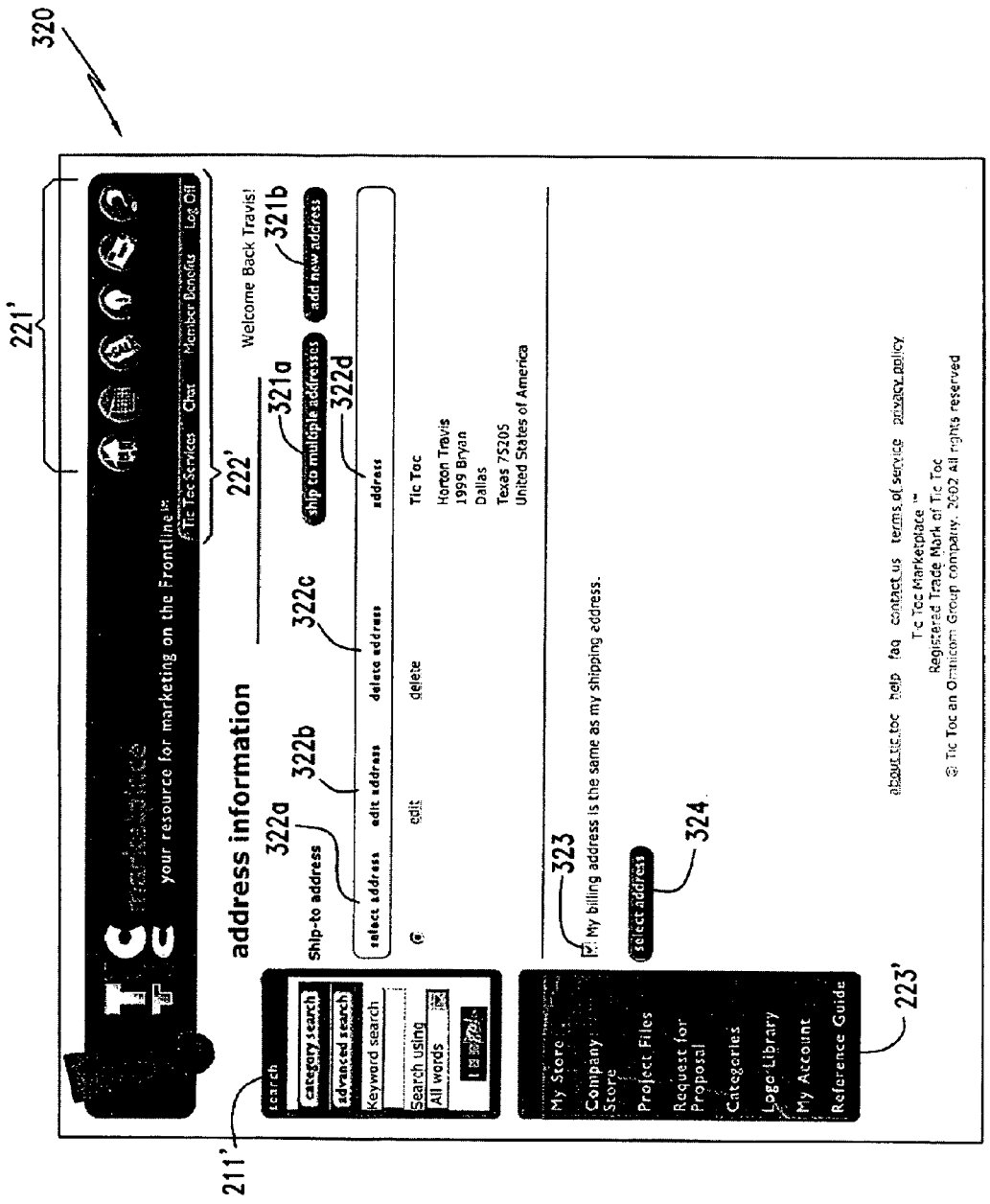

When the "proceed to checkout" button 311 is actuated, the program 100 moves from step 124 to step 126 (FIG. 2), wherein an address information web page 320 is displayed as shown in FIG. 3L upon the user's terminal 16. The web page 320 includes a "select address" button 322, an "edit address" button 320b and a "delete address" button 322c, whereby the buyer may input it's address data into an address column 322d. If the buyer's billing address is the same as the shipping address entered above, the buyer actuates the button 323, otherwise the buyer will actuate a "add new address" button 321b whereby a new, shipping address may be added. Further, if the products and/or services are to be shipped to different addresses, the buyer will actuate a "ship to multiple addresses" button 321a and then click on the "add new address" button 321b, whereby one or more additional addresses may be entered. If all of the address information has been inputted by the buyer, he/she actuates a "select address" button 324 whereby the address information is saved.

Figures 1, 3M:
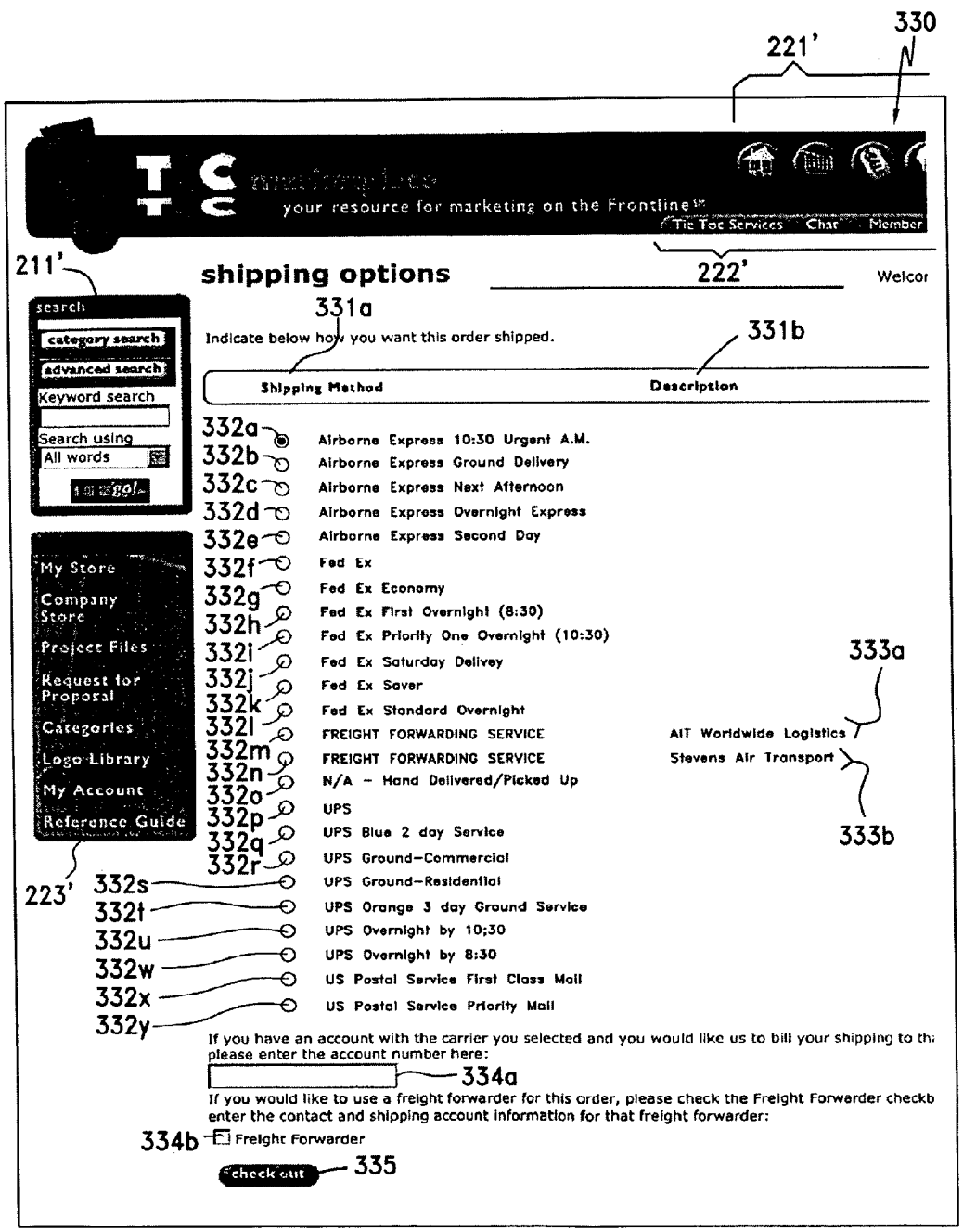
Figures 2, 3M:
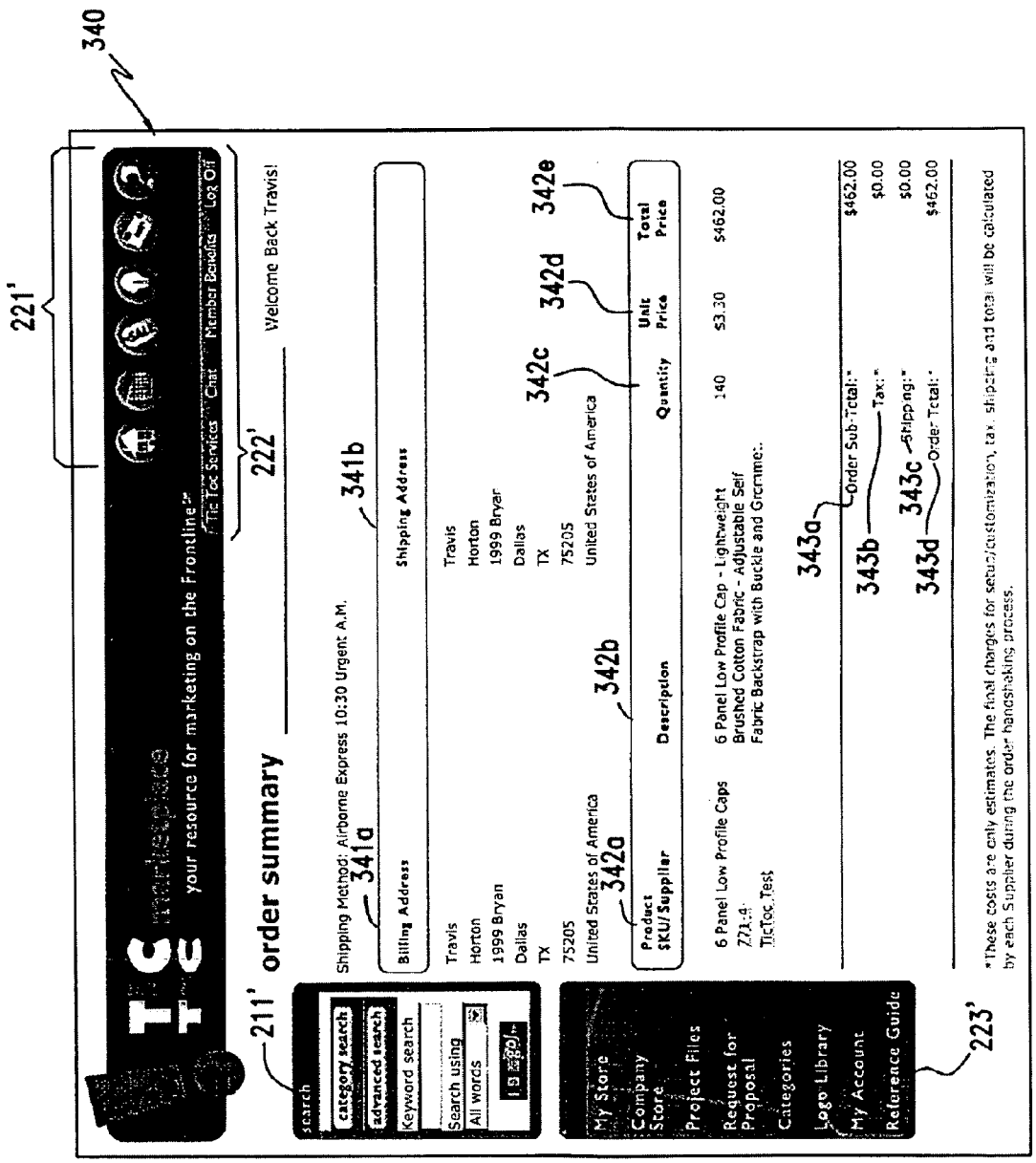
Figures 3, 3M:
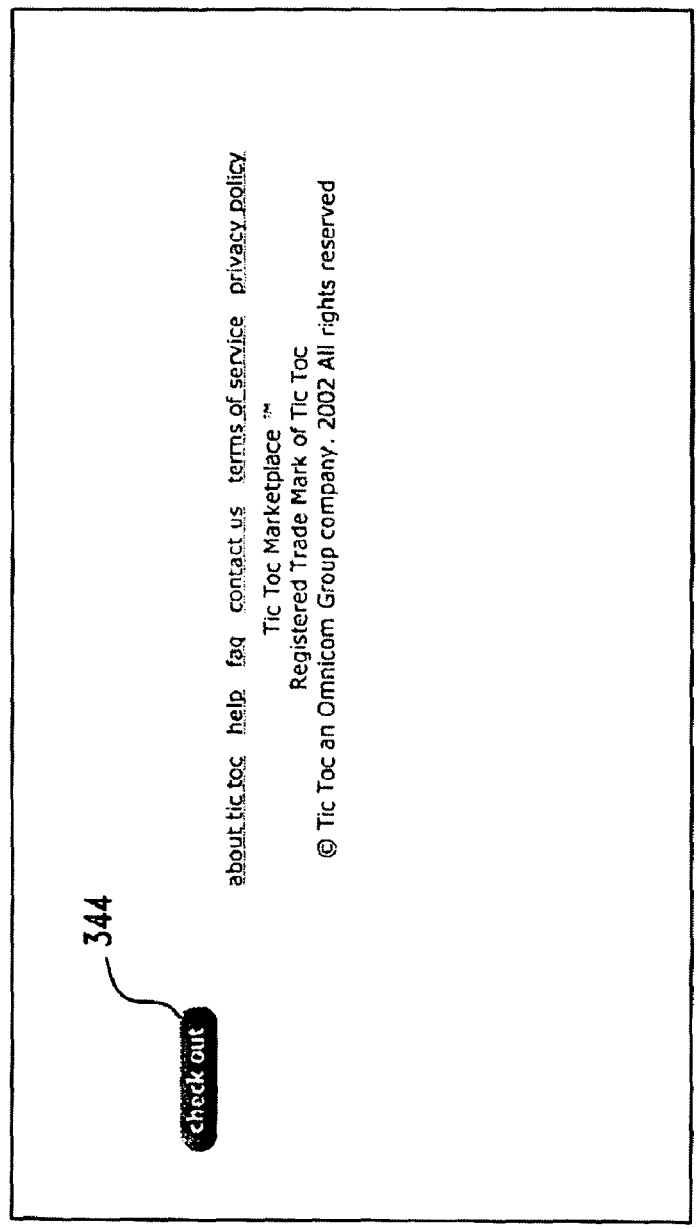

When the "select address" button 324 is actuated (FIG. 3L), the program moves from step 126 to step 128, wherein a shipping options web page 330 is displayed as shown in FIG. 3M upon the user's terminal 16 and facilitates the buyer's entry of shipping information into the E-Commerce System 10 and in particular to the active directory 32 (FIG. 1). In particular, the web page 330 includes a plurality of buttons 332a-y, which as seen in FIG. 3M provides various options for shipping the product and/or services; in particular, the buyer can actuate on one of these buttons 332a-y to define the type of shipping that the buyer requires. Further, the web page 330 includes display space wherein descriptions 33a and b of the shipping service may be presented. In addition, the web page 330 includes a box 334a, wherein the buyer's account with a particular carrier may be entered, and a box 334b which may be actuated by the buyer to indicate that a freight forwarder for this particular product order is desired. After all of the shipping information has been entered by the buyer, he/she actuates a "check out" button 335.

When the "check out" button 335 (FIG. 3M) has been actuated, the program 100 moves from step 128 to 130, wherein the buyer finally reviews a particular order before submitting it for transmission to a particular supplier, and an order summary web page 340 as shown in FIG. 3M is displayed on the buyer's terminal 16. In particular, the web page 340 includes a display area 341a for the buyer's billing address, a display 341b for displaying a buyer's shipping address, an area 342a for displaying the product number (or SKU) and the name of the supplier, an area 342b for displaying a description of the product, an area 342c for displaying the quantity or number of ordered products, an area 342d for displaying the unit price and an area 342e for displaying the total price of the order. An area 343a is provided to display the total order subtotal, an area 342b for tax, an area 343c for shipping and an area 343d for the cost of the total order. The buyer reviews this order summary and if a particular aspect of the order needs change, he/she may actuate a backup button, whereby the program 100 may return to the "add to basket" step 124 wherein changes may be made to the product and/or service order. On the other hand, if the order as displayed on the web page 340 is satisfactory, the buyer may actuate a "check out" button 344.

Figure 3N:
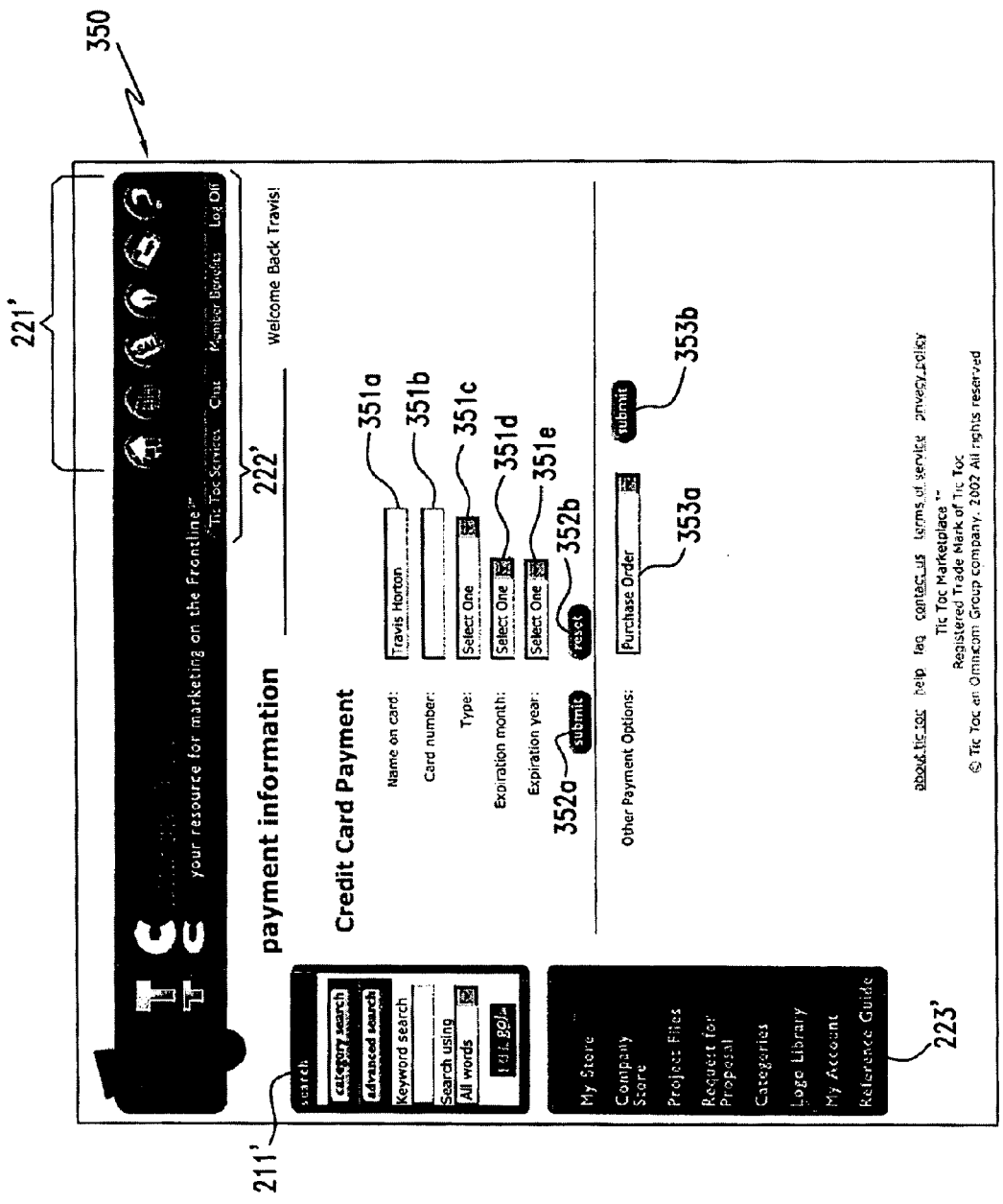
Figure 30:
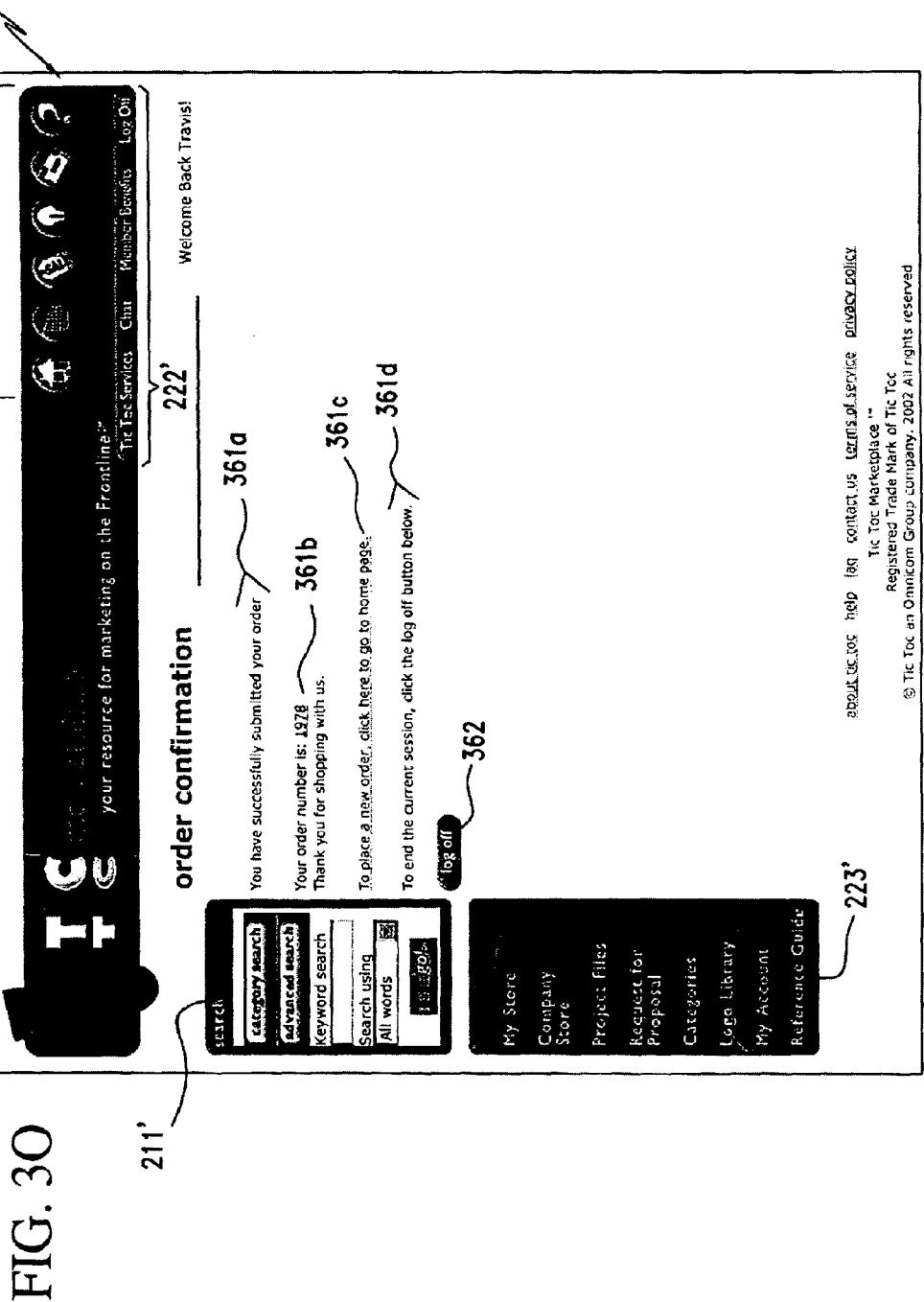

When the "check out" button 344 (FIG. 3M) is actuated, the program 100 (FIG. 2) moves from step 128 to 130, wherein a payment information web page 350 bearing the buyer's credit card payment information is displayed as shown in FIG. 3N on the buyer's terminal 16 and the approved order is transmitted to a selected supplier. In particular, the logo page 350 includes a box 351a for receiving the name as it appears on the buyer's credit card, a box 351b for receiving a credit card number, a box 351c for receiving the type or brand of credit card, a box 351d for receiving the expiration month, and a box 351e for receiving the expiration year. In addition, the web page 350 includes a box 353a for receiving information as to other methods of payment, e.g., a purchase order. After the method of payment has been entered, the buyer submits it's credit card information by actuating a "submit" button 352a. If the buyer is submitting a purchase order, he/she may actuate a "submit" button 353b. The buyer has the further option of resetting the information by actuating a "reset" button 352b.

When either the "submit" button 352a or the "submit" button 353b (FIG. 3N) is actuated, the program 100 (FIG. 2) moves from step 130 to 134, wherein the order is confirmed and transmitted to a selected supplier or vendor through the retail site 26c of the Internet information server 20. In step 134, the buyer evaluates it's order and checks that the order has been satisfactorily submitted to a particular supplier. Step 134 confirms the safe receipt of this order by generating an order number and displaying it in a box 361b. If the buyer wishes to place a new order, he/she may click onto a box 361c whereby the program 100 returns to the buyer's homepage 104 (FIG. 3O) to initiate a new search. To terminate the buyer's current section with the E-Commerce System 10, the buyer actuates a "log off" button 362.

The web pages of FIG. 3, as described above, transmit data and information to and from the buyer via it's terminal 16. In FIG. 4, the web pages that are particularly adapted to transmit and receive information and data from and to one of the vendors or suppliers are shown. Referring now to FIG. 4A, there is shown a vendor login web page 370, which as displayed on the vendor's terminal 14 and controls the supplier's access to the vendor site 22b of the information server 20 (FIG. 1). In particular the web page 370 includes a "vendor name" box 371a for submitting the name of the supplier seeking access to the system 10, and a "password" box 371b for entering the password of this supplier. After the entry of data into the boxes 371a and b, the supplier may actuate a "submit" button 372a, whereby the supplier's name and password are transmitted to the active directory 32 for comparison with the previously stored name and password. If there is a match as determined by the active directory 32, this supplier is permitted access to the vendor site 22b.

If access is given to the buyer, the buyer can login to it's homepage 390, which is displayed as shown in FIG. 4B on the vendor's terminal 14. The homepage 390 lists the potential activities in which the supplier may engage by actuating one of the buttons 391a to k. If the supplier actuates the "orders" button 391g, the program 100 will move to the step 136, wherein the supplier may confirm the buyer's order and submit changes to that order, if needed. When the supplier actuates the "order's" box 391g (FIG. 4B), the program 100 moves to a list of orders web page 380 as shown in FIG. 4C. In particular, the web page 380 generates a list of the supplier orders and a description thereof. In particular, there is a column 382a for the number of each of the vendors' orders, a column 382b for the status of each of the vendors' orders, a column 382c for the name of the buyer issuing the order, a column 382d for listing the total price of the order, and a column 382e for listing the date of it's order. Further, the web page 380 includes a "search by status" box 381a, which may effect a search of the supplier's orders by various parameters, e.g., all orders, by actuating a "find" button 381b.

As shown in FIG. 1, the retail site 26c is part of the interface between the vendor site 22b and the buyer site 22a. When a supplier desires to see the list provided by the web page 380, it sends a request through the retail site 26c, requesting that list. In turn, this list or orders is downloaded via the retail site 26 to be displayed upon the vendor's terminal 14. When the supplier inserts a particular order number into the box 381a and actuates the "find" button 381b, an order detail web page 400 is accessed and is displayed as shown in FIG. 4D upon the vendor's terminal 14. In particular, the web page 400 has a series of boxes 401a-w for receiving information about different aspects of the selected order. Of particular interest are box 401a which indicates that the order is ready for the buyer's approval, box 401b that indicates the order is being processed and box 401c that indicates the entire order has been shipped and the selected order is fulfilled. Typically, the supplier will review the various terms of the buyer's proposed order and can fill in one of the boxes 401a to w if it has not been completed or the supplier wishes to change it. After a buyer's order has been reviewed and approved by the supplier, the supplier actuates the box 401a, whereby a message, e.g., typically in the form of an email, is transmitted to the particular buyer that issued the order, informing the buyer that it's supplier has reviewed it's order and that the buyer may now access and respond to the reviewed order.

In an example of this invention, the order of interest to the supplier is 1976 and it's status is indicated initially as being that of a new order. After the order 1976 has been processed and reviewed by the supplier, the supplier can enter the order number into the box 381 (FIG. 4C) and actuate the "find" box 381b. The supplier after reviewing the order as displayed on the order detail web page 400 as shown in FIG. 4D, actuates the box 401a to indicate that the supplier has reviewed the buyer's order, and if necessary has made changes thereto. As a result, the status of the order 1978 has changed from being a new "order": as indicated in the status column 382b of the list of orders web site 380, to "pending buyer approval" as indicated in the status column 412b of the list of orders web page 410 as shown in FIG. 4E. The status of the order 1978 will remain "pending buyer approval" until the buyer approves this order. When a change of status has occurred, the retail site 26c of the Internet information server 20 (FIG. 1) is programmed to send an email to the vendor, e.g., to be received at the vendor's terminal 14, thereby alerting the vendor that the particular order 1978 is ready for the vendor's approval.

Figure 3P:
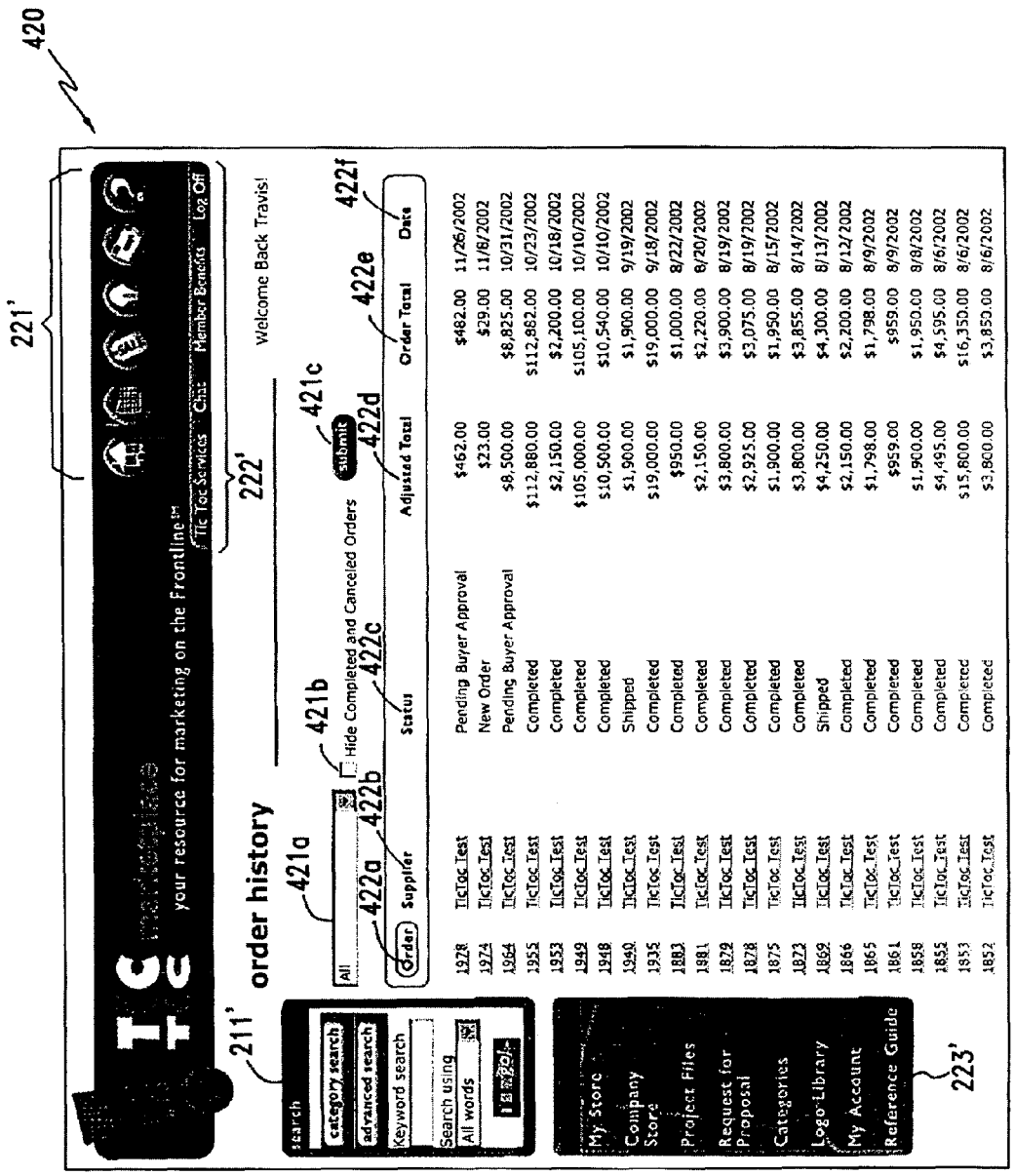
Figures 1, 3Q:
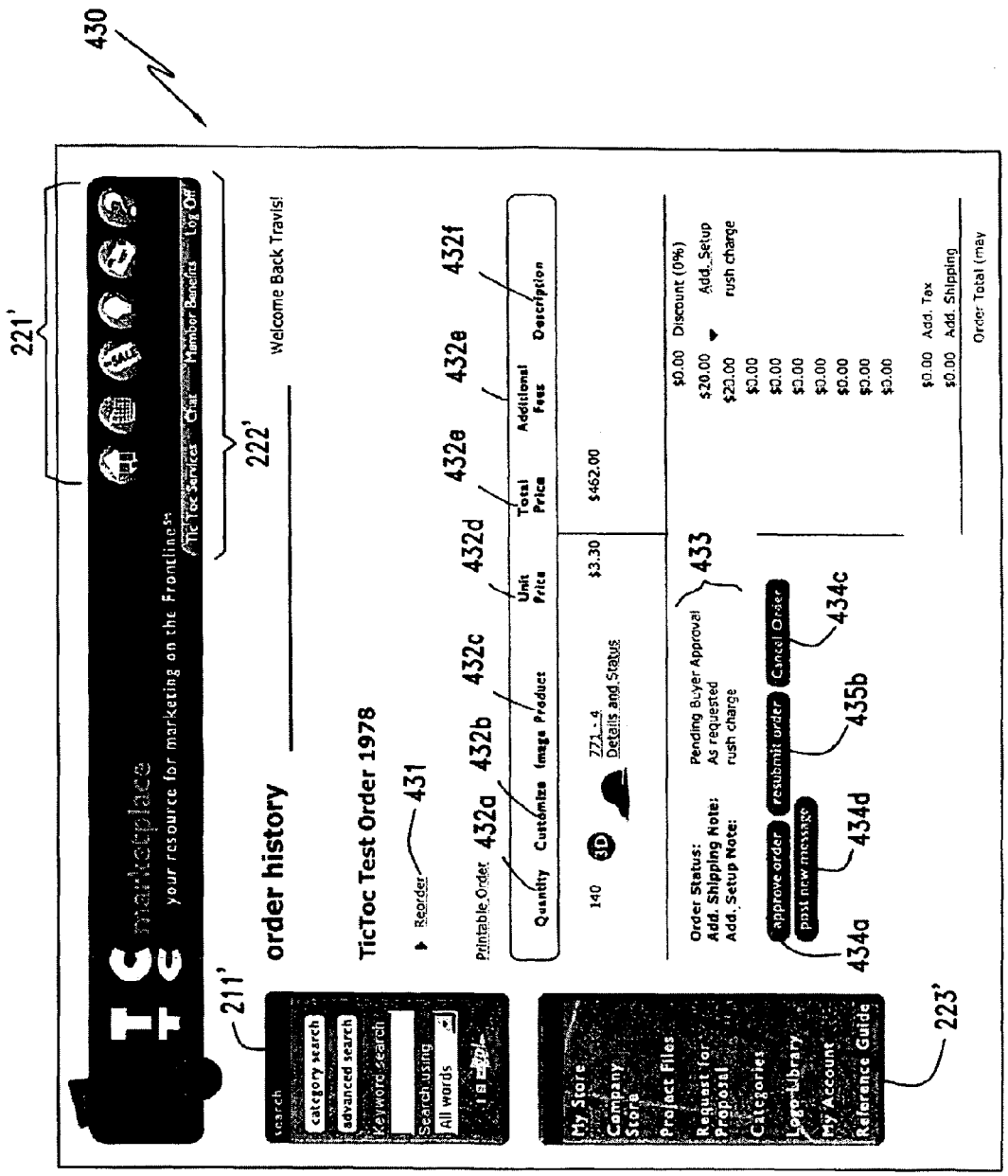
Figures 2, 3Q:
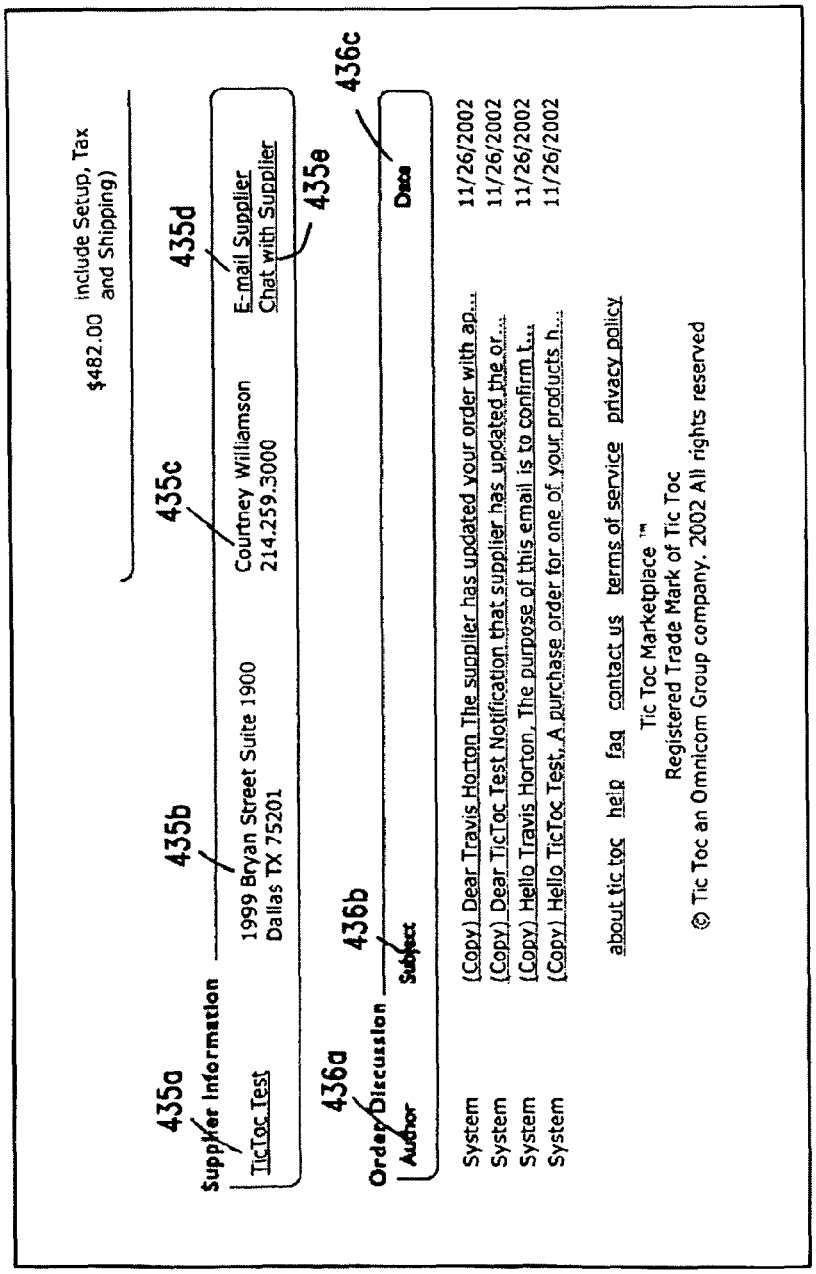

Next in step 138 (FIG. 2) after a buyer has received it's notification of a change of a status of one of it's orders, the buyer via it's terminal 16 accesses it's buyer site 22a (FIG. 1) and causes it's order history web page 420 as shown in FIG. 3P to be displayed on it's buyer's terminal 16. When the status of an order of a buyer changes, the retail site 26c (FIG. 1) is programmed to generate and transmit an email message to that buyer alerting that buyer to the change in one of it's orders. Responding to that email, the buyer accesses it's vendor site 22b and brings up for display the buyer's order history web page 420 as shown in FIG. 3P. In particular, the buyer clicks onto it's order 1978, whereby the next order history web page 430 as shown in FIG. 3Q is displayed on the buyer's terminal 16. In particular, the buyer notes the order status 433 and that the order 1978 has changed it's status from "new order" to "pending buyer approval". The buyer has four options corresponding to an "approve order" button 434a, a "resubmit order" button 434b, a "cancel order" box 434c or a "post new message" box 434d.

Figure 3R:
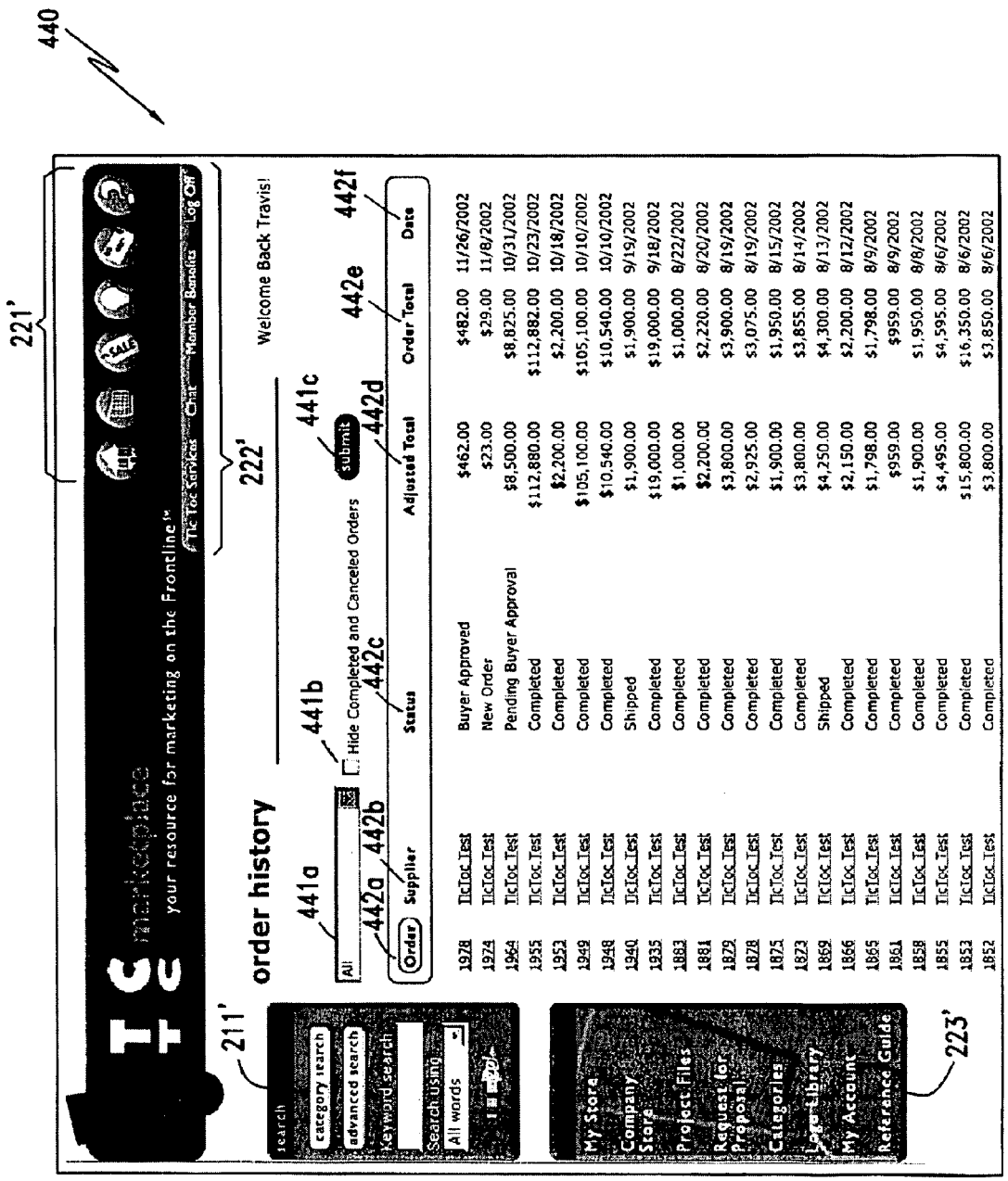
Figure 3S:
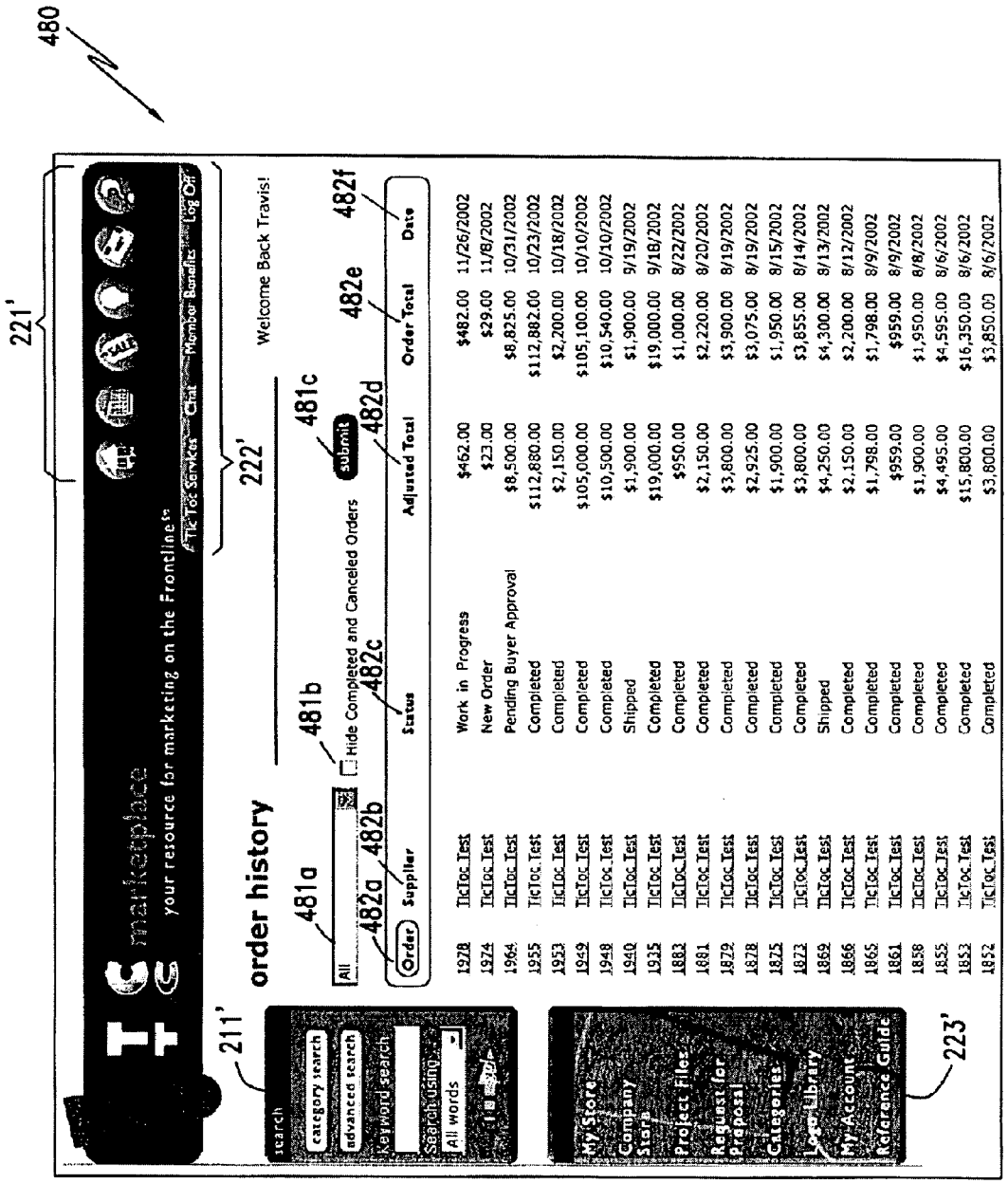
Figure 4F:
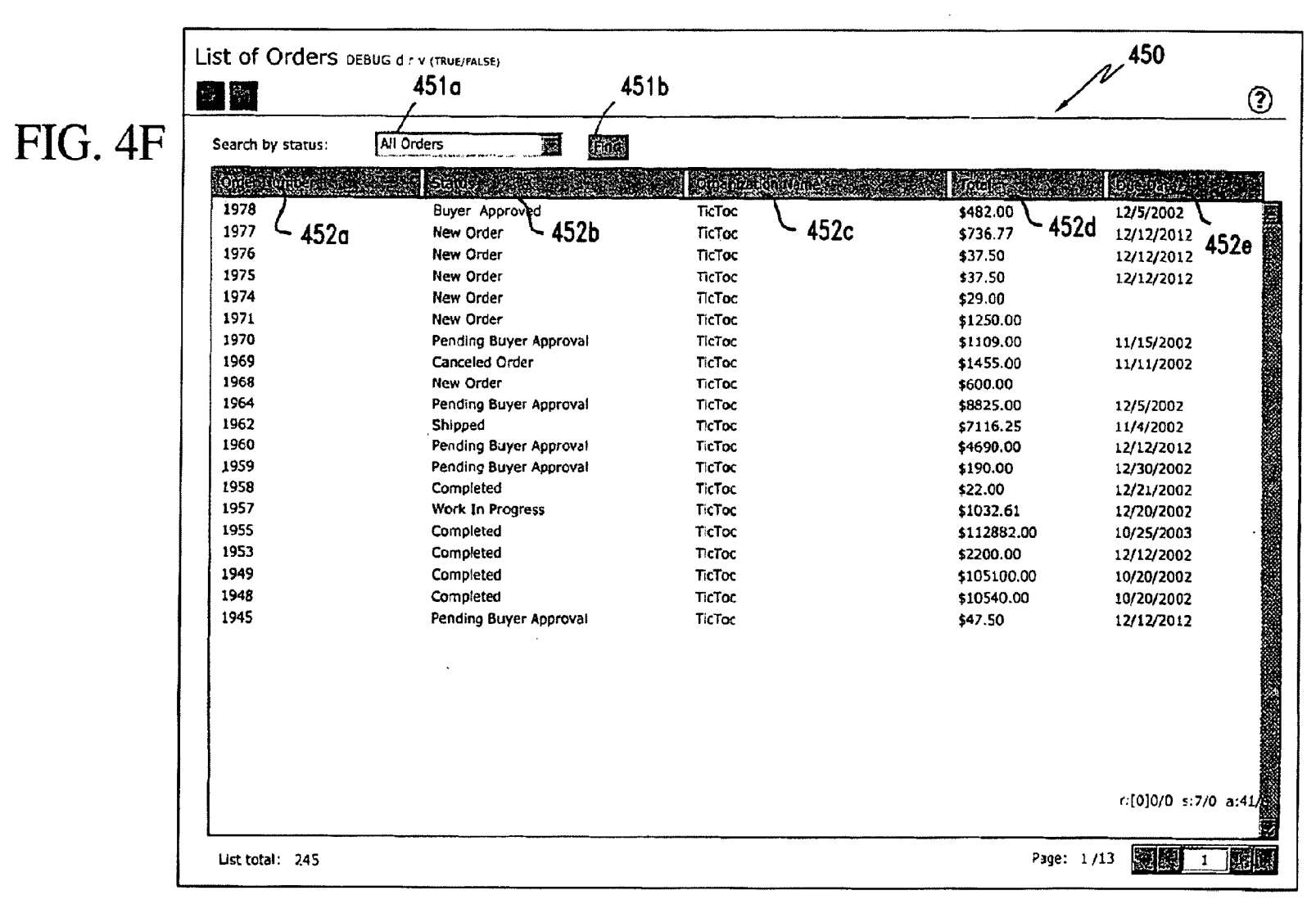

If the buyer finally approves the order 1978 as reviewed and/or changed by the supplier and actuates the "approve order" button 434a, an order history web page 440 is displayed as shown in FIG. 3R on the buyer's terminal 14, and the status of the order 1978 changes as shown in column 442c from "pending buyer approval" as shown on the web page 430 (FIG. 3Q) and on the web page 420 as shown in FIG. 3P, to "buyer approved" as shown in the "status" column 442c of the order history web page 440 as shown in FIG. 3R. The change of status of the order is inputted and stored in the data warehouse 36 under the control of the retail site 26c (FIG. 1). In particular the site 26c responds to this status change and sends an email message to the supplier designated in this order. This supplier responds to the email message by calling up it's list of orders web page 460 that is displayed as shown in FIG. 4F on the vendor's or supplier's terminal 14 and proceeds to click on the 1978 order, whereby an order detail web page 460 as shown in FIG. 4G displays upon the vendor's terminal 14 the details of the 1978 order and, in particular, indicates in the box 461d that the status of the order 1978 is "buyer approved". In step 140 if the supplier also approves the order, the supplier accesses the box 461d and changes the status from "buyer approved" to "work in progress", whereby the retail site 26c, i.e., the interface of the E-Commerce System 10 as shown in FIG. 1, transmits an email from the site 26c to both the buyer and supplier of this particular order indicating this further change of status of the order 1978. The supplier is prompted by this email to access it's list of orders web page 470, which is displayed as shown in FIG. 4H on the supplier's terminal 14, whereby the change of status to "work in progress" is indicated in the status column 472b of the web page 470 for the order 1978. Similarly, the buyer of order 1978 can access it's order history web page 480 as shown in FIG. 3S that may be displayed on the buyer's terminal 16 and is apprised that the status has changed to "work in progress" as shown in the status column 482c for the order 1978.

Figure 4I-1:
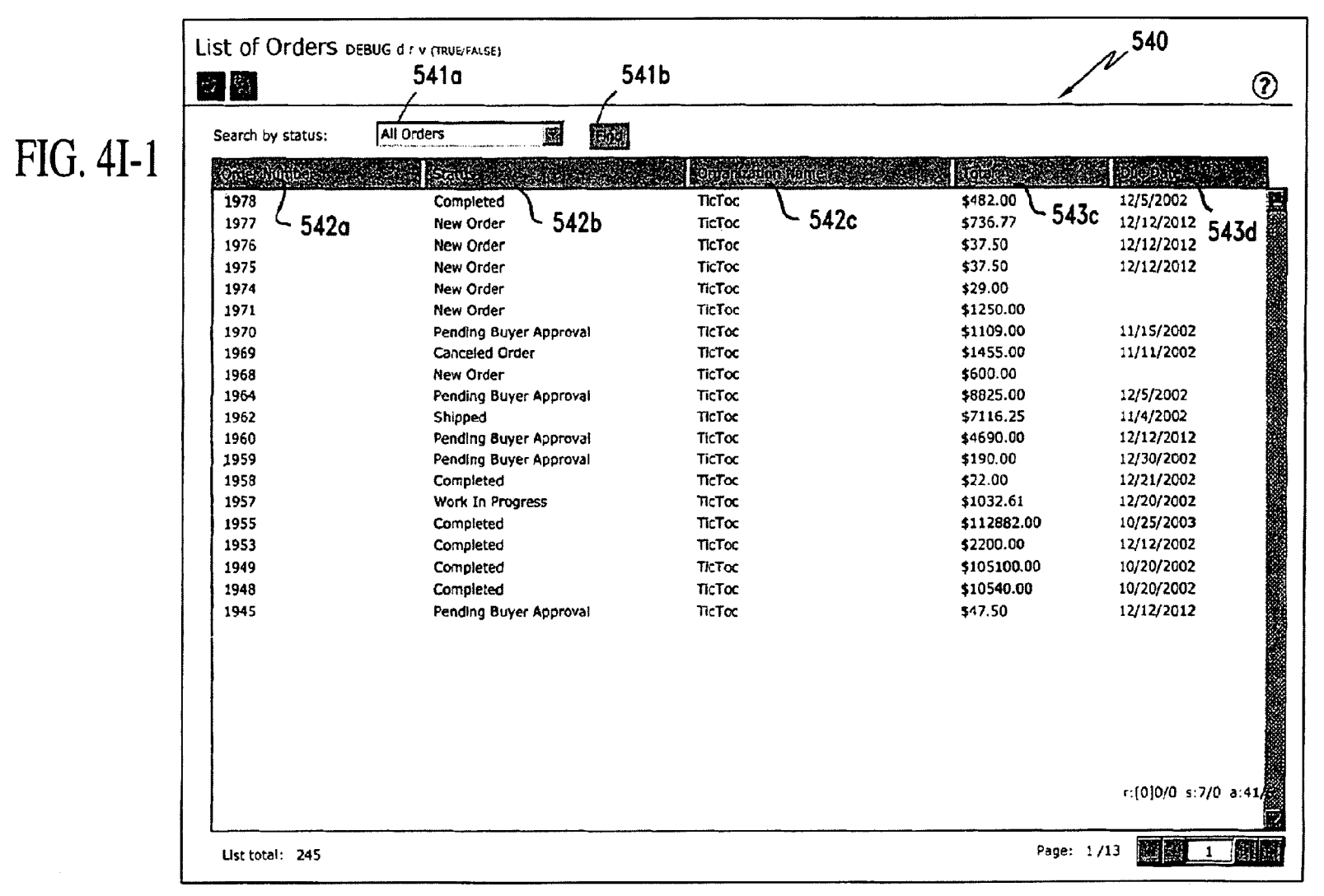

In step 140, the supplier initiates fulfilling the order by accessing it's order detail web page 490 that is displayed as shown in FIG. 4I on the vendor's terminal 14 and actuating the box 491b to indicate that the "order is being processed".

Figure 3T:
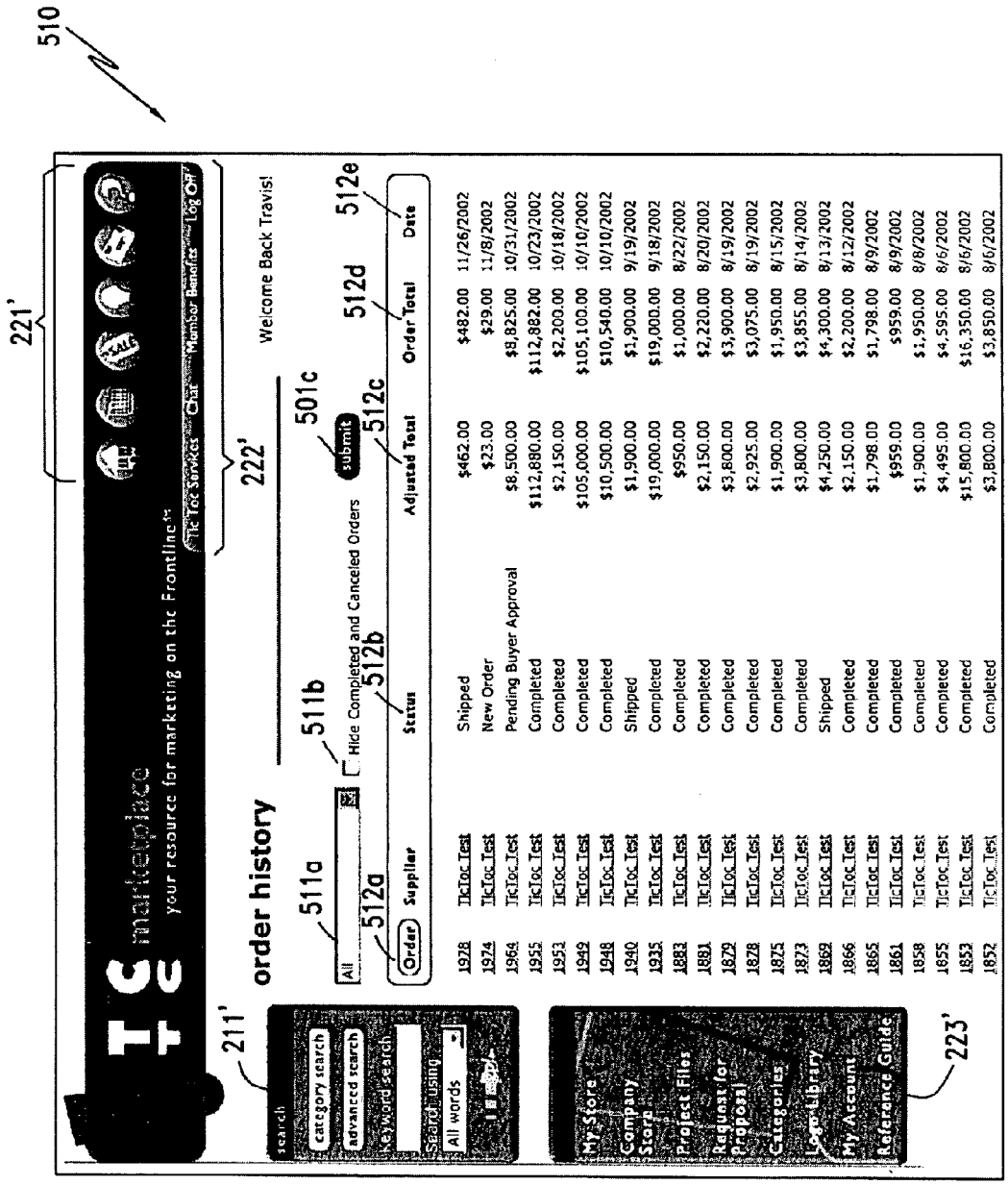
Figures 1, 3U:
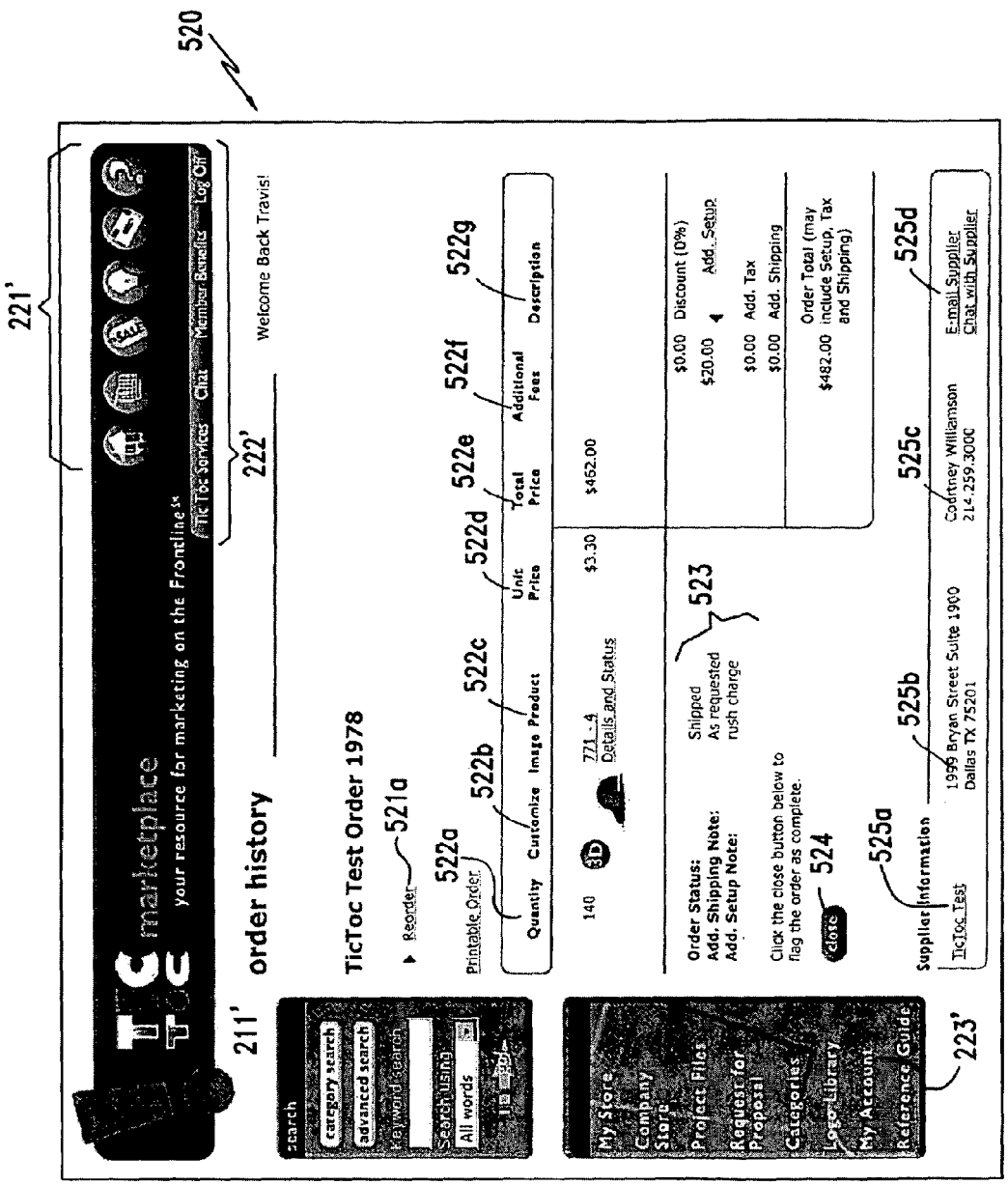
Figures 2, 3U:
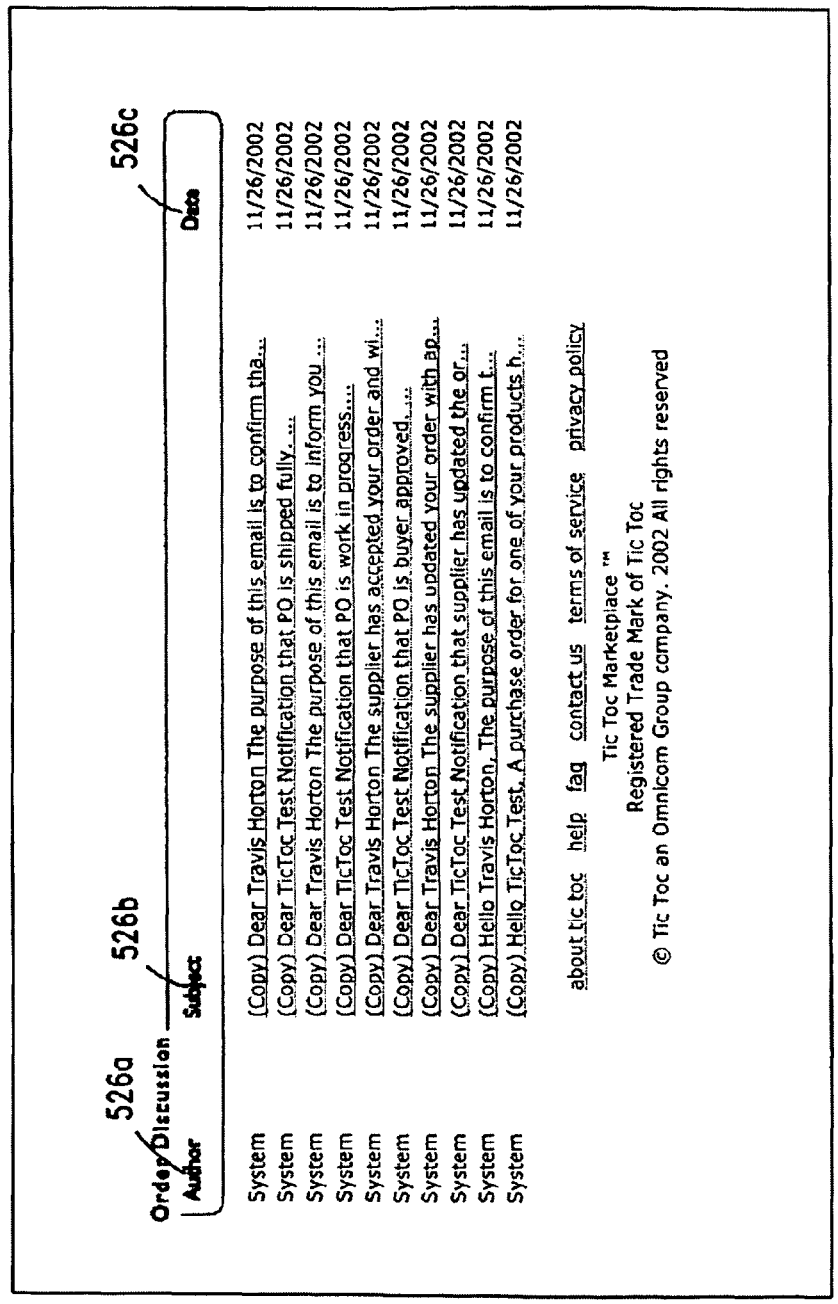

When the order has been completed and shipped, the supplier will now actuate the box 981c to confirm to the system 10 that the "entire order has been shipped". At this point, the retail site 26c (FIG. 1) causes a change in the interface and in the data stored in the data warehouse 36 to indicate that the order has been shipped as reflected in the status column 502b of the web page 500 as shown in FIG. 4J. Upon changing the status to "shipped", the retail site 26c also sends an email message to the buyer at it's terminal 16 indicating a change of status. Upon receipt of this email, the buyer accesses it's order history web page 510 as shown in FIG. 3T and observes in the status column 512b that the order 1978 has been shipped. In step 144, the buyer confirms receipt of the product by pulling up it's order history web page 520 as shown in FIG. 3U and changes the status as shown in area 523 from "shipped" to "completed" as now also indicated in the order history web page 530 as shown in FIG. 3V. The retail site 26 is responsive to the change of status of the order 1978 to "completed" by informing the buyer through it's order history 530 that the status of the order has changed to "completed" and by informing the supplier through it's list of orders 540 as shown in FIG. 4I that likewise the order 1978 is completed as shown in the status column 542b. Likewise, an email message is sent in step 144 (FIG. 2) to the service provider of the E-Commerce System 10 indicating that the particular order, i.e., order 1978, has been completed, whereby the service provider invoices the supplier for a commission. In an illustrative embodiment of this invention, the commission may be a certain percentage of the total sale price of the order. Finally in step 148, the supplier invoices the buyer for the price of the order.

Figure 5:
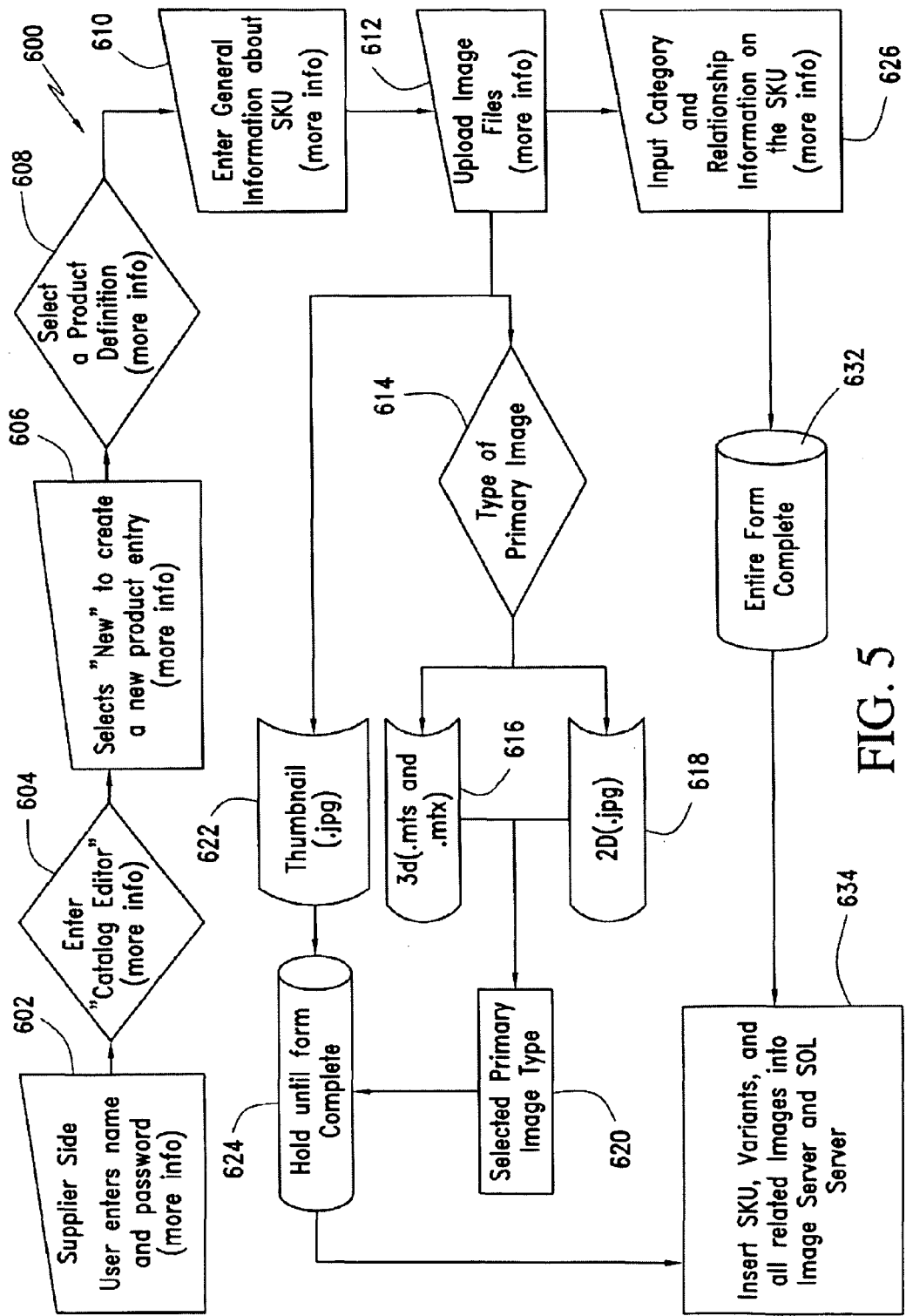
FIG. 5 is a flow diagram that illustrates how new items are added to the catalog(s) of a selected supplier and stored in a data warehouse as shown in FIG. 1.
Figure 6A:
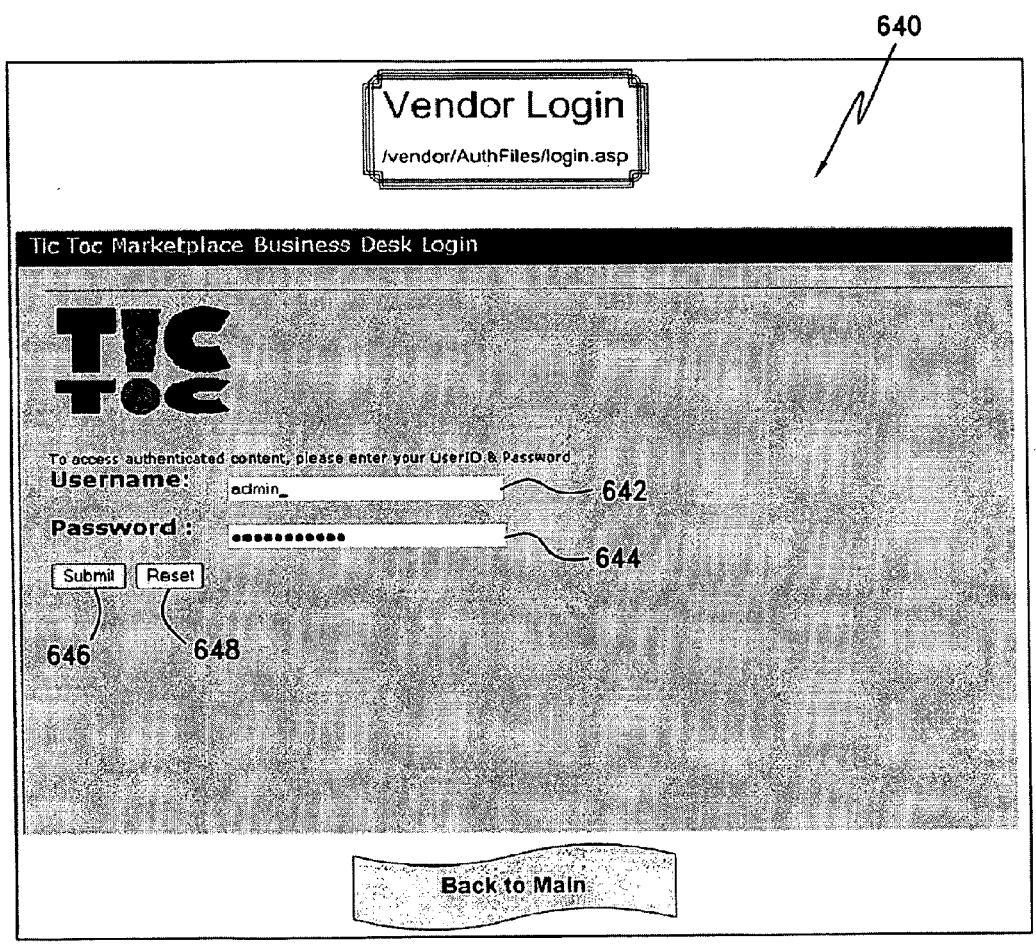
FIGS. 6A-6G are screens generated by the E-Commerce system of FIG. 1 and are used in the course of carrying out the process shown in FIG. 5 to add new items to the catalogs that are stored in the data warehouse.
Figure 6B:
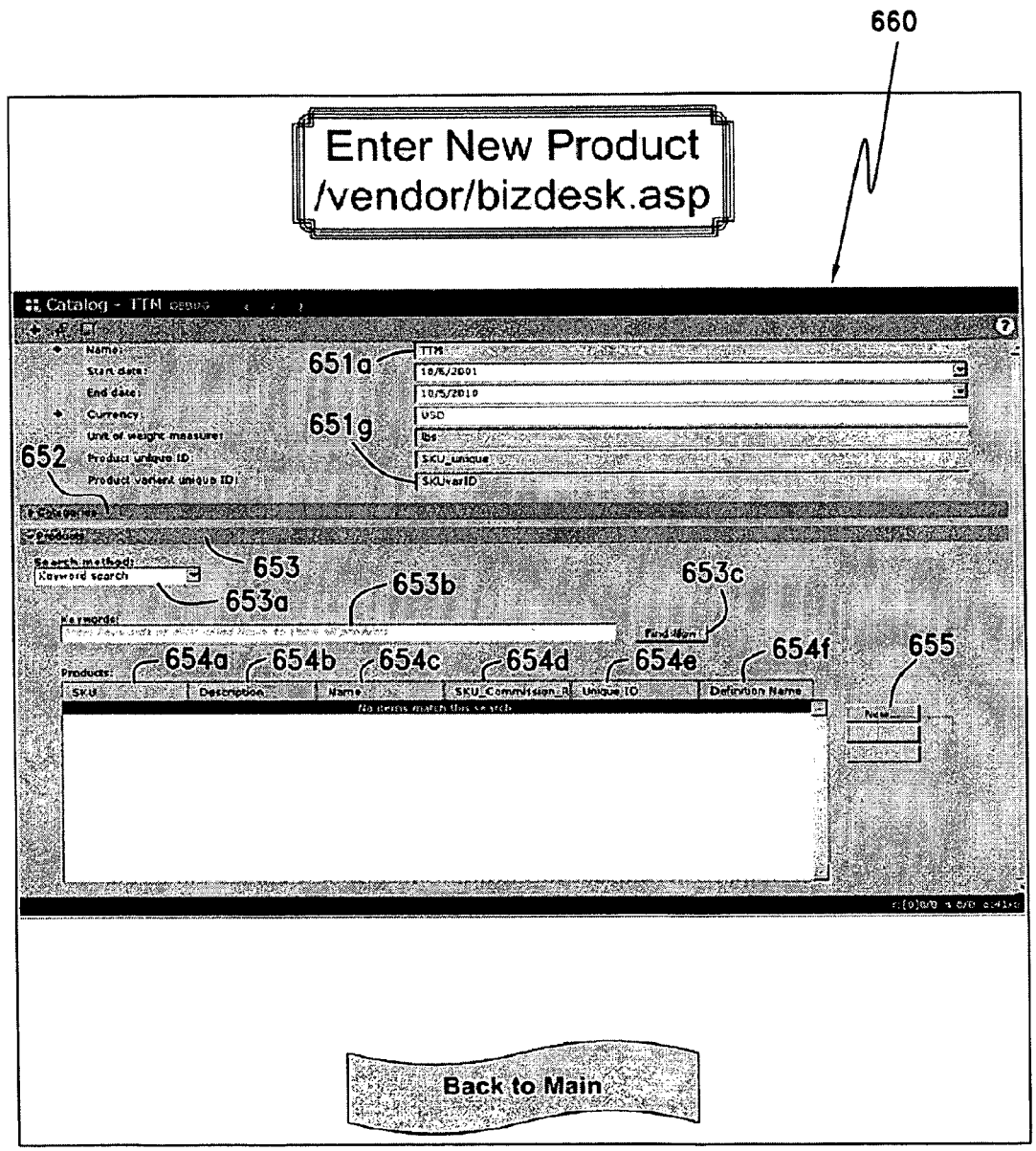

In FIG. 5, there is shown a flow diagram of the functionality for adding and storing new products and/or services of a particular supplier or vendor to the data warehouse 36 (FIG. 1). In a sense, the functionality carried out by the steps of the flow diagram of FIG. 5 provide a tool for the vendor for downloading the products and/or services from of it's one or more catalogues into the data warehouse 36. To gain access to the E-Commerce System 10, the vendor pulls up its vendor login web page 640, which as shown in FIG. 6A is displayed on the vendor's terminal 14 and then enters it's user name and password into a pair of boxes 642 and 644, respectively. Then the vendor clicks on a submit button 646, whereby the flow diagram 600 moves to its vendor home page (not shown) and selects to enter its catalogue editor in step 604. Upon entering the step 604, the enter new product web page 650, which as shown in FIG. 6B is displayed upon the vendor's terminal 14. The vendor in step 606 actuates a new button 655 to initiate the process of identifying a new product which is taken from the vendor's catalogue and input into the data warehouse 36.

Figure 6C:
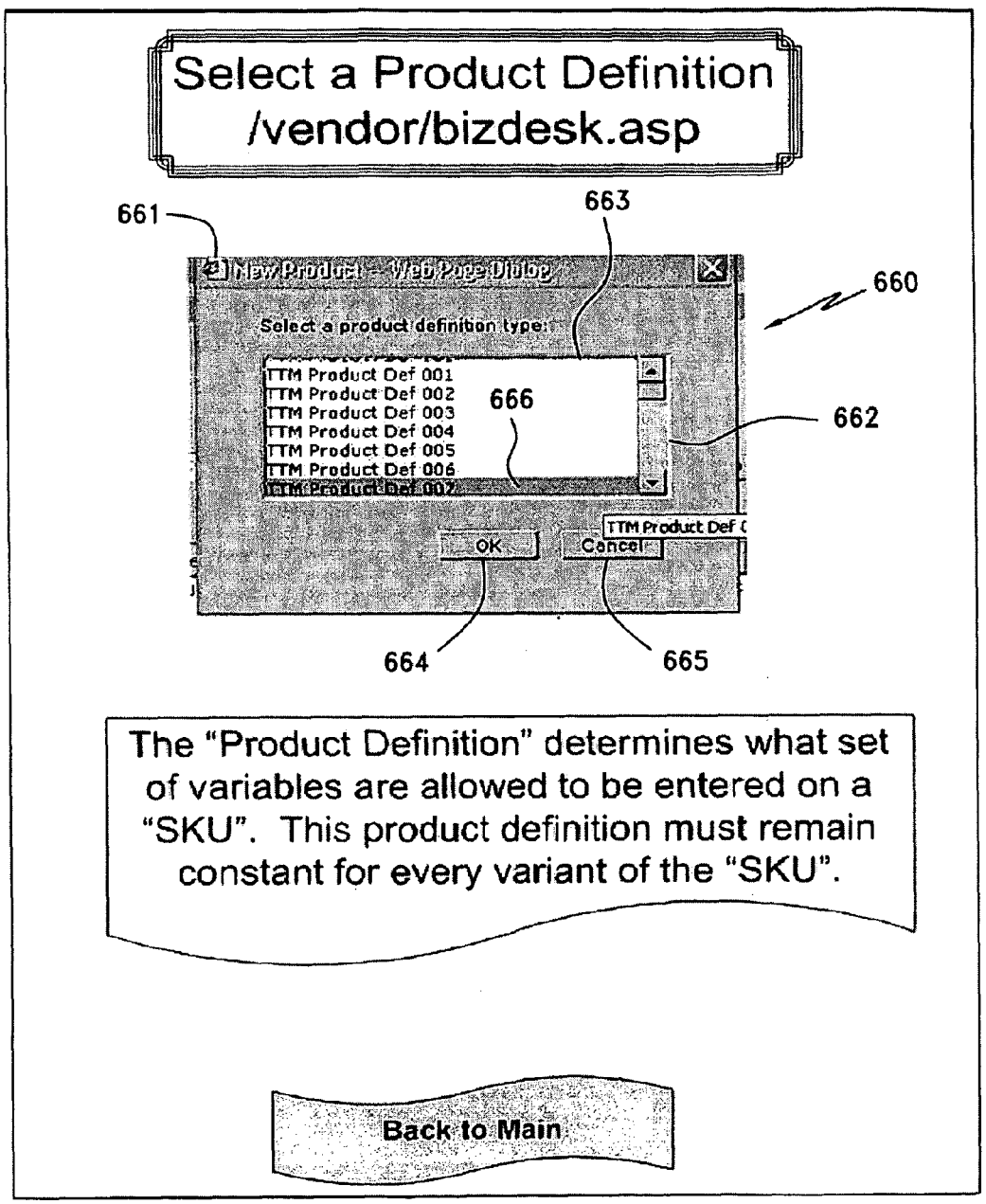

Upon actuating the new button 655, the program 600 moves to a step 608 of selecting a product definition and, in particular, displays upon the vendor's terminal 14 a select a product definition web page 660 as shown in FIG. 6C. Initially, the vendor actuates a new product button 661, which permits the vendor to select one of the definitions. In FIG. 6C, definitions 001 to 007 are shown. The vendor selects a particular definition, by using the arrows 662 to move a highlighter 666 up or down to select a particular definition. When the desired definition is selected, the vendor clicks on a button 664 selecting that particular definition of a product. Generally, the product definition determines what set of variables or variants is attached to a particular product as identified by it's "SKU". This product definition must remain constant for every variant of this SKU. In particular, the product definitions defines the product variants or characteristics which may be changed. For example if the product is a shirt, these changeable characteristics or variants would include shirt size, color, material, closure, weight, etc. The products so defined is identified by it's "SKU" which in effect is the product ID. Note however, that the product's "SKU" may be used only once in a particular product catalogue of a given vendor. One of the purposes of the product definition is to provide a capability of generating a screen that will permit a buyer to select a particular product with particular characteristics that would define such a product. The product definition further identifies a particular template, which may be populated with data corresponding to the product variants or characteristics, whereby a screen can be readily produced to permit input of data to select and to define the particular characteristics of the product. The vendor selects a particular definition such that the defined variables correspond to those of the vendor's product. To that end, it is understood that a vendor would need a complete set of definitions, to permit a comparison and selection of that definition which meets a particular product and/or service of the vendor.

Figure 6D:
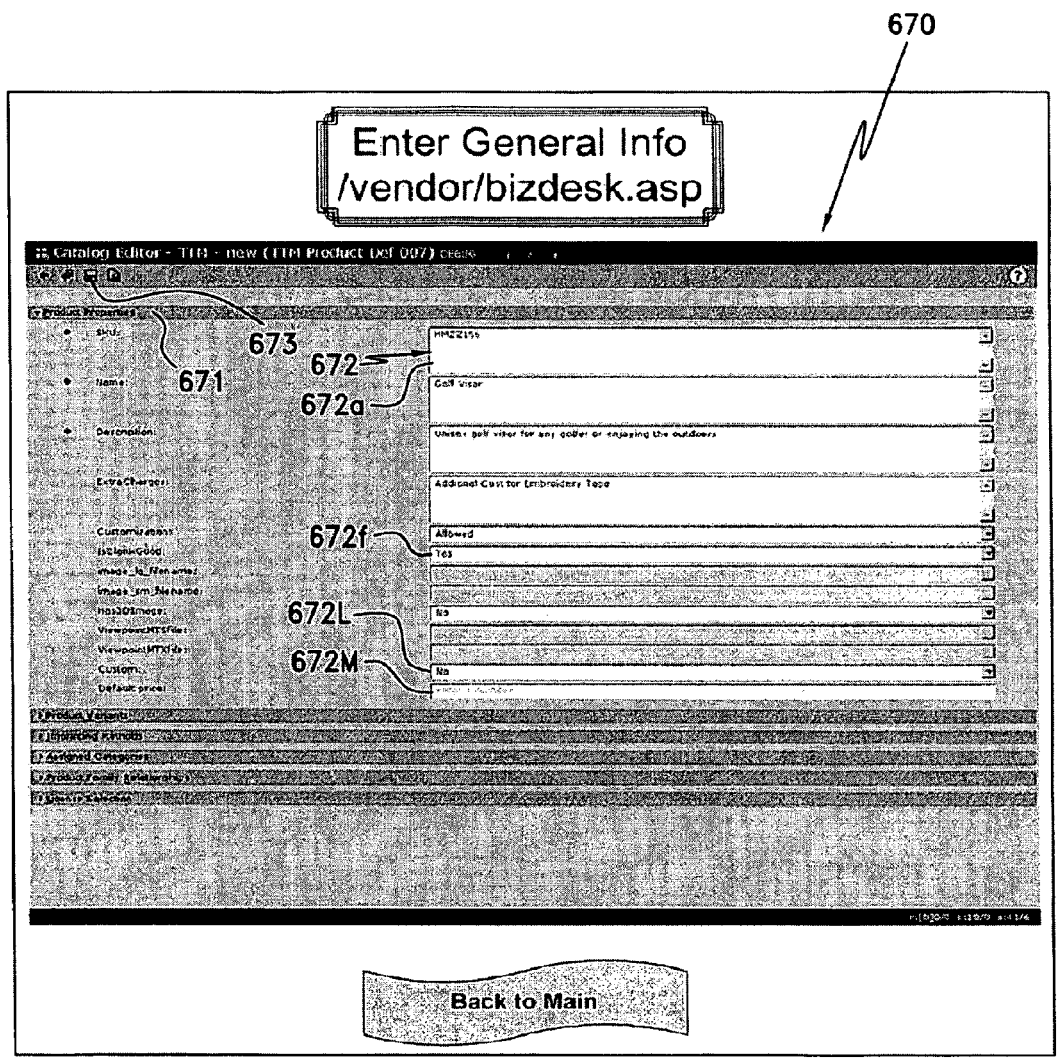
Figure 6E:
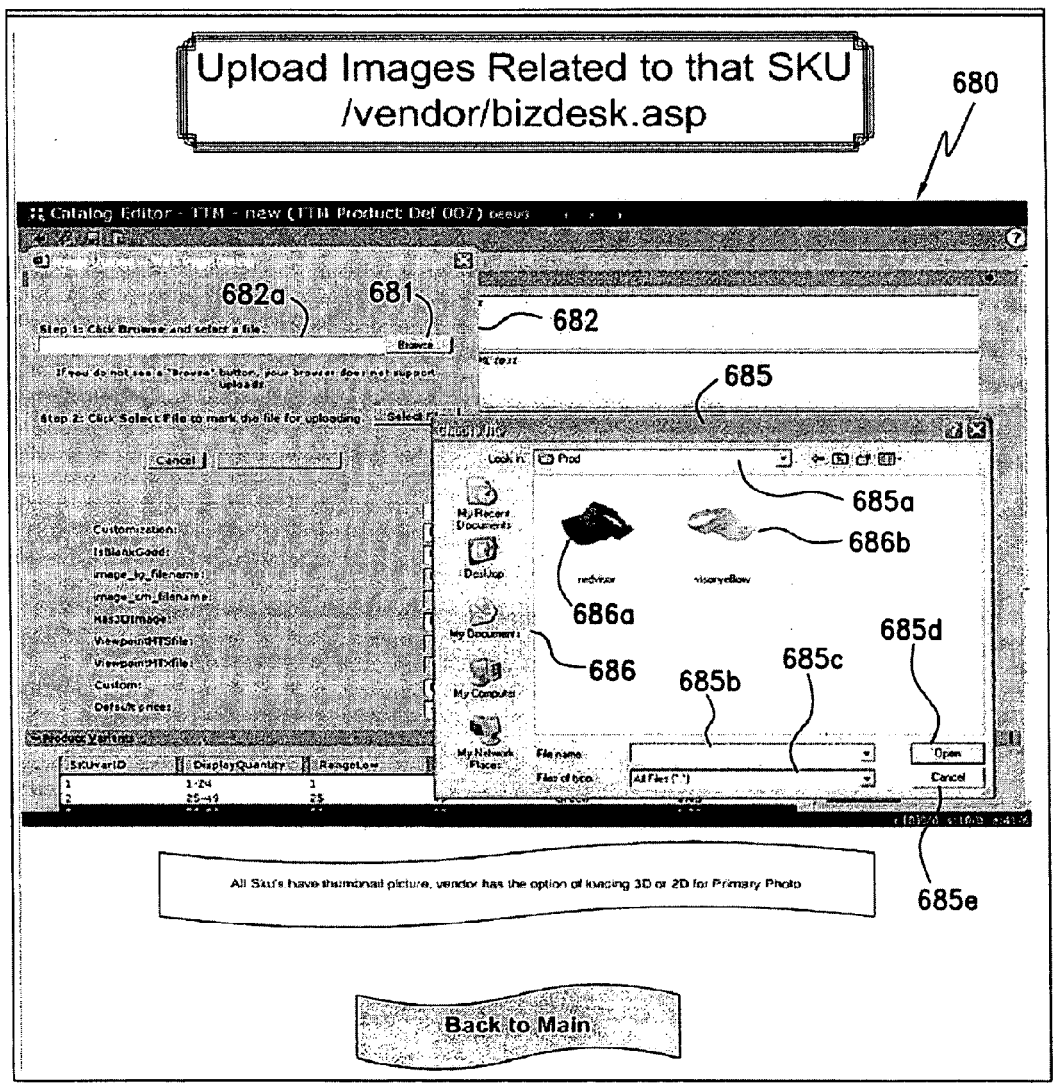

When the product definition has been selected in step 608, the flow diagram 600 moves to step 610, whereby an enter general information web page 670 that as shown in FIG. 6D is displayed upon the vendor's terminal 14. Thereupon, the vendor fills in various pieces of information about the particular product into a window 672 of boxes 672a to m. When the vendor enters yes into the box entitled "is blank good", indicating that the vendor does have an image of that product, the flow diagram 600 moves to step 612, wherein an upload images related to that SKU web page 680 that as shown in FIG. 6E is displayed upon the vendor's terminal 16. Then the vendor clicks on a browse button 681 and selects a file of a desired image of the product. In turn, the vendor inserts the name of the selected image file into a box 685b. It is appreciated that the file name also identifies the address or pass path to that memory location within the vendor's terminal 16 where the selected image file is stored. In addition, images 686a and b displayed in a window 686 to permit the vendor to preview these products and, if appropriate, the supplier clicks on an "open" button 685d, whereby the ID and address of a product of a supplier is held, as will be explained, in a buffer 624 as shown in FIG. 5 until this data is uploaded to the data warehouse 36 (FIG. 1).

After clicking on the button 685d, the flow diagram 600 returns to the enter general information web page 670 as shown in FIG. 6D. At this time, the supplier enters into a custom box 672f as to yes or no as to whether a product of the supplier will be customized or not. In FIG. 6D, no has been entered into box 672f indicating that this product is not to be customized. Further, a default price, i.e., an average price in the range of prices as dictated by the quantity of the products, is entered into a box 672m.

Figure 6F:
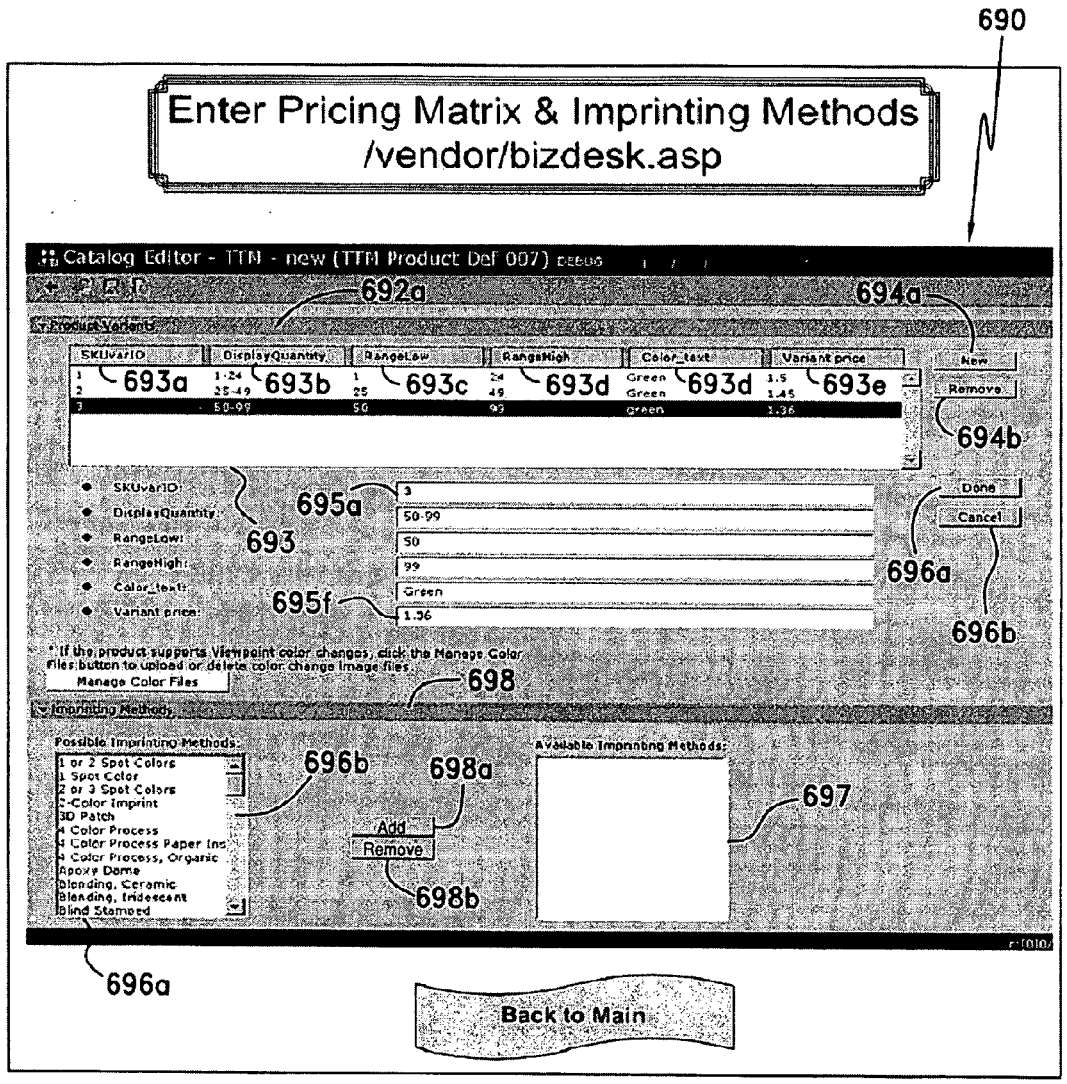

After entering data into the web page as shown in FIG. 6D, the supplier actuates an icon 673, whereby an "enter pricing" matrix and imprinting methods web page 690 that as shown in FIG. 6F is displayed upon the vendor's terminal 14. The web page 690 provides a tool for the vendor or supplier, whereby the supplier may enter all of the variants or variations for a particular product, appreciating that each variant for each product or service may have a different price matrix. To create a price matrix for each variant, the supplier fills in the boxes 695a-7, which respectively receives an SKUvarID, a quantity of products purchased, a minimum quantity of that range, a maximum quantity of that range, a product variable, e.g. the color of the product, and a variant price. Note that the SKU-varID refers to an ID of a particular variant. In the example of the web page 690 as shown in FIG. 6F, the inputted data for three variants are shown in a window 693, where the columns correspond to the data entered into the boxes 695. For example, the current entered variant information indicates that the number or ID of a product variant is three, the quantity range is 50 to 99, the minimum quantity is 50, the maximum quantity is 99, the product variant is the color of the product, e.g., green, and the variant price for this particular range of product quantities is $1.36. After all of the variant data has been added, the supplier hits a "done" button 696a, whereby the process moves to the imprinting methods section 698 of the window 690. If the supplier wishes to cancel a particular variant, he/she strikes a "cancel" button 696b. As noted above, a particular product may have as high as 1700 variants. In this case, the web page 690 would provide a tool that would effectively permit the entry of significant quantities of data for each variants of all of the products or services.

Next, the supplier moves to the imprinting methods section 698 of the web page 690. Here the supplier selects one of the possible imprinting methods as displayed within a window 696a. The supplier may manipulate a set of arrows 696b to highlight one or more possible imprinting methods for a particular product. Once a selected method is chosen, it may be added to an "available imprinting methods" window 697 by clicking on an "add" button 698a. If a particular method is to be removed, the supplier highlights that method and clicks on a "remove" button 698b.

Figure 6G:
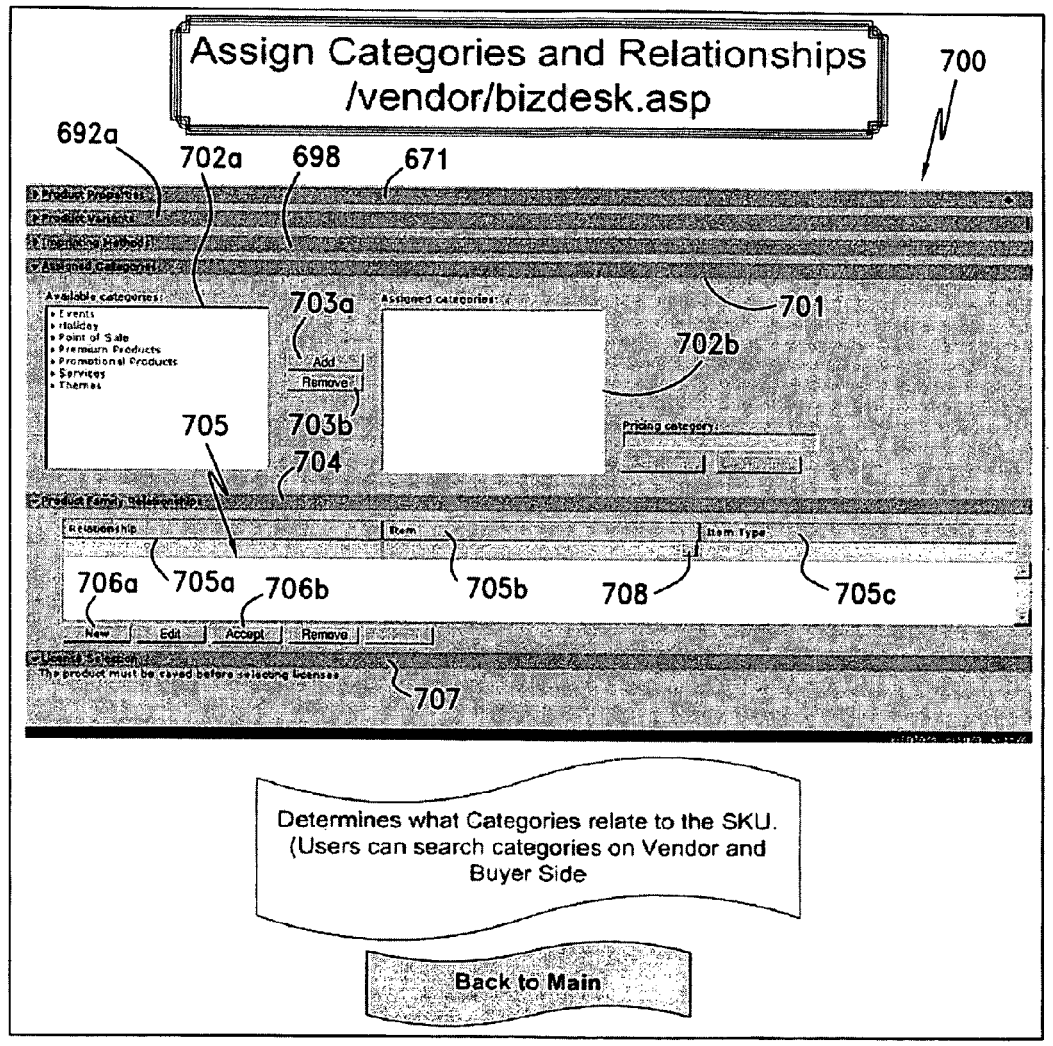

Upon striking the "add" button 698a of the web page 690 (FIG. 6F), the flow diagram 600 moves to step 626, wherein category and relationship information on each SKU is input into the E-Commerce System 10 and, in particular, and an "assigned categories, and relationships" web page 700 is as shown in FIG. 6G displayed upon the vendor's terminal 12 (FIG. 1). Focusing particularly on an assigned category section of the web page 700, there is shown a window 702, which displays the available categories. The supplier may chose one of these categories by clicking on a particular category within the window 72a and then actuating an "add" button 703a, whereby the selected category is transferred to an "assigned categories" window 702b. By assigning one or more categories to a particular product or SKU, the supplier is permitting that product to be searched by using the designated category. In particular, both the buyer and the vendor can search the products and/or services held in the data warehouse 36 by the use of a designated category, when that category has been related to a particular product or service as described above to a particular category.

Next, the supplier moves to the "product family relationships" section 704 of the "assigned categories and relationships" web page 700. By the use of this "relationship feature, the vendor may relate each of it's products and/or services to at least one other product and/or service. In particular, the supplier may actuate a "new" button 706a, whereby the supplier may enter into the window 705 relationship data in a box 705a, the particular item (product or service) in box 705b and/or item type in box 705c. When the buyer hits on a button 708, a drop down will appear in the web page 700, which lists all of the products or SKUs that are included in the vendor's present catalogue. Upon completion of entering data into the web page 700, the vendor clicks on a "accept" button 706b, whereby all of the data entered by the functionality of the flow diagram 600 is saved for entering into the data warehouse 36, as will be explained.

Referring now to FIG. 5, the image files that are obtained from the vendor are uploaded in step 612 and are examined in step 614 to determine whether the uploaded images are the relatively large, high definition images of a product or service, or the relatively small or thumbnail images of a lower image resolution of such an item. If a primary or larger image is being uploaded, step 614 passes a primary image to step 618, where the primary image is put into a JPEG file to be displayed in two dimensions. Alternatively, the primary image may be applied to step 616, where programming that will permit the primary image to be displayed in three dimensions is attached to the primary image data. Step 620 inputs the primary data image as modified in steps 616 and 618 to a buffer step 624, whereby the primary data as well as the thumbnail data derived from step 622 are held in a buffer. Further, all of the data entered by operation of the adding new products flow diagram 600 is held in step 632 in a buffer, until all of the information concerning the products and/or services of a particular supplier has been entered, at which time step 634 passes all of the data derived from the vendor's terminal 14 is downloaded via the Internet information server 20, the block 26b, the commerce server 30 and the database server 34 to be stored in the data warehouse 36 for use by both of the vendor and the buyer.

Figure 7:
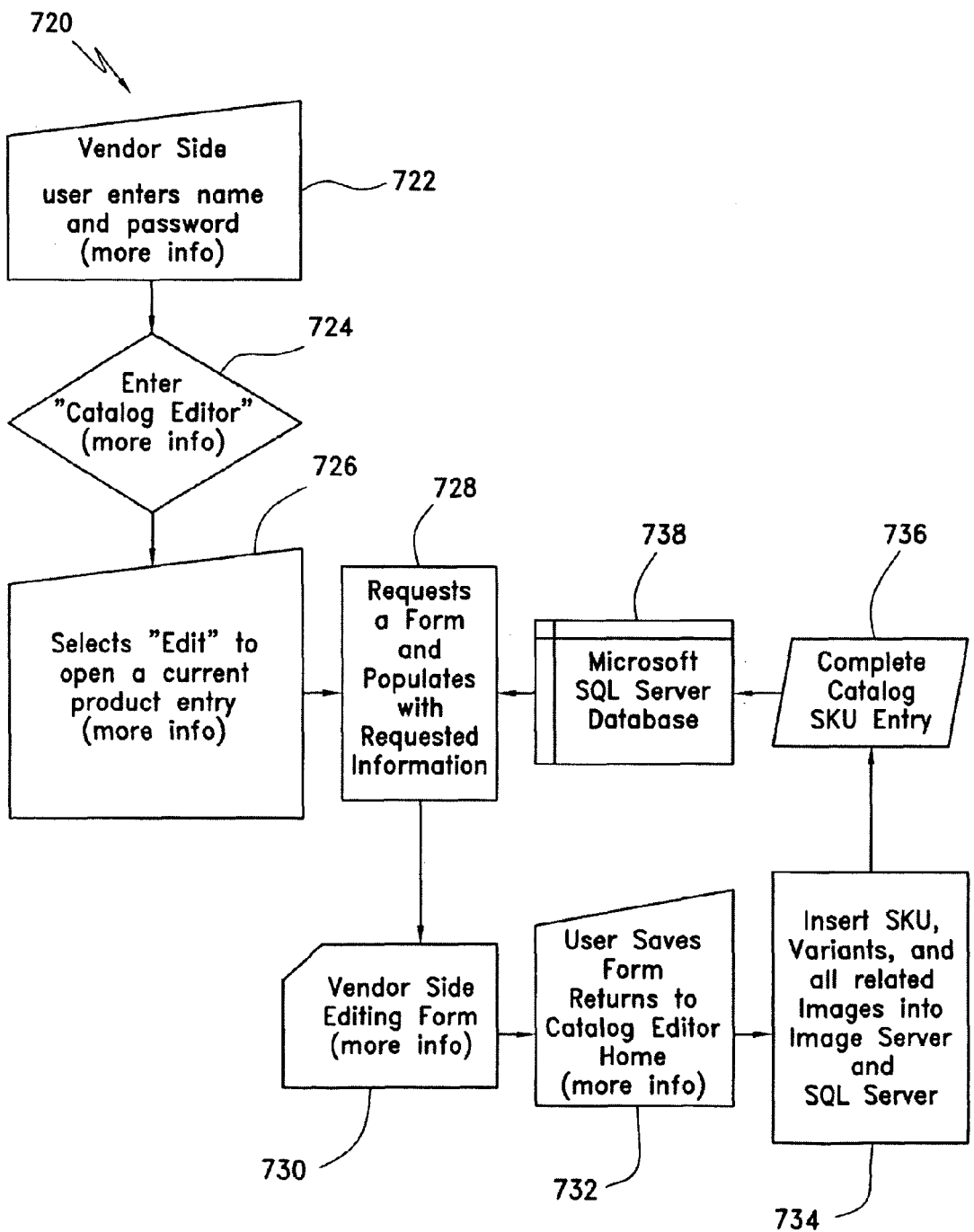
FIG. 7 is a flow diagram that illustrates how a previous entered catalog may be edited.
Figure 8A:
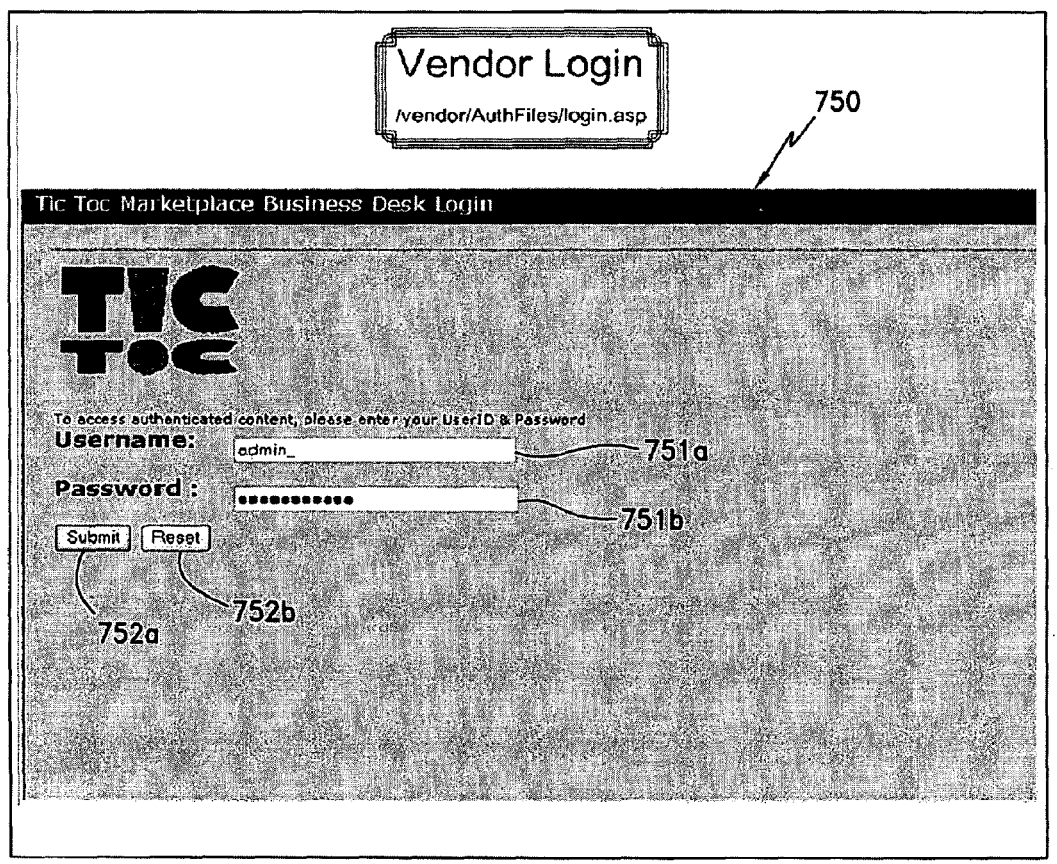

After the data associated with the new products has been entered by the flow diagram of FIG. 5 as explained above, the vendor product data may be edited and changed by a vendor data editing process whose flow diagram 720a is shown in FIG. 7. Initially in step 722, the vendor pulls down and displays a "vendor login" web page 750 as shown in FIG. 8A on the vendor's terminal 14. The vendor then enters it's user name in a box 751a and its password in a box 751b and, thereafter, clicks on a "submit" button 752a. If the entered user name and password corresponds to those kept in the active directory 32, the active directory 32 authenticates this particular supplier and provides the vendor access to the E-Commerce System 10.

Figure 8B:
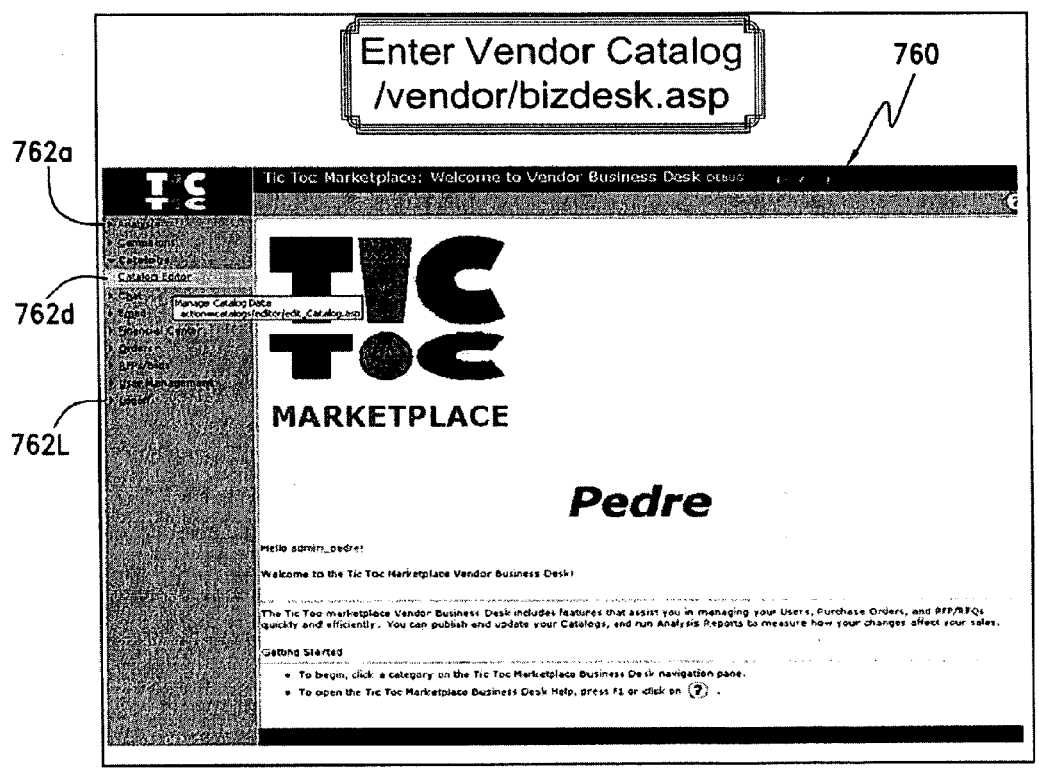
Figure 8C:
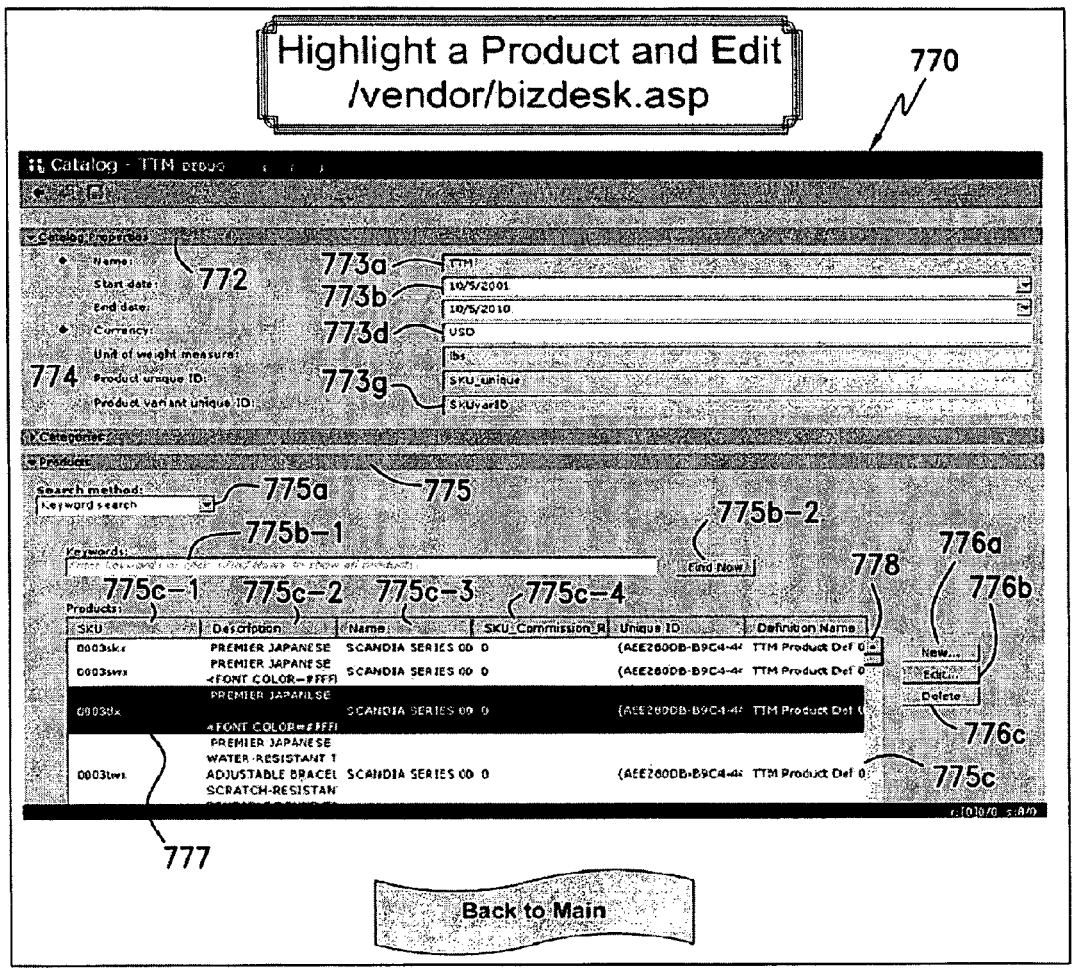

Next, an "enter vendor catalogue" web page 760 as shown in FIG. 8B is displayed in step 724 upon the vendor's terminal 14. The vendor clicks on a "catalogue editor" button 762d, whereby the vendor data edit process of the flow diagram 720 moves to step 726. Then, the vendor clicks on the "catalogue editor" button 762d (FIG. 8B), whereby the flow diagram of FIG. 7 moves to the "select product to be edited" step 726, whereby a "highlight a product and edit" web page 770 as shown in FIG. 8C is displayed in the vendor terminal 14. In particular, the web page 770 includes a window 775c wherein each of the previously entered products or SKUs is displayed. One of the products may be selected by manipulating the arrows 778 to change the position of the highlight to a selected product. To select the highlighted product, the vendor clicks onto an "edit" button 776b, whereby the editing process as shown by the flow diagram 720 of FIG. 7 moves to step 728.

Figure 8D:
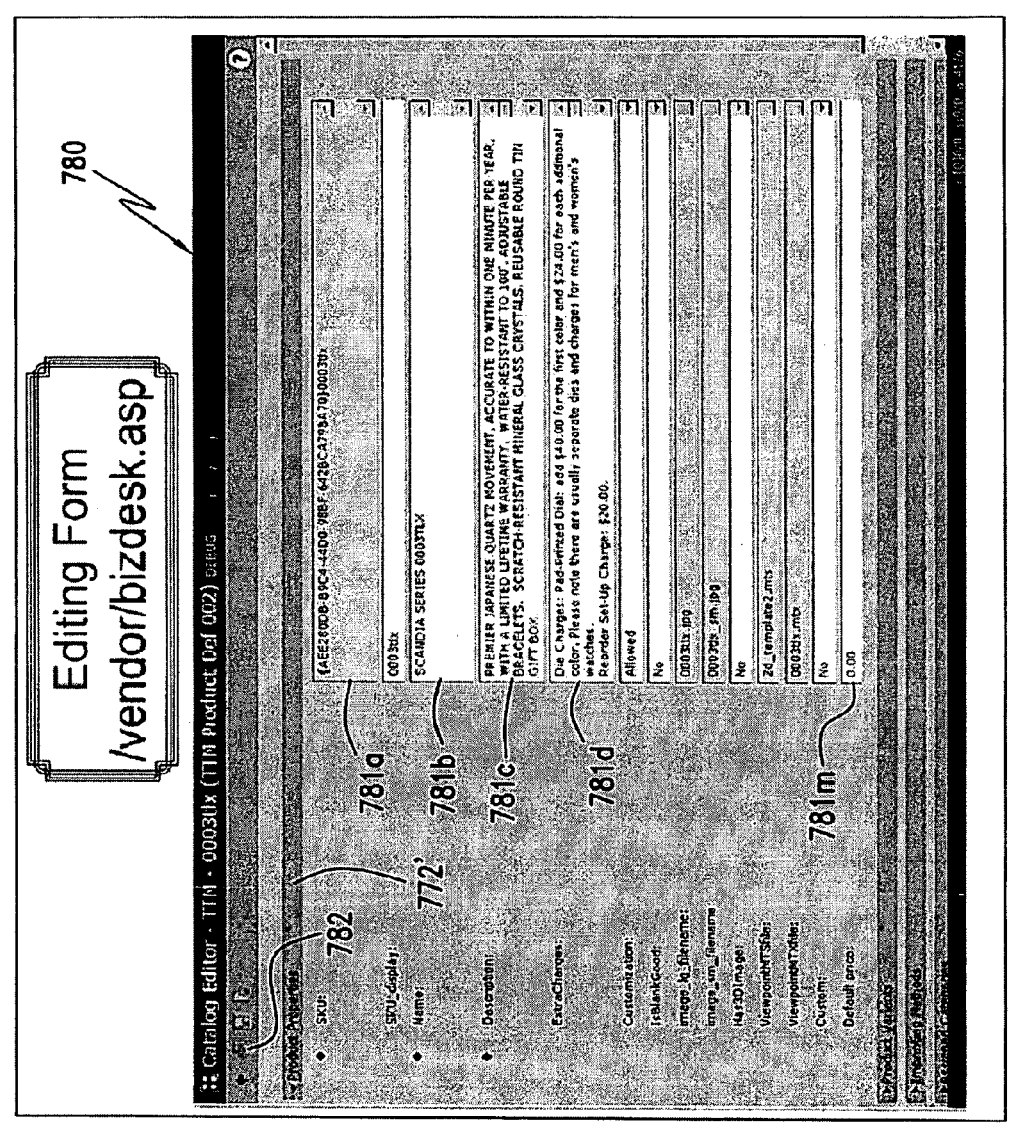

Step 728 accesses and pulls up an "editing form" 780, which as shown in FIG. 8D is displayed in step 730 upon the vendor's terminal 14. In particular, the form 780 includes a series of boxes 781a-m which are populated with the data for the selected product or SKU. Now, the vendor may edit any of the data as shown in the block 781 and, if satisfied with the edits, clicks onto a save button 782, whereby the changes or edits made to the data appearing in the block 781 is saved in step 732. Upon completion of saving the edited data, the process 720 goes to step 734, wherein all of SKU, variants and image data are loaded into the database server 34. Then, all of the edited data is assembled in step 736 into a complete SKU entry, before step 738 downloads the edited data via the customized commerce server 34 to be kept in the data warehouse 36.

Figure 9:
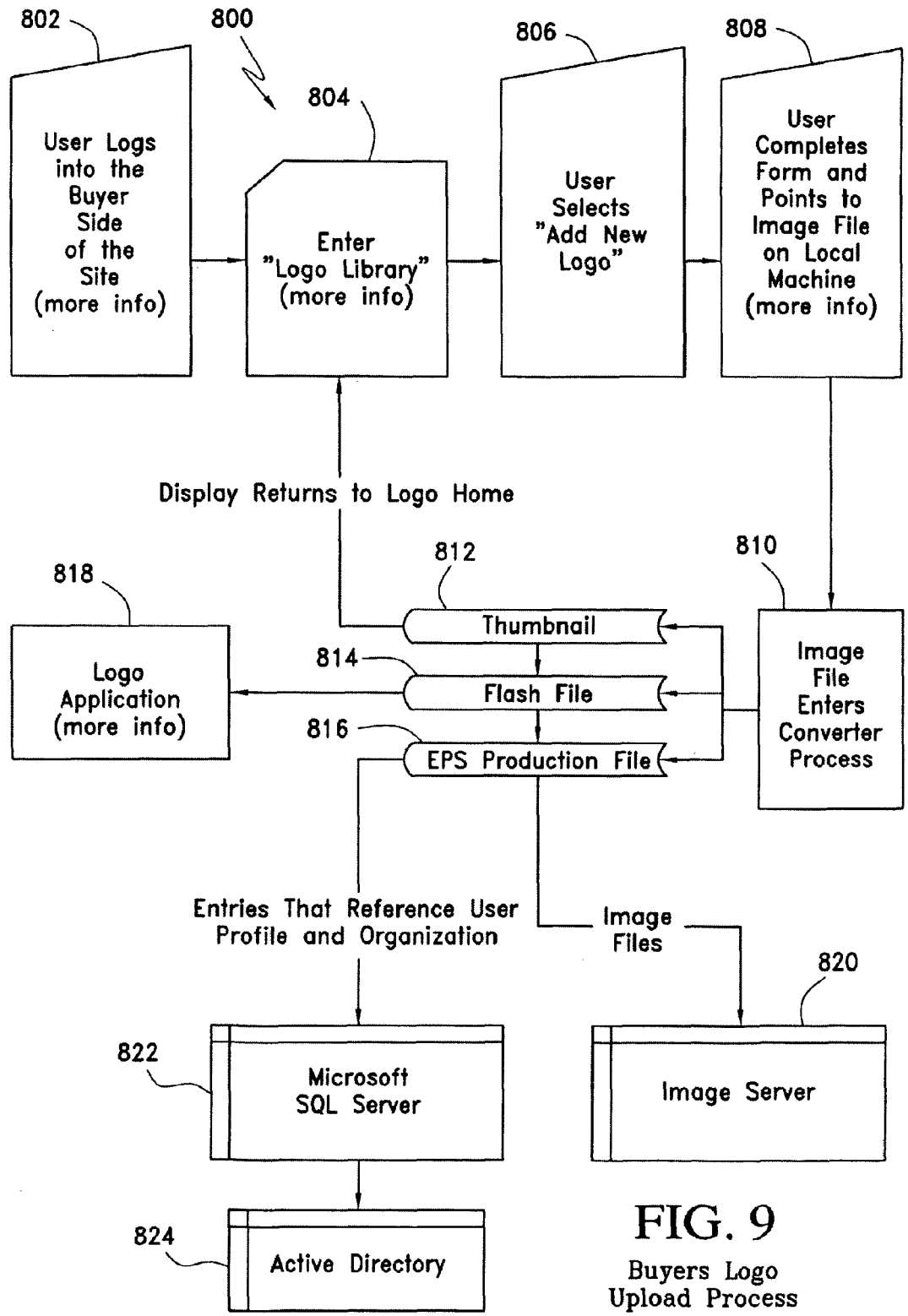
FIG. 9 is a flow diagram that illustrates how a buyer select and upload a marking to be combined with a selected item.
Figure 10A:
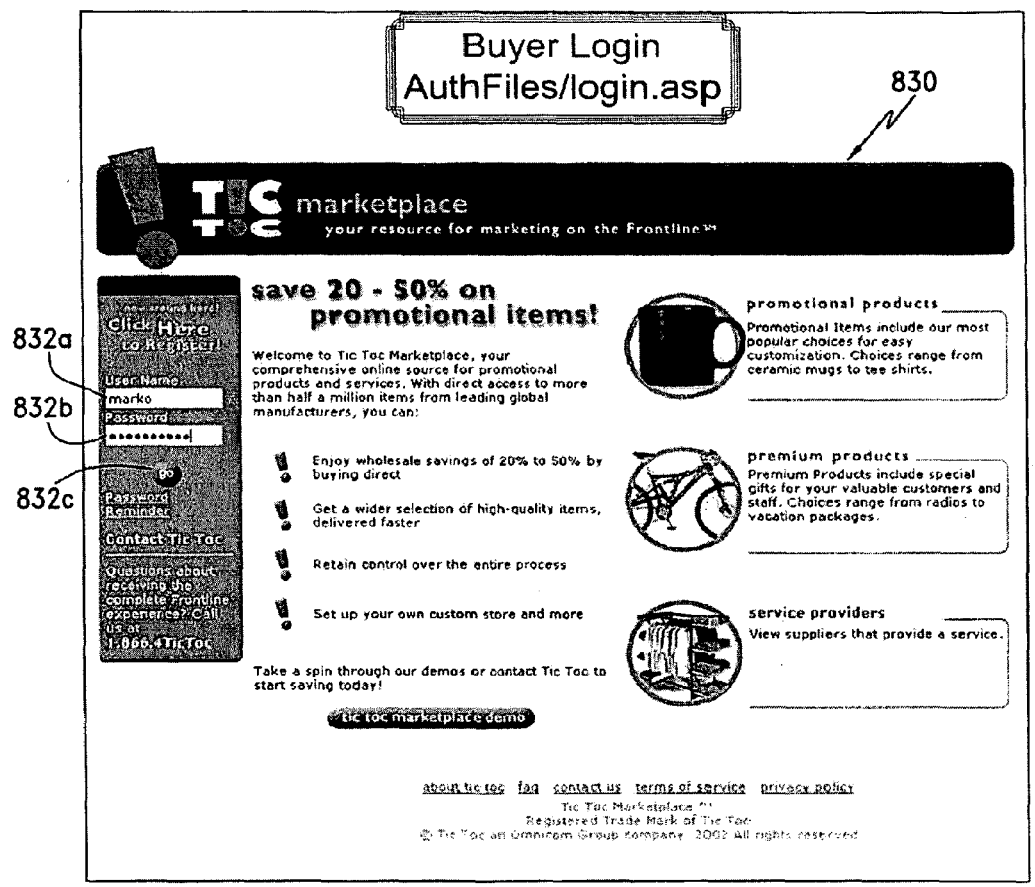

If the buyer wishes to customize a selected product, he/she can select a marking, e.g., a trademark, a logo or the like, and upload the selected marking to be superimposed on the selected product by employing a buyer's logo upload process as carried out by a flow diagram 800 as shown in FIG. 9. Initially in step 802, the buyer logs into a "buyer's login" web page 830 as shown in FIG. 10A by inserting it's user name and password into boxes 832a and b, respectively, before hitting a "go" button 832c. If the active directory 32 (FIG. 1) finds a correspondence between the entered user name and password and those previously stored therein, this buyer is authorized and is provided access to the E-Commerce System 10.

Figure 10B:
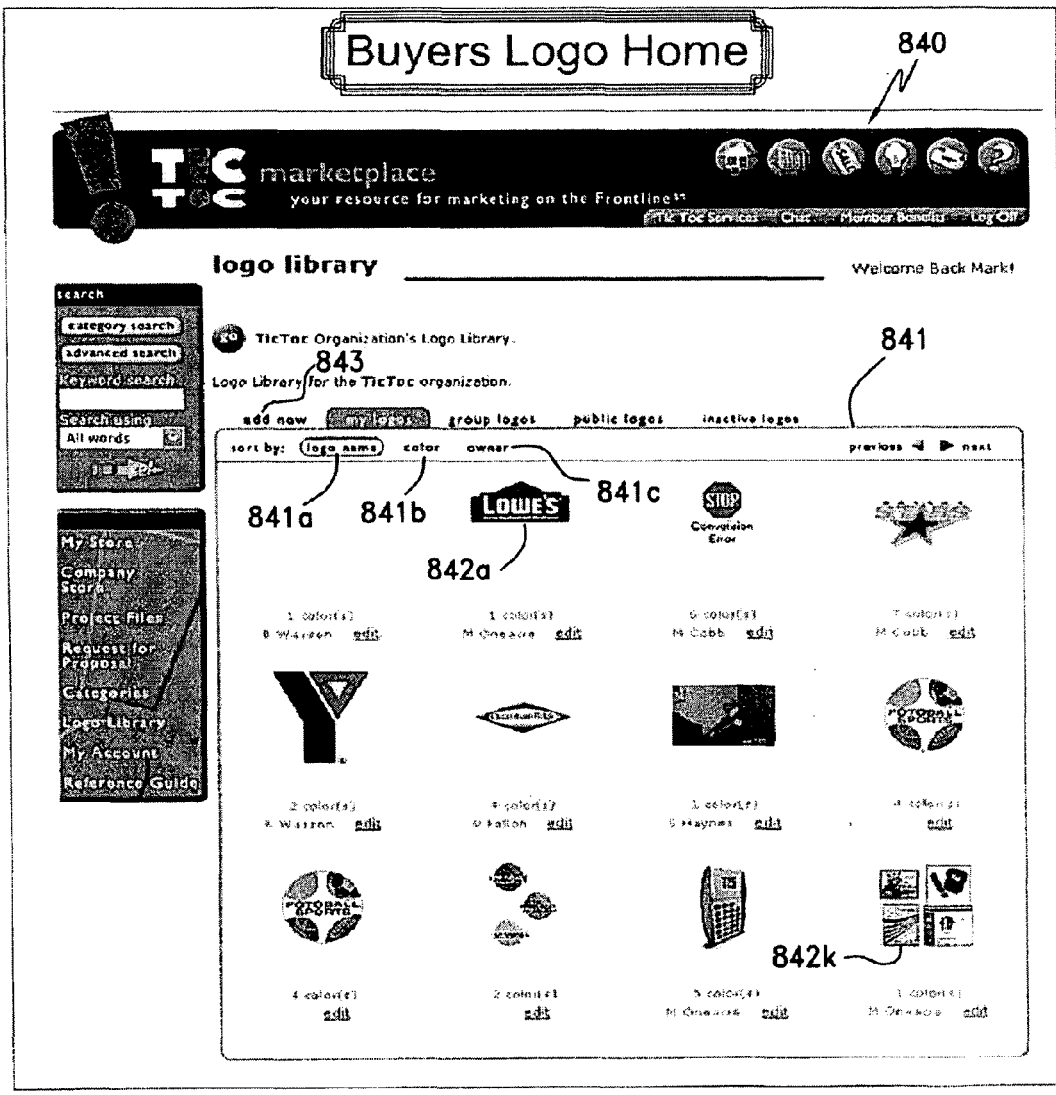

Upon clicking on the "go" button 832c, the flow diagram 800 moves from step 802 to 804, wherein a "buyer's logo home" web page 840 as shown in FIG. 10B is displayed upon the buyer's terminal 16. The web page 840 includes a window 841, wherein all of the markings 842a-k that belong to this buyer are displayed. In particular, the array of markings is constructed by accessing the data warehouse 36 to identify all of the markings that are assigned to this buyer and to populate the window 841 with those markings. In order to select a particular marking or logo to be uploaded, the buyer highlights one of the markings 841 within the window 841 and then clicks on an "add new" button 843 to select the highlighted marking and to go from step 806 to step 808 (FIG. 9).

Figure 10C:
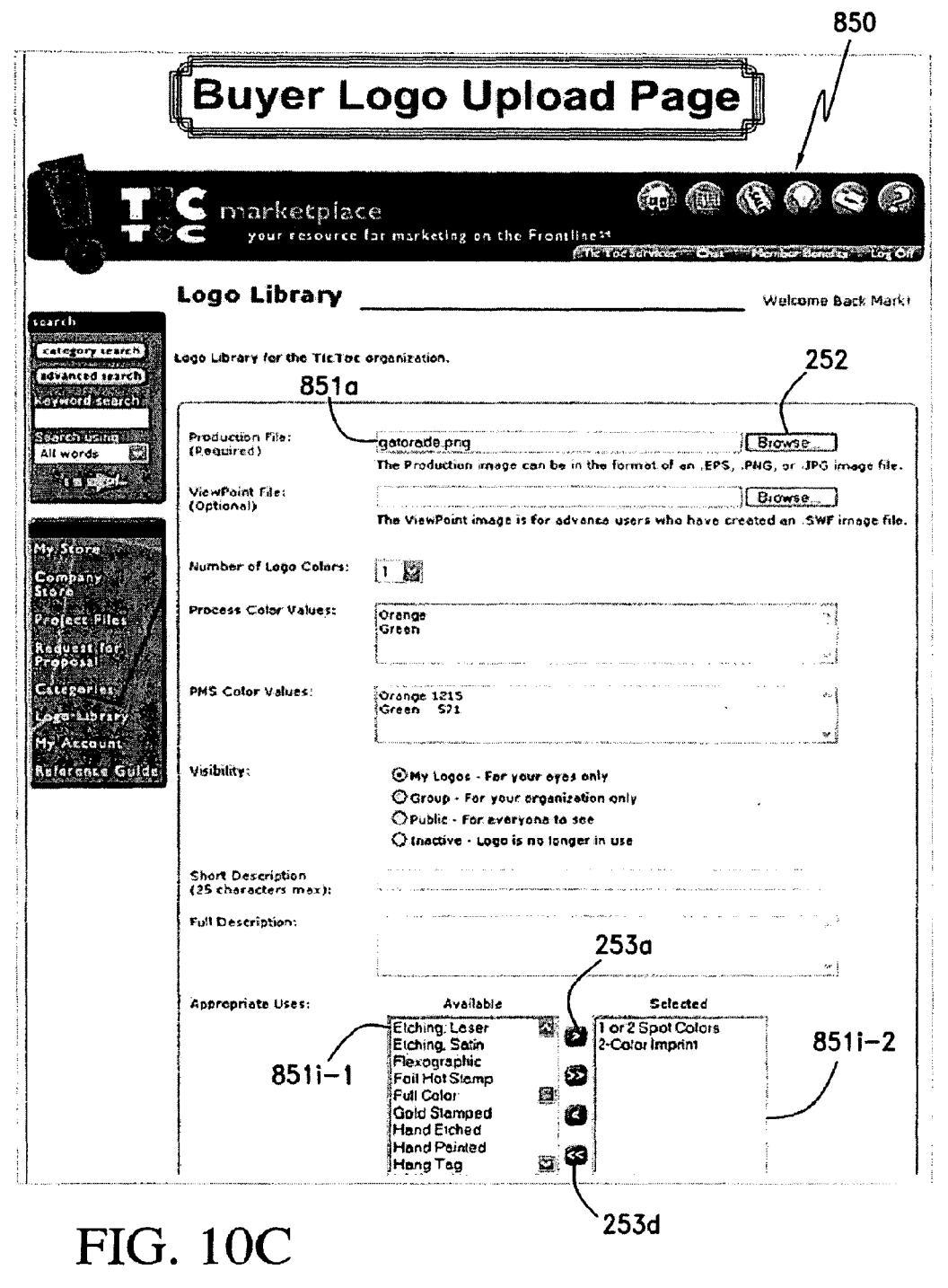

In step 808, a "buyer logo upload" page 850 is displayed as shown in FIG. 10C on the buyer's terminal 16. The "buyer logo upload" page 850 includes a series of boxes 851a to 851i. The buyer clicks on a "browse" button 252, whereby a pop up display (not shown) is pulled up with a thumbnail image of each of the buyer's markings displayed thereon. The buyer selects one of the markings displayed upon the pop up screen and then proceeds to fill in the boxes 851a to 851i with respectively the address or file path of the selected marking, the address of the viewpoint file, the number of colors, the colors used in the selected marking, the color values, the security with which the markings of the buyer are to be treated, a short description of the marking, a full description of the marking, and the applicable uses and methods of superimposing the selected marking on the product. For example, the buyer may actuate selected of the arrows 253a-d to transfer a particular application from the available window 851i to the selected window 851i2. In this particular illustrative embodiment, the selected marking is authorized to have one or two spot colors and a color imprint associated therewith.

After a marking has been selected and it's address in the memory of the buyer's terminal 16 determined, the flow chart 800 moves from step 808 to 810, wherein the image of the marking is converted into a thumbnail image in step 812 before being returned to a logo or marking library in step 812. Further, the selected marking or logo image is converted in step 814 to a flash file, before it is applied or superimposed onto the product or a screen to a logo application in step 818. Further, the image is converted to an EPS production file in step 816, whereby the marking may be used in selected of the screens that are shown to the vendor. The EPS production files are in turn filed in step 822 in the data warehouse 36 by the customized commerce database server 34.

Figure 10D:
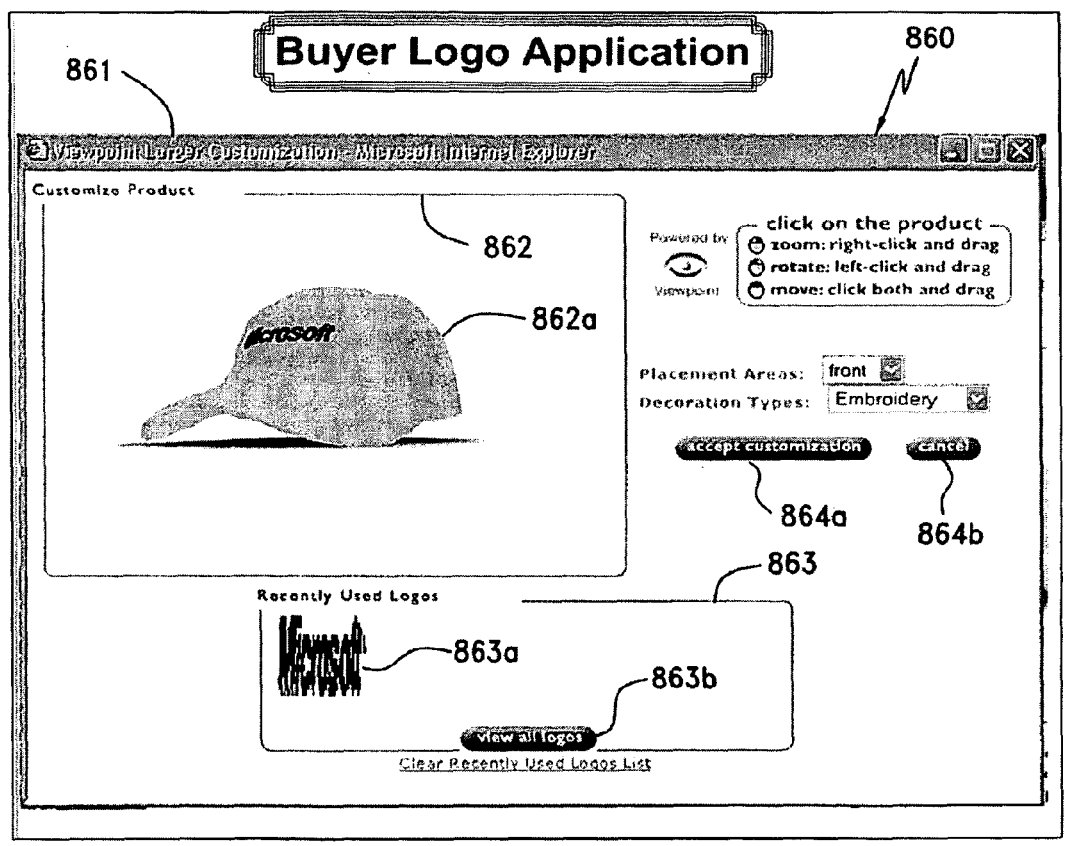

After the number of products and/or services has been reduced to a sufficiently refined degree and a desired marking has been selected, the flow diagram 880 moves from stem 888 to 890, wherein a desired product and/or service is selected. The marking 863a as combined or superimposed on a selected product is shown in step 818 (FIG. 9) on a window 863 of a "buyer logo application" web page 860 as displayed as shown in FIG. 10D on the buyer's terminal 16. If the buyer accepts the customization, he/she clicks onto an "accept customization" button 864a. If not, the buyer hits a "cancel" button 864b.

Figure 11:
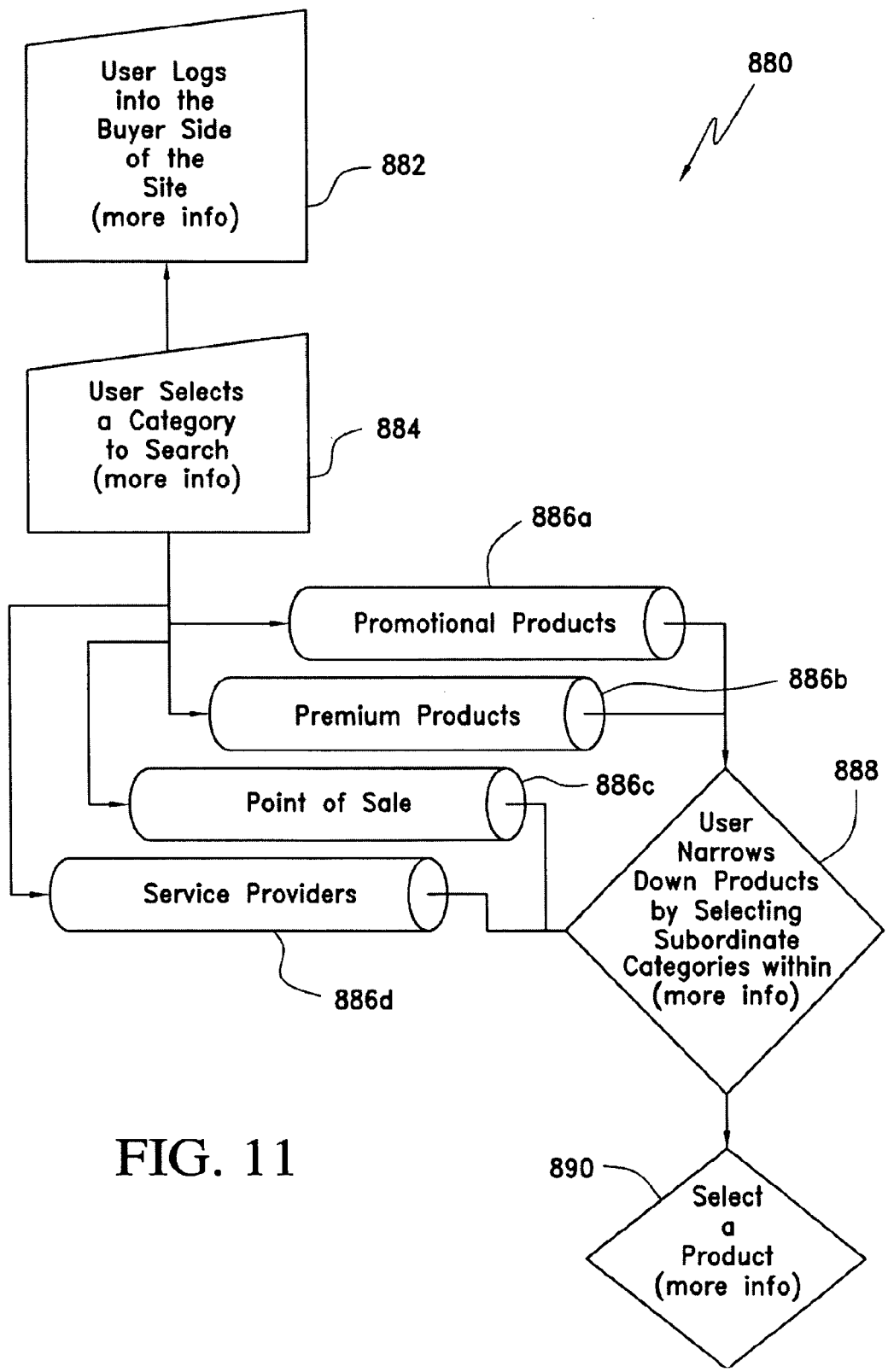
FIG. 11 is a flow diagram that illustrates how a buyer can search the items stored in the data warehouse by category.
Figure 12A:
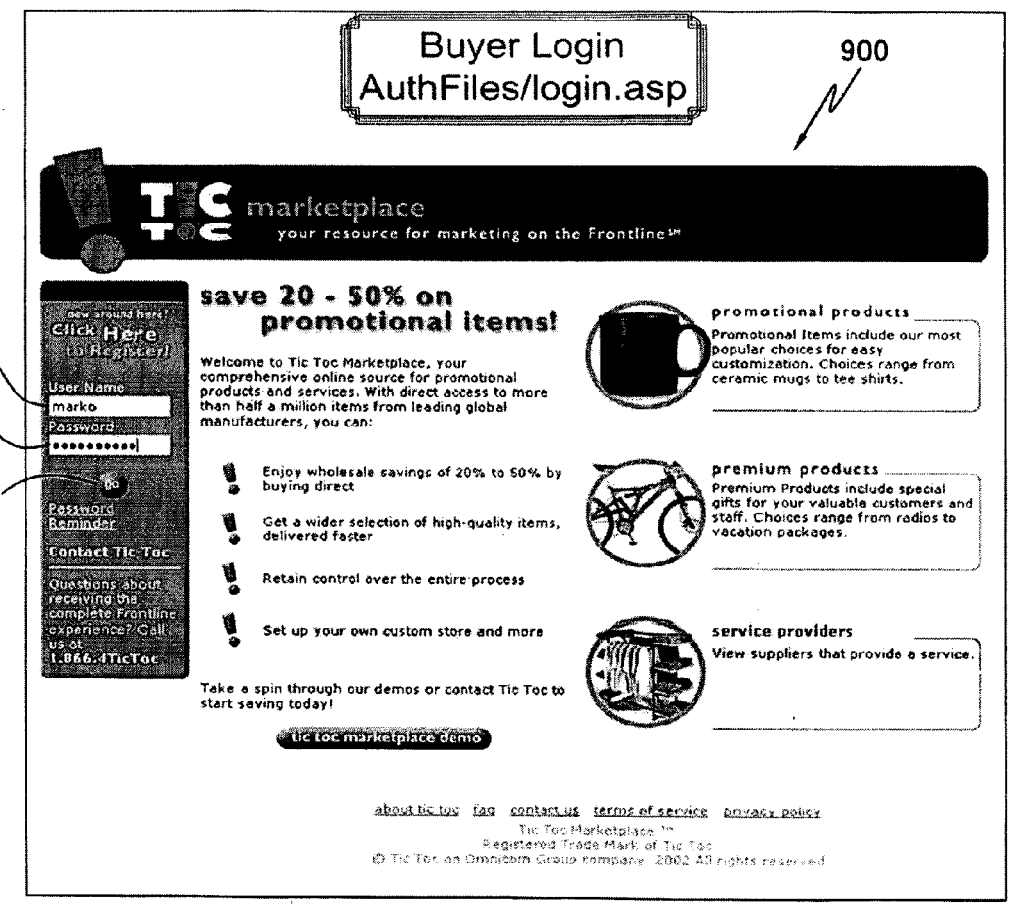
FIGS. 12A-12D are screens generated by the E-Commerce system of FIG. 1 and are used by the process shown in FIG. 11 to facilitate a buyer to search the items by category.
Figure 12B:
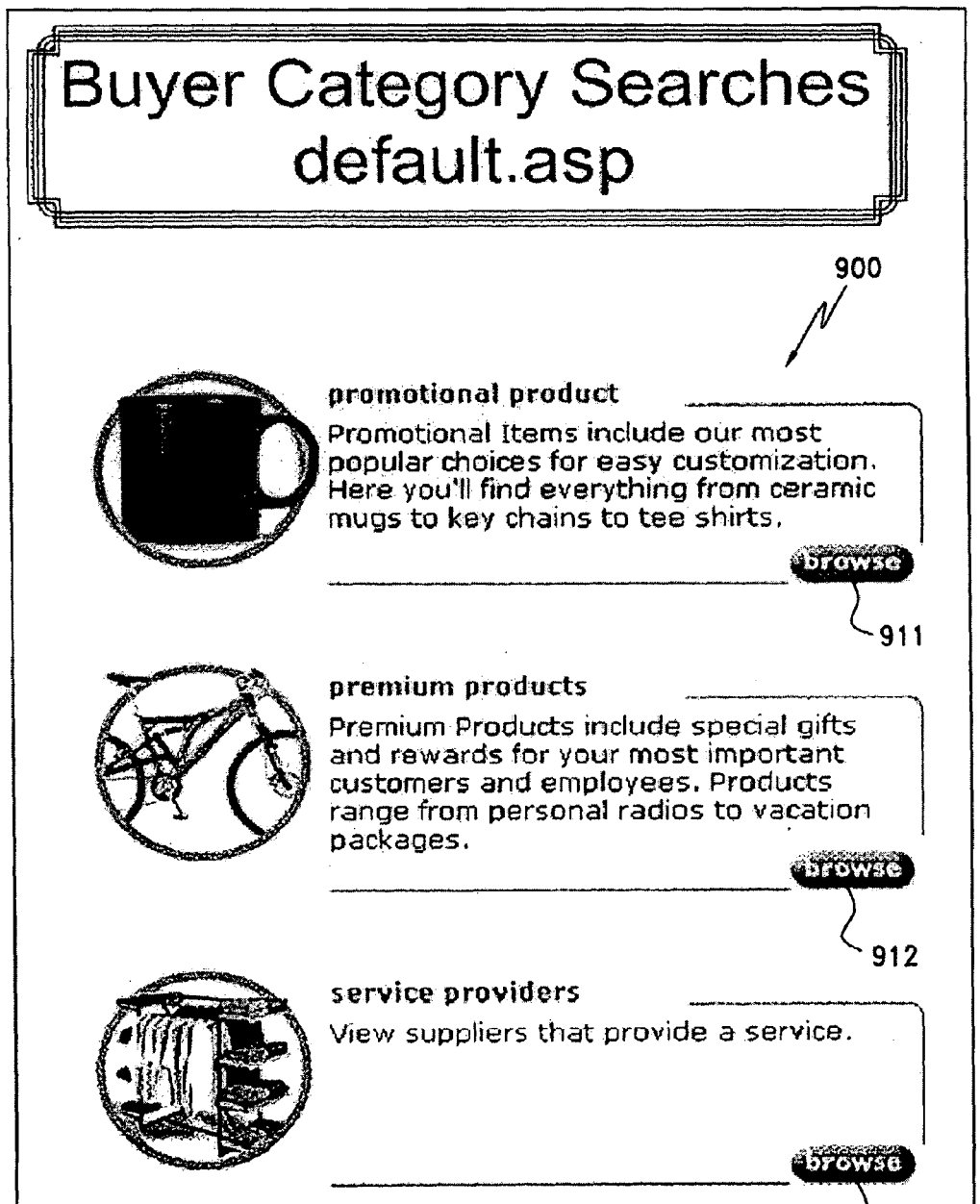

Referring now to FIG. 11, there is shown a buyer's category search process, which is illustrated by a flow diagram 880. In an initial step 882 of the flow diagram 880, the "buyer login authorization" web page 900 is displayed as shown in FIG. 12A by the buyer's terminal 16. In particular, the buyer enters it's user name and password in boxes 901 and 902, before clicking on a "go" button 903. Upon clicking on the button 903, the flow diagram 880 moves from step 882 to step 884, wherein a "buyer category searches" web page 910 is displayed as shown in FIG. 12B by the buyer's terminal 16. The "buyer category search" web page 910 includes a "browse" button 911 to permit a review of promotional products, a "browse" button 912 to permit a review of premium products and a "browse" button 913 to permit a review of services as provided by suppliers or providers. The buyer may click on any of the buttons 911, 912 or 913 to review or browse products and/or services in the various categories, e.g., promotional products, premium products and services. Though only four categories are shown in FIG. 12B, it is appreciated that a category search may be initialized and/or programmed for any number of products and/or service categories.

Figure 12C:
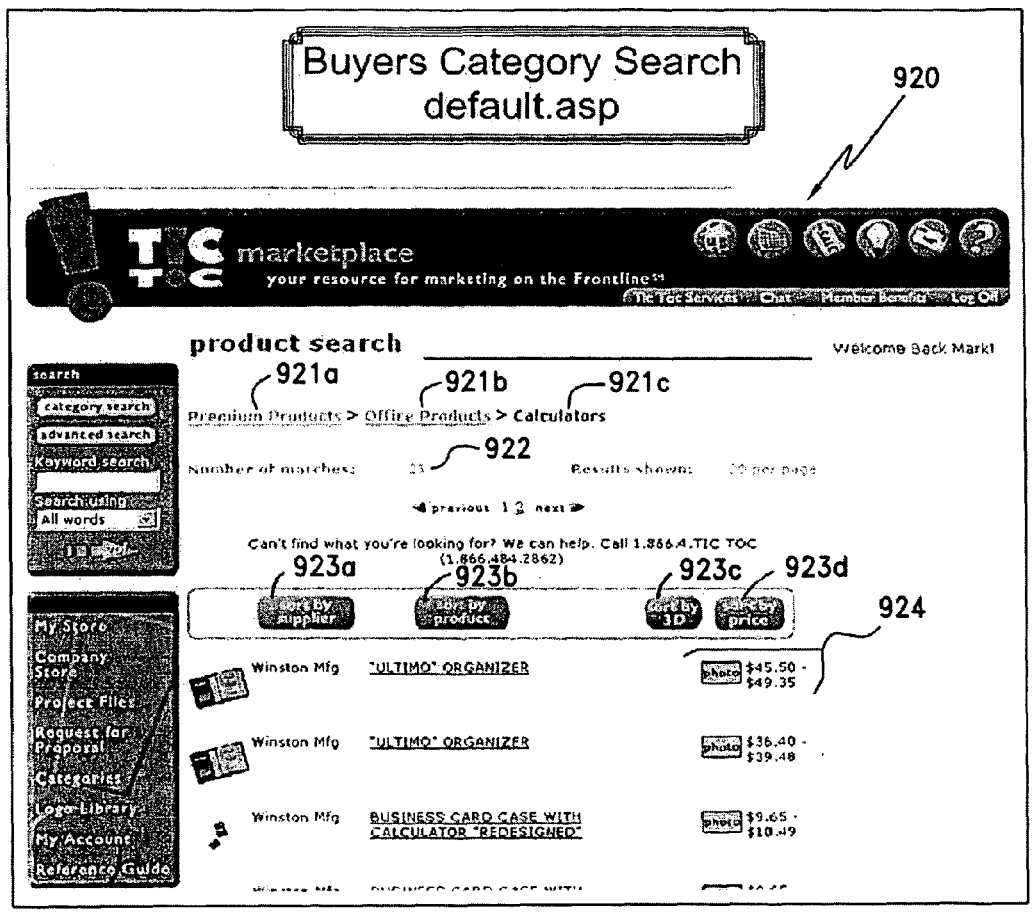

In an illustrative category search, the buyer may click on the promotional product browse button 911, whereby the flow diagram 880 moves from step 884 to step 886a, wherein a "buyer's category search results" web page 920 is displayed as shown in FIG. 12C upon the buyer's terminal 16. FIG. 12C indicates how a buyer may bore down to successively chose a narrower category. In this illustrative embodiment, the buyer first actuates a search for the relatively broad category premium products as indicated at space 921a. In particular, upon striking the premium products browse button 912, a search is made through the data warehouse 36 and identifies and collects all premium products to be displayed at the area 924 of the web page 920. The web page 920 provides a set of buttons 923 including a "sort by supplier" button 923a, a "sort by product" button 923b, a "sort by 3-D" button 923c and a "sort by price" button 923d. Upon clicking on one of the buttons 923, the flow diagram 880 moves from one of the steps 886a-d to step 888 wherein subordinate categories are selected. Illustratively, the buyer may click on the "sort by product" button 923b whereby a further search is conducted to locate the office products as indicated at area 921b. A second search may be made of the previously identified products to find which of these products are office products, and the office products are now displayed within the display area 924. The search may continue in this fashion by actuating various of the keys 923 whereby the number of identified products is successively refined and reduced. When the number of promotional products is reduced to a sufficiently refined number and/or the buyer finds the product and/or service of interest, the buyer clicks onto one of the selected products as appear in the space 924.

Figure 12D:
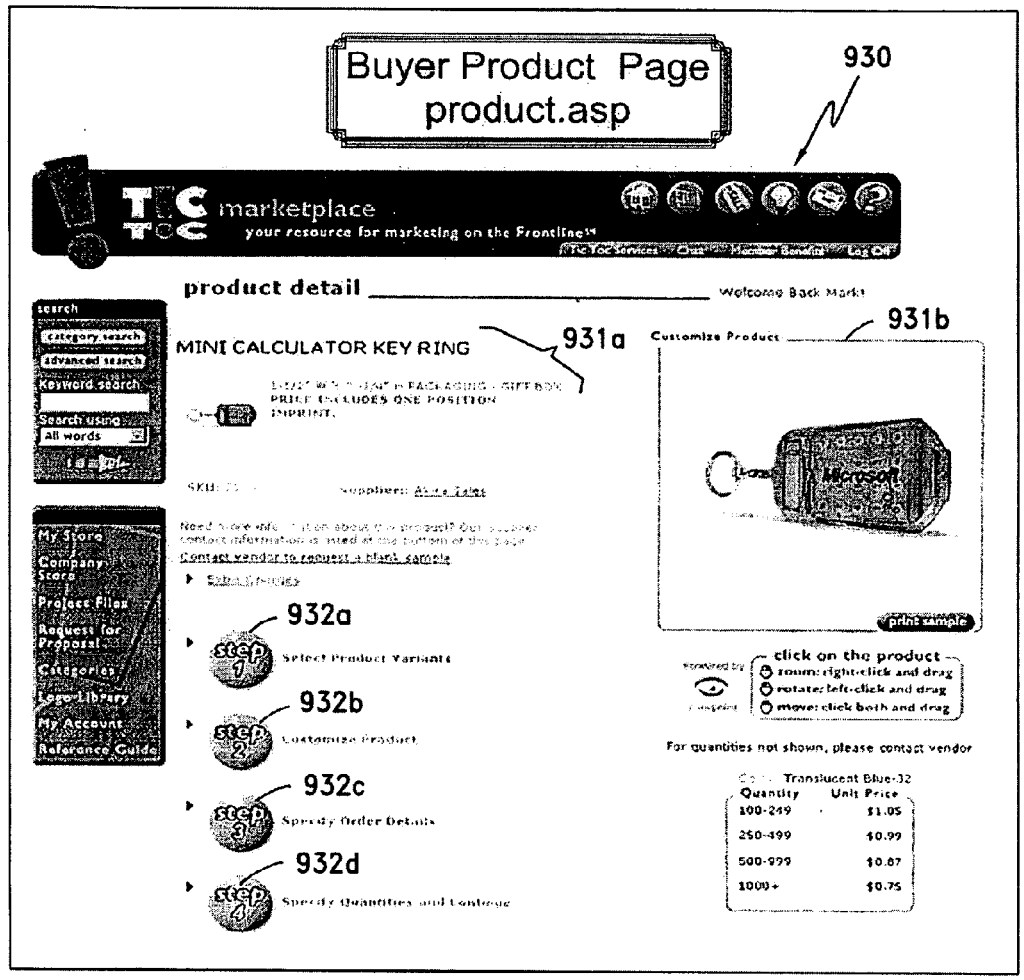

Upon clicking upon the desired product and/or service, a "product detailed" web page 930 is displayed as shown in FIG. 12D upon the buyer's terminal 16. In this illustrative embodiment, the buyer has selected a "mini calculator key ring" which appears in a display space 931a. The space 931a provides a relatively small thumbnail image of the key ring, as well as it's SKU number, the name of the supplier and a brief written description. Further, the web page 930 includes a window 931b in which a relatively large image of the key ring is displayed with a marking, e.g., the trademark Microsoft, superimposed thereon. Further, the web page 930 includes four buttons 932a-d, which operate in a manner similar to that explained above with respect to the buttons 244b-e as shown in FIG. 3D. Briefly, the buyer may actuate the button 932a to select the various product variants of the key ring, e.g., color. The buyer may click on the button 932b to effect customizing of the key ring as by the addition or superimposing of the marking "Microsoft" as shown in the screen 931b, the button 932c to add specific order details and, finally, the button 932d to specify the quantities of the key ring to be ordered and to formulate a detailed order for the key rings.

Figure 13:
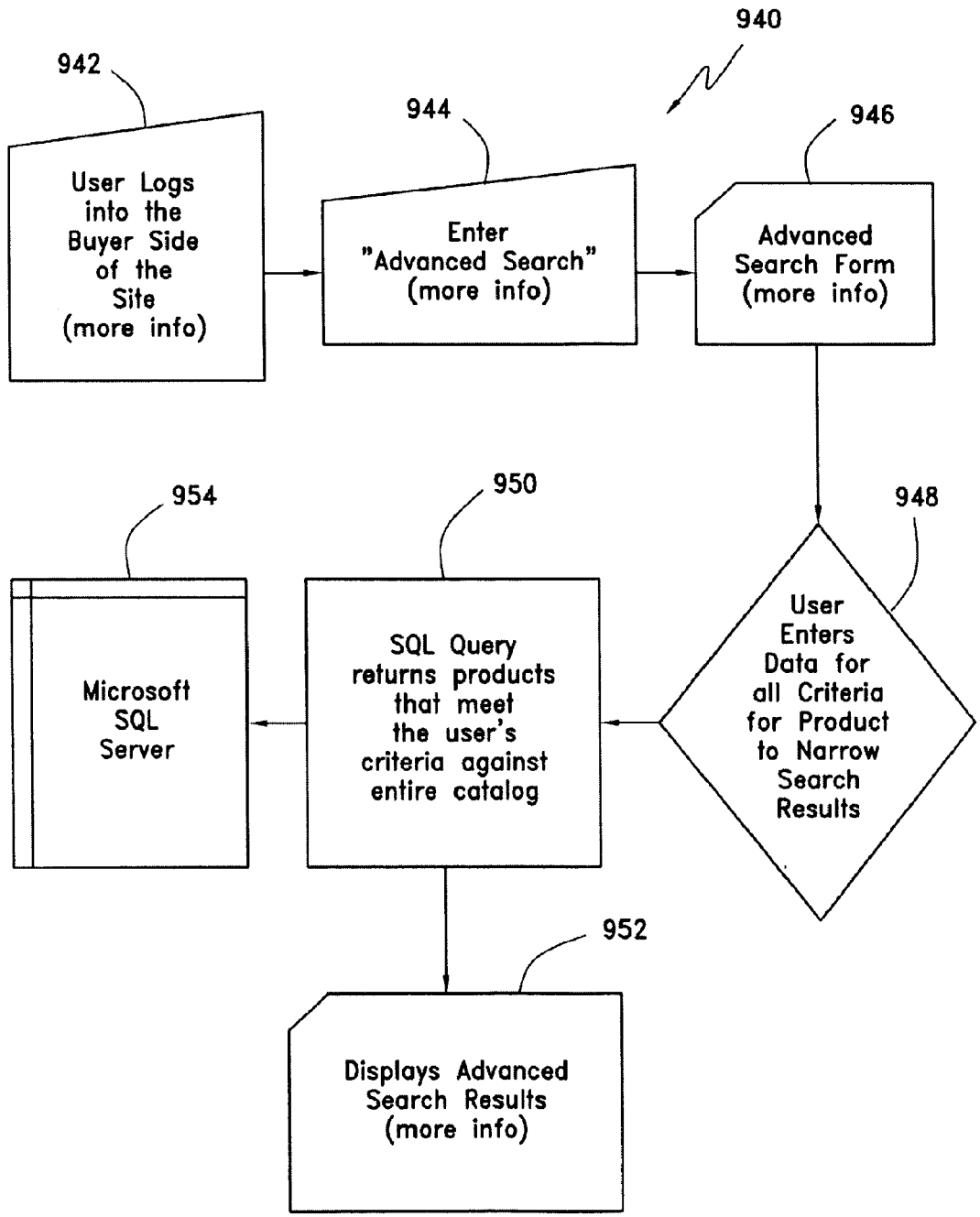
FIG. 13 is a flow diagram that illustrates how a buyer can carry out an advance search of the items stored in the data warehouse.
Figure 14A:
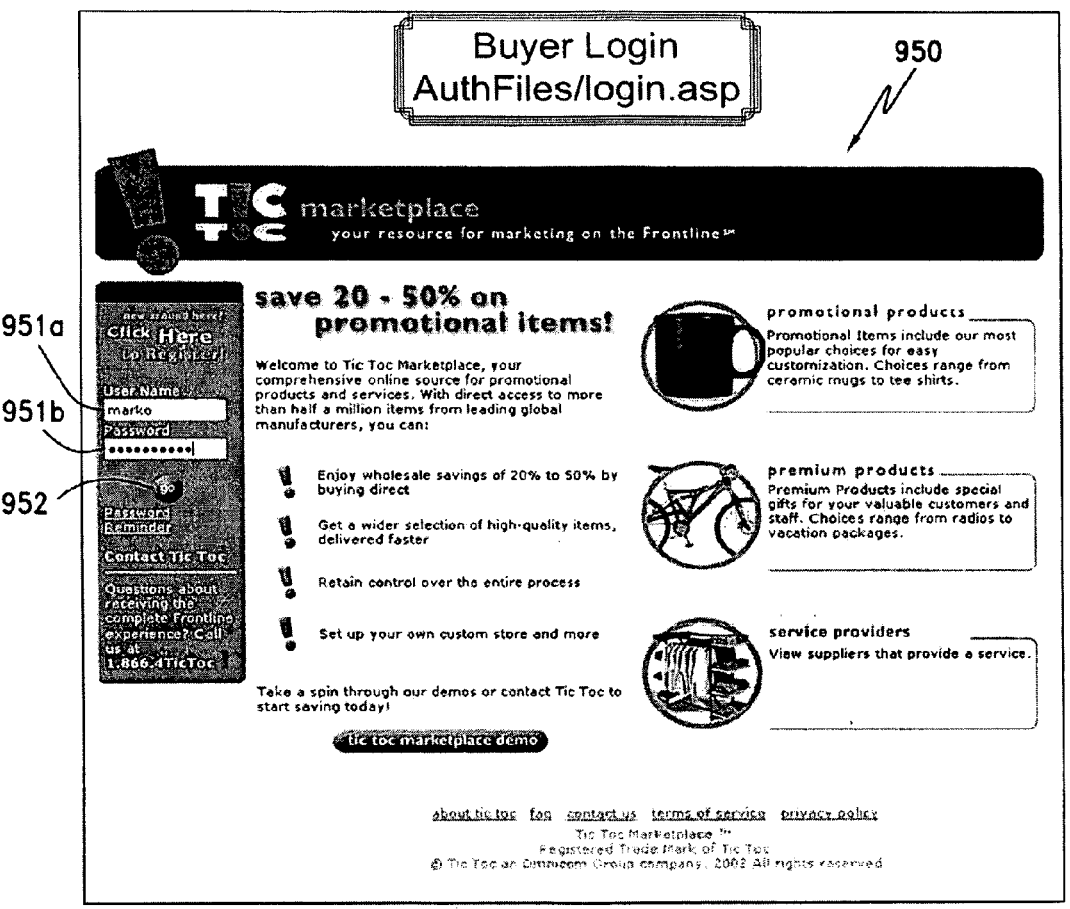
Figure 14B:
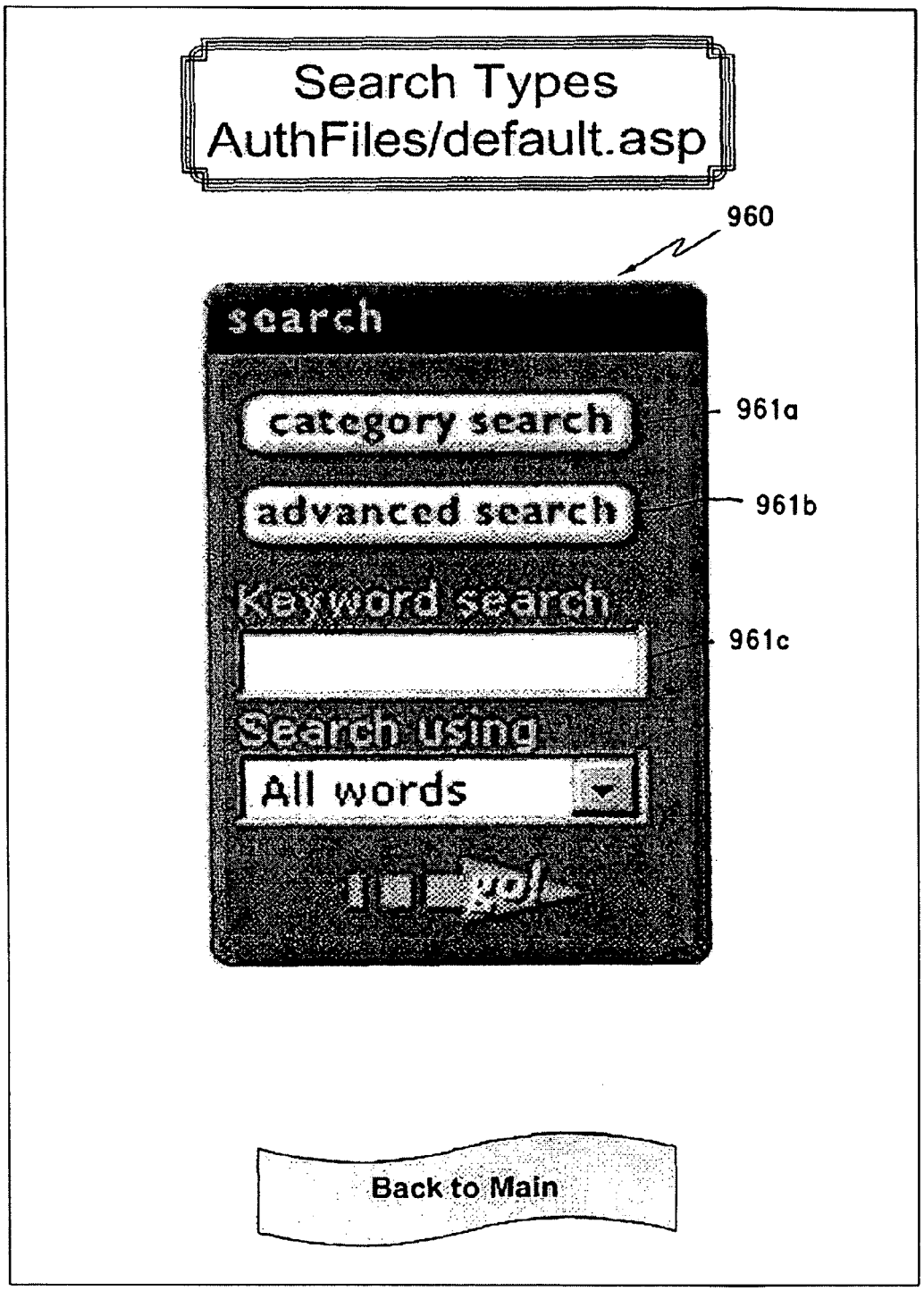
Figure 14C:
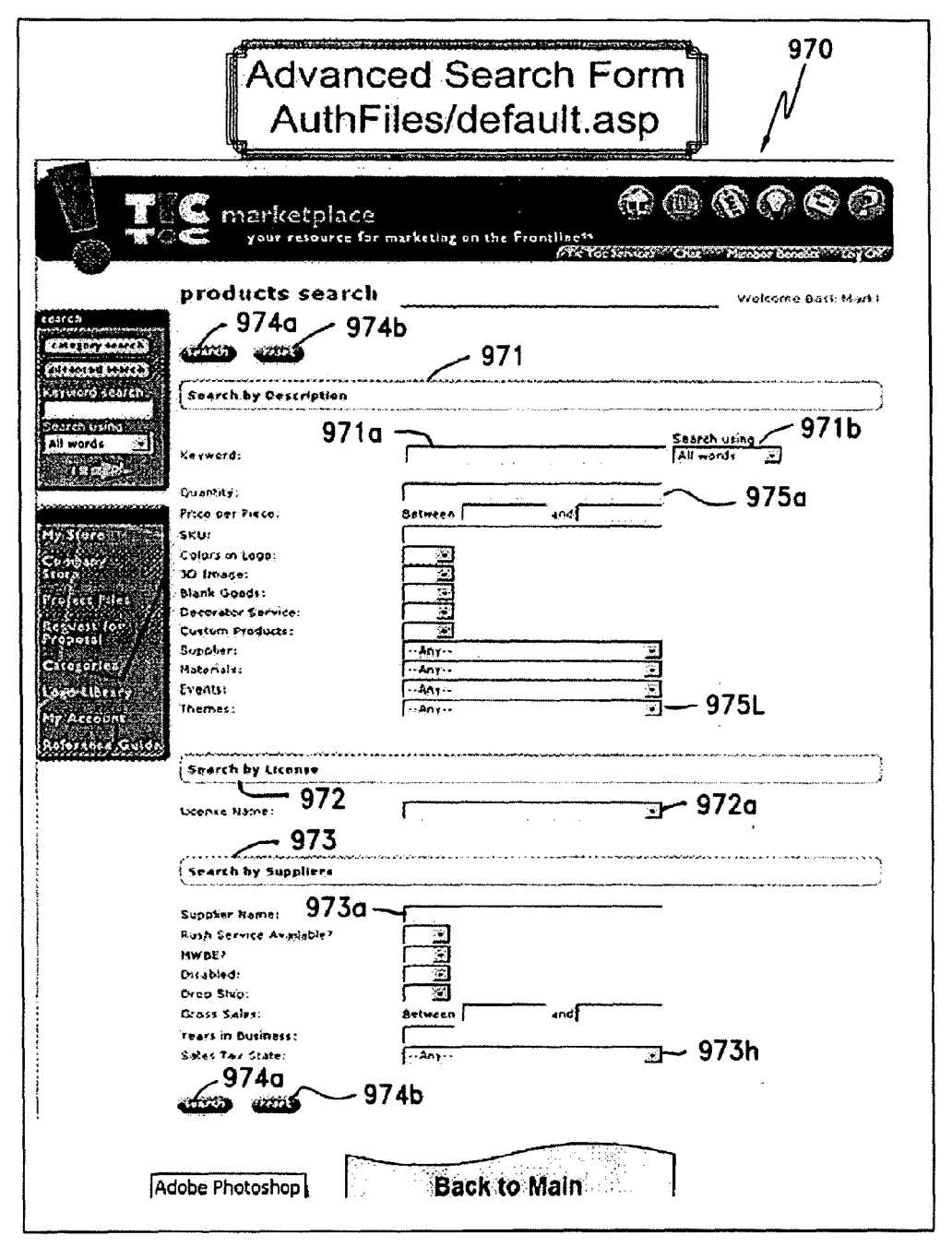

If the buyer would need to conduct an advanced search, he/she will log into the advanced search process, which is shown as a flow diagram 940 in FIG. 13. Initially, the user logs into the E-Commerce System 10 and, in particular, to the buyer site 22a (FIG. 1) by inserting it's user name and passwords into the boxes 951a and b respectively, before clicking onto a "go" button 952, whereby the flow diagram 940 moves from step 942 to step 944. Step 944 displays a vendor home web page, which as shown in FIG. 14B displays a search screen 960 (a part of the home page) that includes a plurality of search buttons 961a-d. When the user clicks onto the "advanced search" button 961b, the flow diagram 940 advances from step 944 to step 946, wherein an "advanced search form" web page 970 is displayed as shown in FIG. 14C in step 946 upon the vendor's terminal 16. The web page 970 is divided into three parts, each facilitating a different kind of search, whereby the buyer may pick one or more of the search types to be conducted. In particular, there is a search by written description as identified by the numeral 971. The buyer may insert into a box 971 various key words that are descriptive of the desired product and/or service. Further, various types of searches may be selected by scrolling through the descriptors presented in a box 971b. The web page 970, further includes a section 972 to permit a search by license, whereby a particular name of the license may be entered to identify the product. In particular, the buyer can scroll through the various licensed products and select a desired licensed product.

Further, the buyer may be able to search by a particular supplier. In one illustrative embodiment, the buyer may insert in box 973a the name of a particular supplier whose goods and/or services are desired. Alternatively, a particular supplier may be identified by the types of service provided by that supplier and a particular service may be entered into selected of the boxes 973b to h. The buyer may also select a supplier who had rush service in box 973b or a supplier that was minority owned in step 973c. Upon completion of making the various entries on the advanced search form web page 970, the buyer clicks on a "search" button 974a, whereby the flow diagram 940 of FIG. 13 may move from step 948 to 950.

Figure 14D:
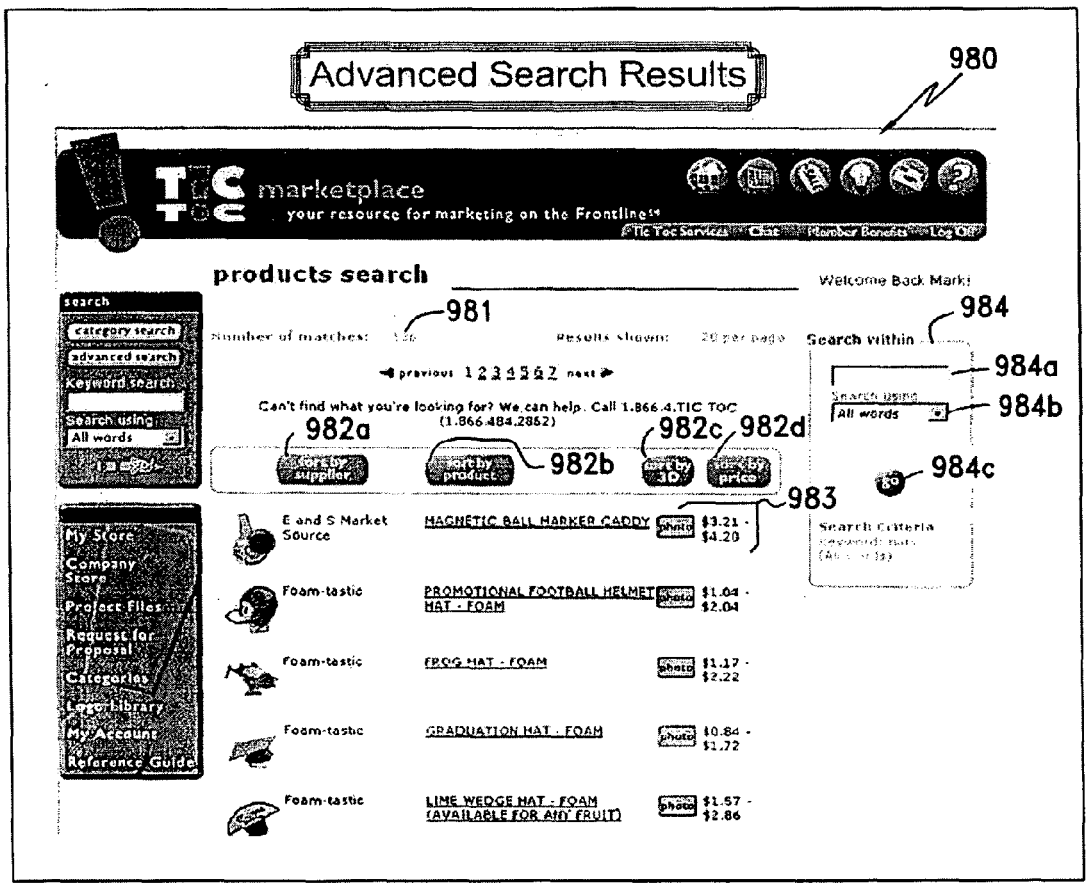

Upon clicking upon the button 974a, a search of the data warehouse 36 is made to find all of those products and/or services which meet the entered criteria. Then step 950 generates an "advanced search results" web page 980, which is displayed as shown in FIG. 14D on the buyer's terminal 16. The initial number of matches or hits is indicated in display space 981. To reduce the number of matches and to refine the search, the user may click on one of a "sort by supplier" button 982, a "sort by product" button 982b, a "sort by 3-D" button 982c and a "sort by price" button 982. The search may be repeated any number of times, each rerun being more refined than the last. The web page 980 further includes a product and/or service display area 983, wherein the products identified in the course of the search are displayed. The search criteria may be further refined in window 984, which includes a pair of boxes 984a for receiving further key words and a box 984b which may be scrolled by the buyer to select further key words. When the buyer finds a product or service as shown in the display space 983 that he/she wishes to find further information about, the buyer clicks on the particular item as displayed in the space 983, whereby the flow diagram 940 moves from step 950 to step 952, whereby a web page (not shown)

may be generated to provide more information about the selected product and/or service. When a particular product and/or service has been selected in step 950, the data identifying and/or related to that product or service is downloaded by the SQL database server 34 into the data warehouse 36 in step 954.

Figure 15:
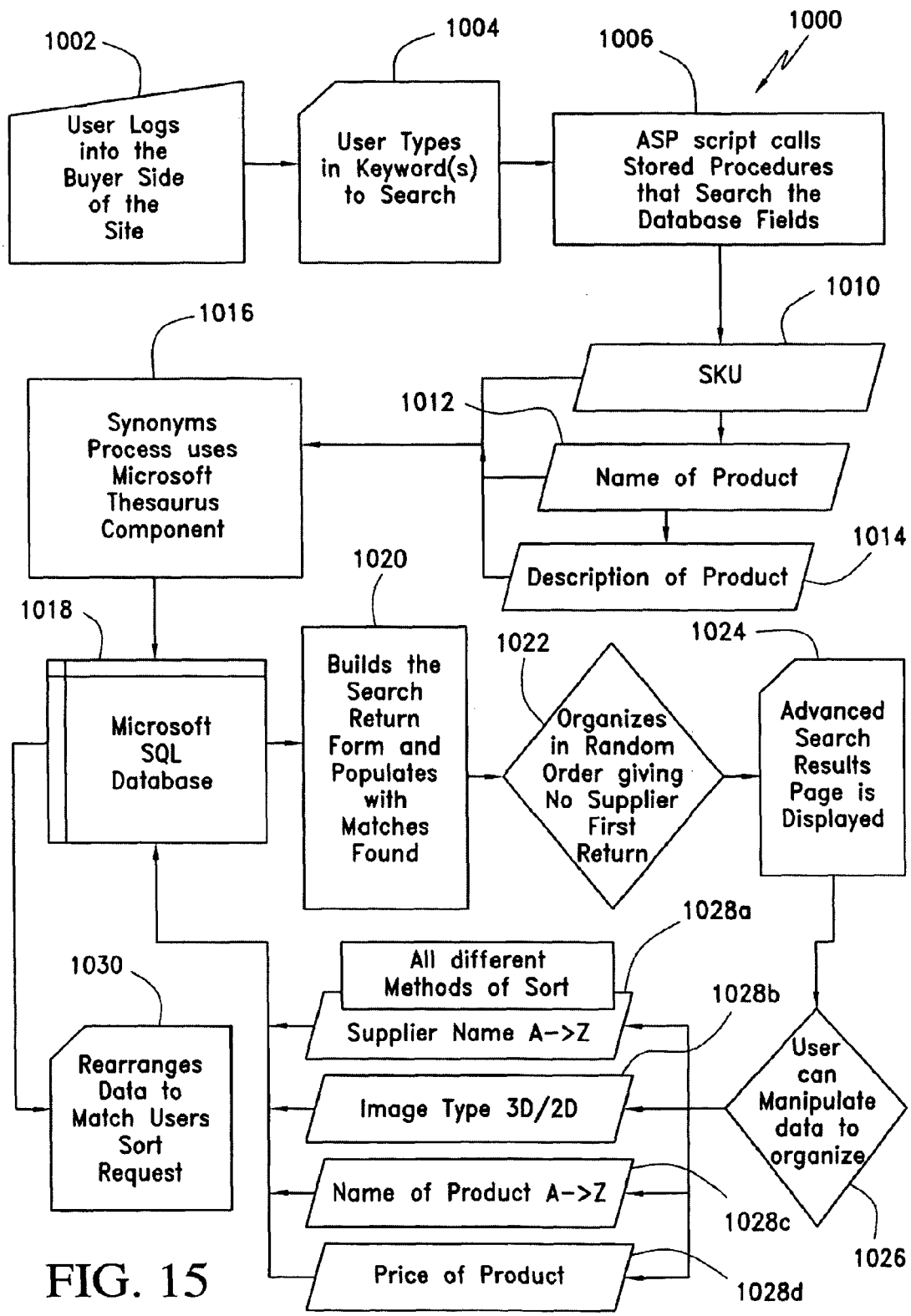
FIG. 15 is a flow diagram that illustrates how a buyer conducts a keyword search of the items stored in the data warehouse.
Figure 16A:
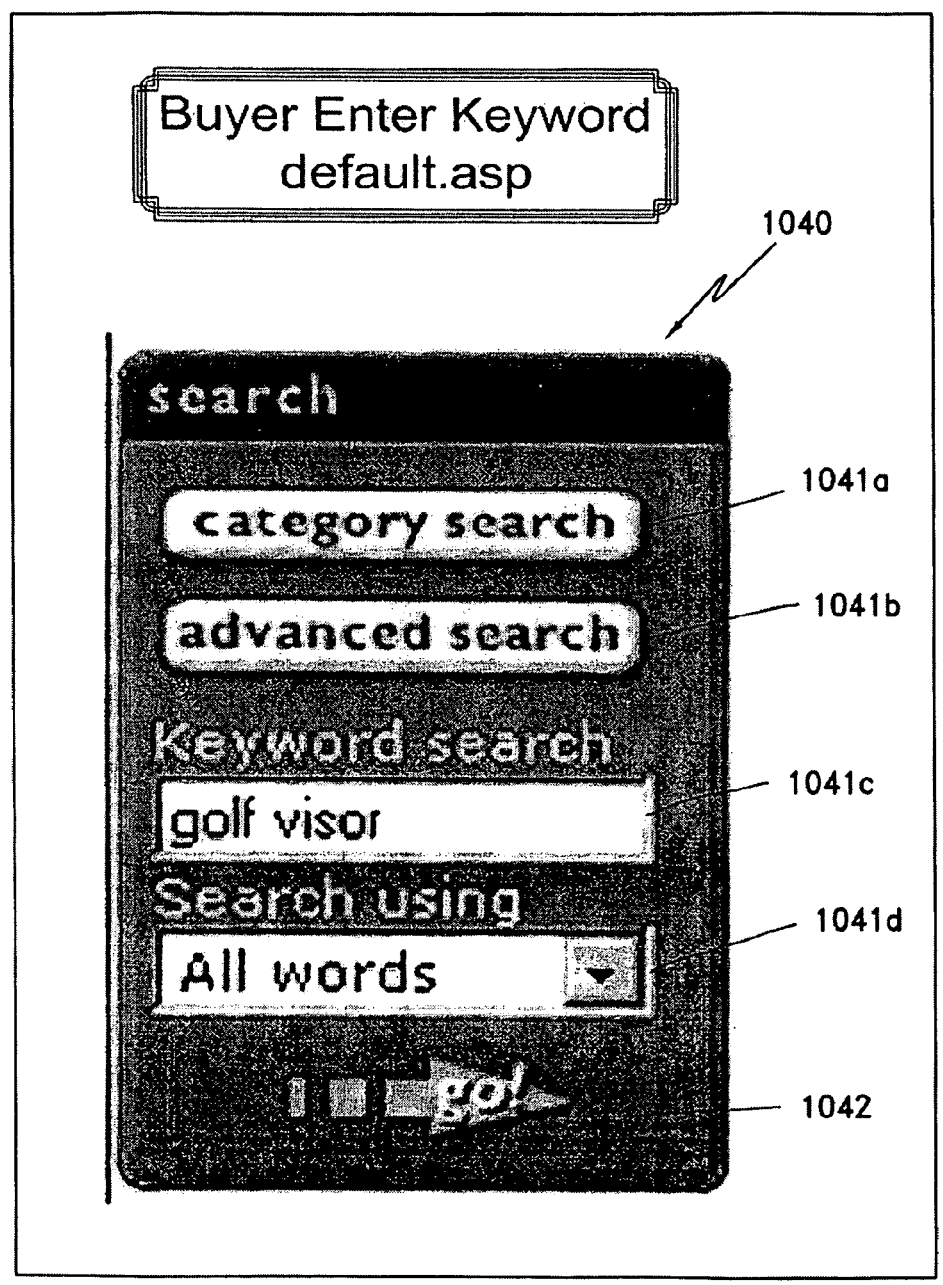
FIGS. 16A-16D are screens generated by the E-Commerce system of FIG. 1 and are used by the process shown in FIG. 15 to conduct a keyword search of the items.

Referring now to FIG. 15, there is shown the process of conducting a buyer's keyword search, which is illustrated by a flow diagram 1000. The buyer enters in step 1002 it's user name and password into respective boxes of a "buyer login authorization" web page (similar to that described with respect to FIG. 5). If there is a match between the entered buyer's name and password with those previously stored in the data warehouse 36, this buyer is then granted access to the E-Commerce system 10. The "login authorization" web page also includes a "go" button, which if actuated by the buyer causes the flow diagram 1000 to move from step 1002 to step 1004, wherein a "buyer enter keyword" search screen 1040 is displayed as shown in FIG. 16A upon the buyer's terminal 16. The "buyer enter keyword" screen 1040 includes boxes 1041c and d, into which the buyer may enter respectively keywords and may control the scope of the keyword search by clicking on an arrow associated with the box 1041d. Further, the screen 1040 includes a "go" button 1042. After entering the keyword(s) and adjusting the search, the buyer clicks on the "go" button 1042, whereby the flow diagram 1000 moves from step 1004 to step 1006. In step 1006, the commerce server filter 24 (FIG. 1) uses the ASP pages to formulate a search of the data warehouse 36 based upon the keywords and the search scope input by the buyer. In particular, the search uses the SKU identifications as shown in step 1010, a name of the product as shown in step 1012 and a written description of the product as shown in step 1014 to identify those products and/or services that satisfy the buyer's input. After developing the search scope based on these inputs, the flow diagram 1000 moves to step 1016, wherein synonyms for the entered keywords are processed to enhance the scope of the search. In one illustrative embodiment of this invention, step 1016 is implemented by the Thesaurus Component Software of Microsoft. Next the flow diagram 1000 moves to step 1018, wherein a search of the data warehouse 36 is made to locate the various products and/or services which match the inputted and processed search criteria.

Figure 16B:
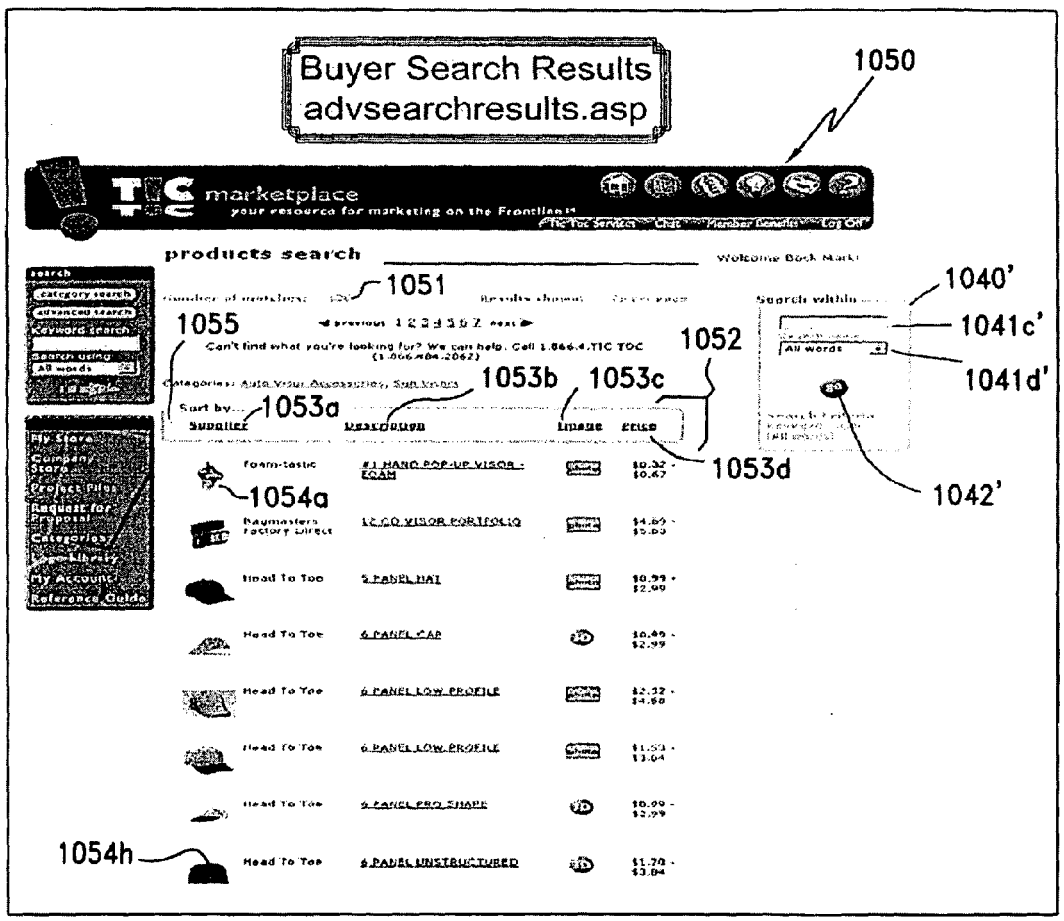

Next in step 1020, data reflecting the matches between the products and/or services and the search criteria is organized to be displayed on a "buyer search results" web page 1050 as will be explained in detail below with respect to FIG. 16B. Next in step 1022, the product (and/or service) data is randomized so that one supplier will not be favored as how it's products will be displayed to the buyers. Next in step 1024, a "buyer search results" web page 1050 is displayed as shown in FIG. 16B on the buyer's terminal 16. In particular, the web page 1050 includes a space 1052 wherein a particular set of products 1040a to 1054h as identified by the keyword search are displayed. Each product is presented as a thumbnail image in column 1055, the name of it's supplier in column 1053a, a short written description of the product in column 1053b, the type of image in column 1053c and the price of the product in column 1053d. As indicated above, step 1022 presents the displayed products in a random order so as to not favor any particular supplier, e.g., those suppliers whose names starts with the letter toward the front (or back) of the alphabet. If further searching is required, the buyer can enter additional keywords without leaving the web page 1050, in the box 1041c' or to change the nature of the search in box 1041d', before again hitting a "go" button 1042'.

Figure 16C:
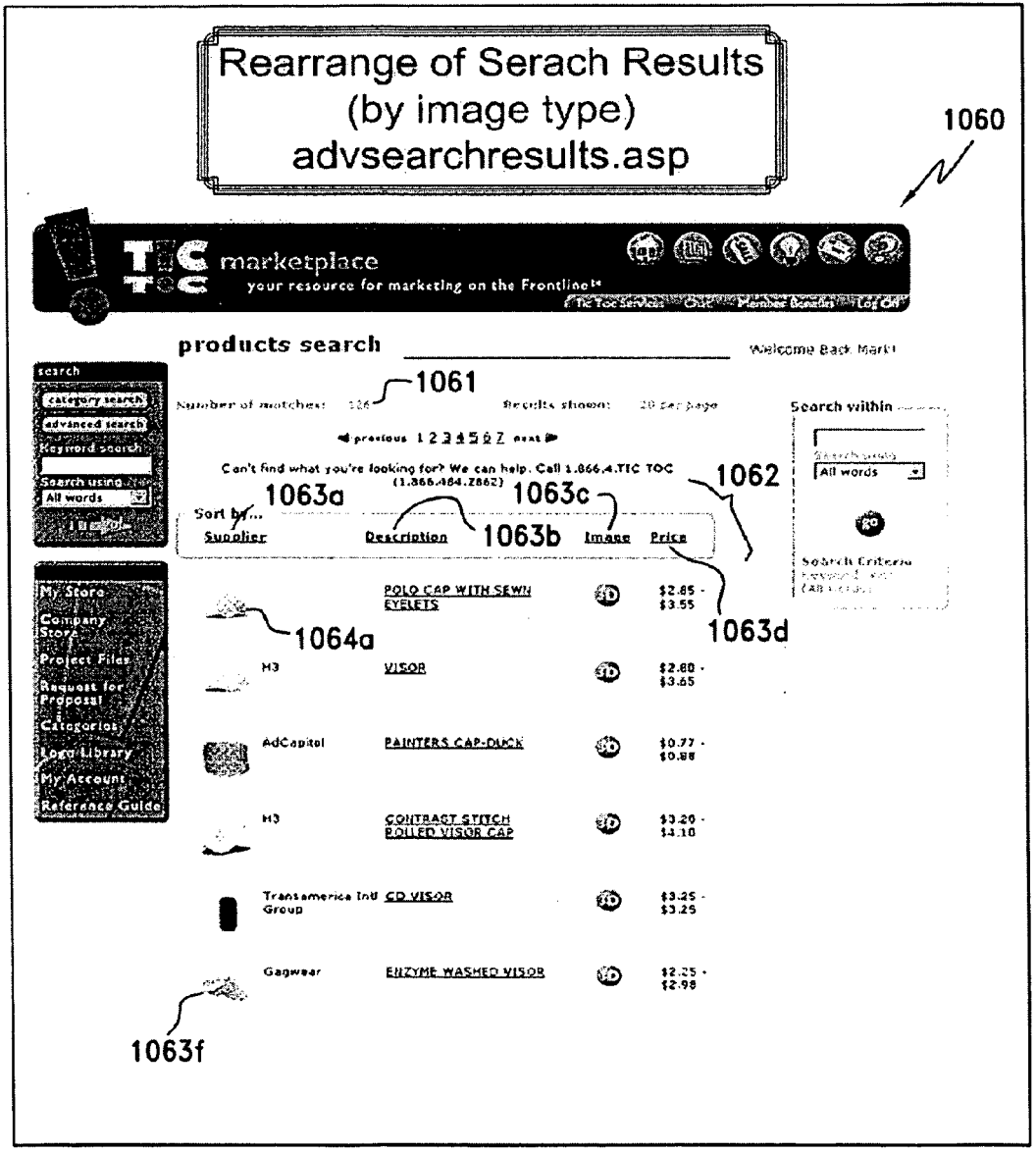
Figure 16D:
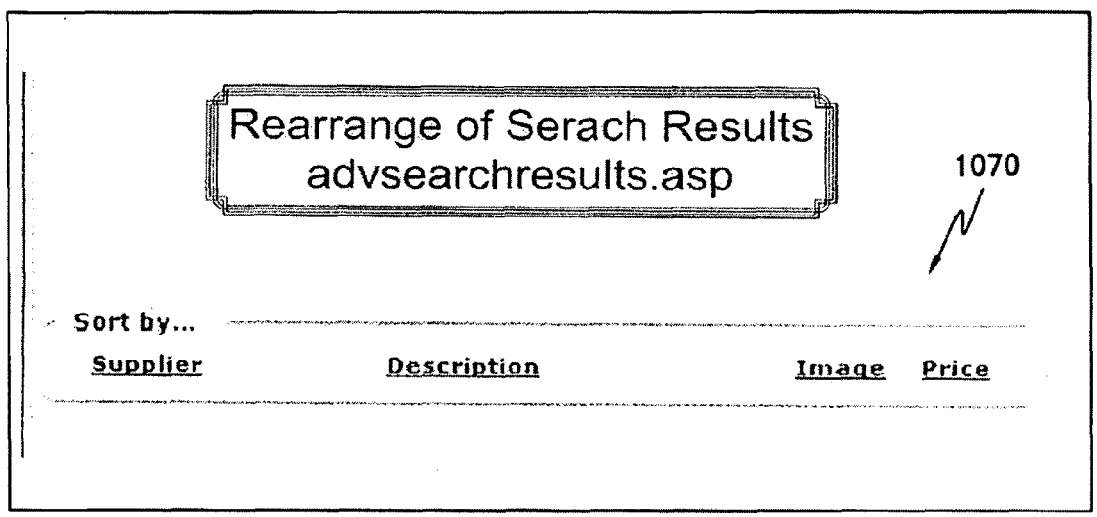

Further as shown in FIG. 15, the flow diagram 1000 moves to step 1026, wherein the buyer can select a different way of rearranging and/or sorting the order in which the products are displayed. In an illustrative embodiment of this invention, the buyer can select a further name or names of a supplier in step 1028a, may select products that are displayed in 2D or 3D, may reorganize the products by placing them in alphabetical order by name, and reordering the presentation of the products by their price. The data representing the rearranged products and/or services is again used to search the data warehouse 36 and the matching products and/or services are rearranged to step 1030, wherein a "rearrange of search results" web page 1060 is displayed as shown in FIG. 16C on the buyer's terminal 16. As a comparison of FIGS. 16B and C will indicate, the product data is displayed in a fashion that 3D images are given preference. It is understood, as explained above, that the order of the products may be by price, alphabetized by name, or alphabetized by the name of their supplier.

Figure 17A:
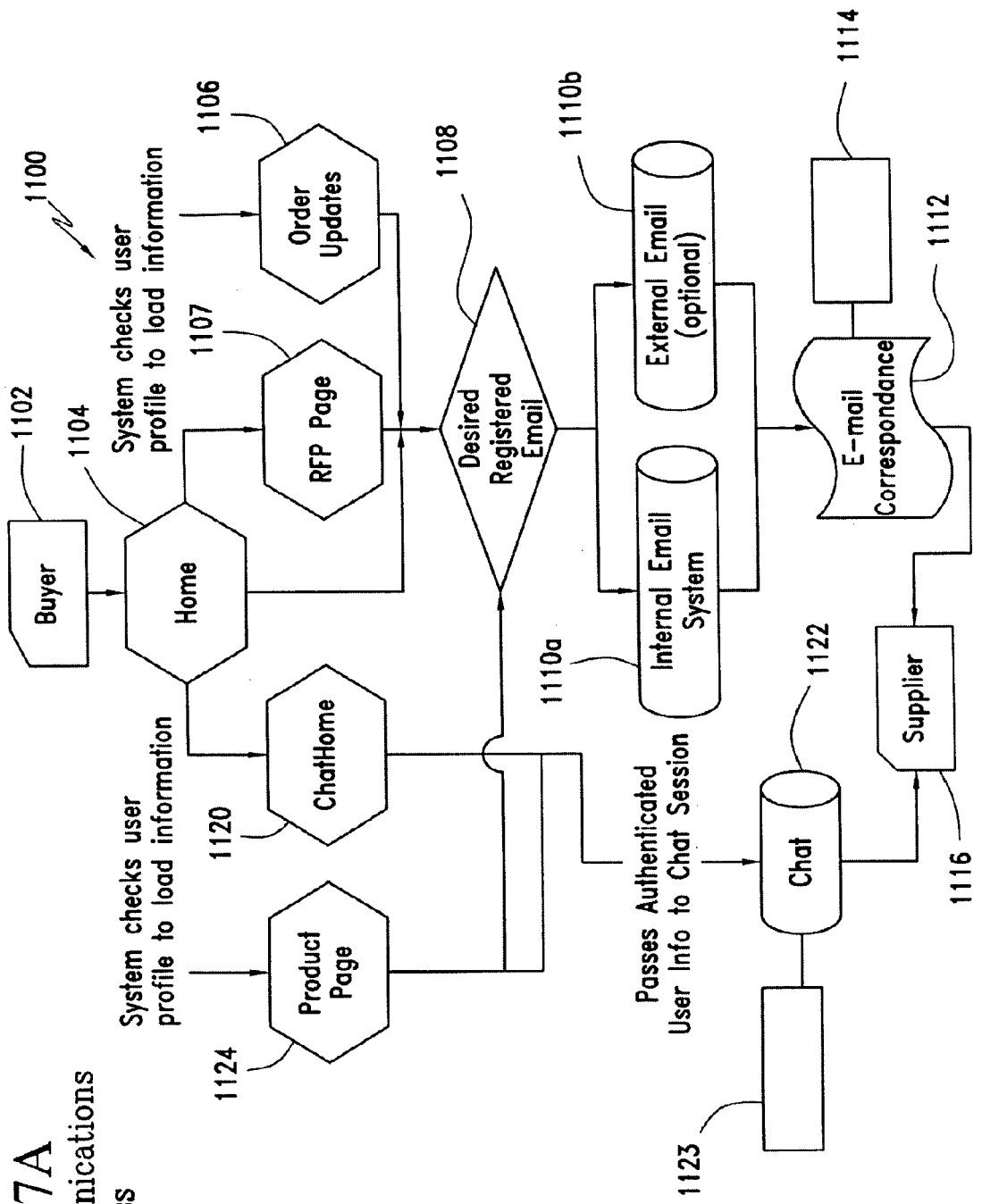
FIG. 17A is a flow diagram that illustrates a process for the buyer to variously communicate with a selected supplier.

Referring now to FIG. 17A, there is shown a detailed flow diagram 1100 for permitting a buyer from his/her terminal 16 to communicate with the E-commerce system 10 (FIG. 1). In step 1102, the buyer logs in to the home page 1104 (see web page 200 of FIG. 3A) by inserting therein its user name and password, as explained above. In particular, the buyer clicks onto one of the buttons (not shown) on the home page 1104 which corresponds to each of an order updates page 1106, a Request for Proposal (RFP) page 1107, a chat home page 1120 and a product page 1124. Upon clicking onto the button that corresponds to the order updates page 1106, the process 1100 moves to the step, wherein a search of the data warehouse 36 (FIG. 1) for all of the supplier responses that were made to the orders of the logged-in buyer that had been previously stored in the data warehouse 36. As explained above, each buyer (who has logged-in to the system 10) may place an order for a certain item, whether a product and/or a service. The buyer's order includes the unique ID of the buyer that placed the order. In turn, the supplier receiving this buyer's order formulates and transmits a response bearing the buyer's ID and an indication of whether the supplier accepts the buyer's order or provides a counter offer by modifying the provisions of the buyer's order. The supplier's response is stored in the data warehouse 36 and an email is automatically sent to the originating buyer to prompt this buyer to access the system 10 and bring up the order updates page 1106 as described above. In particular, the buyer side 22a of the internet information server 20 searches the data warehouse 36 for all of the supplier responses bearing the buyer's ID and constructs a list of the identified suppliers' responses to be displayed on the order updates page 1106. Next, the buyer selects by clicking on one of the listed supplier response displayed on the order updates page, whereby the buyer may review the selected supplier response on its terminal 16 (FIG. 1) and send a return message, e.g. by email, to the supplier providing the selected response. Next in step 1108, a system decision is made as to whether to transmit the buyer's email by an internal Email system 110a, i.e., an email system of the E-commerce system 10, or by an external Email system, i.e., an email system of the supplier sending the response. The supplier may have its own email system that has been adapted to process buyers' responses for this supplier; in such an embodiment, the suppliers would make an input to the system 10, typically at the time the supplier registers with the E-commerce system 10, where by the system will use the supplier's email system 110b. Next in step 1112, the buyer's email is sent to the corresponding supplier and, in step 1114, this Email message is stored in a section of the data warehouse 36 dedicated to the buyer that sent the Email. In step 1116, the supplier receives the buyer's email as will be explained below with respect to FIG. 17B.

Next if the buyer clicks on the RFP button on the home page 1104, the RFP page 1107 is displayed on at the buyer's terminal 16 (FIG. 1). Upon clicking on the RFP button, the buyer side of the server 20 searches the data warehouse 36 for all response by suppliers to the RFP placed by the buyer and constructs a list of all of the supplier responses on the RFP page 1107. The buyer then selects a supplier response to review and clicks on that response as listed on the page 1107, whereby that supplier response is displayed on the buyer's terminal 16. After reviewing that response, the buyer sends its response in the form of an email. The buyer's email may be transmitted by the email system 1110*a* of the E-commerce system 10 or the supplier's email system 1110*b*, as determined in step 1108, in a manner similar to that described above. In step 1112, the email is sent to the supplier responding to the buyer's RFP and the buyer's Email response is stored in step 1114 in the data warehouse 36. Finally the buyer's Email message is received and reviewed by the supplier in step 1116.

Next if the buyer would like to directly communicate with a particular supplier, the buyer may click on the chat button appearing on the home page 1104, whereby the E-commerce system 10 pulls up and displays a list of the suppliers that are currently in their chat rooms and are currently available to communicate with. To implement such a display, the supplier can store an indication in the data warehouse 36, that it is available to chat, whereby each available supplier may be identified and a list thereof may be displayed on a buyer's terminal 16. If the buyer finds a supplier with which he/she wants to communicate, the buyer clicks on that buyer and a chat is carried our in step 1122. In an illustrative embodiment of this invention, the messages sent by the buyer and supplier in the course of the chat may be stored in step 1123 in the data warehouse 36.

If the buyer needs further information about a particular item that was identified by the search engine 104 and one of the searches 106*a*, *b* or *c*, the buyer may request the supplier of that product in step 108 to provide more information about that product. If the buyer wants to view that item information, the buyer clicks on the products page button on the home page 1104, whereby the web page bearing further information about the item is displayed on the buyer's terminal 16. The buyer may then take further action by communicating with the supplier 116. For example, the buyer may then send an order to the supplier 1116.

Referring now to FIG. 17B, there is shown a detailed diagram of a vendor communications process 1140, whereby one of the plurality of suppliers may communicate with a selected buyer. Initially in step 1142, a supplier or vendor enters its user name and password into a supplier's home page (see web page 370 in FIG. 4A) and if authenticated as described above, the process 1140 move to step 1144, wherein the supplier gains access to the E-commerce system 10 and, in particular to the supplier side 22*b* of the Internet information server 20 (FIG. 1). Upon authentication of the supplier, a home page (page 340 as shown in FIG. 4B) is displayed on the supplier's terminal 14 (FIG. 1). The supplier's home page includes a button (391*g* of FIG. 4B), which the supplier may click on to draw from the warehouse 36 each of the orders, which were placed by various buyers and for items that were supplied by this supplier. When a buyer places an order for a particular item, the order indicates the supplier of that item and is stored in the data warehouse 36. In turn, all of the orders for items of this supplier are drawn in step 1150 from the data warehouse 36 and a list of all of these orders for this supplier's items, is constructed in step 1148 and displayed on an order page 1146 on this supplier's terminal 14. The supplier reviews the list of orders for the items of this supplier and selects one the orders for review. In step 1152, the supplier decides whether to accept or reject the buyer's order. If the order is rejected, the communication session of the supplier terminates. If the supplier accepts the buyer's order, the supplier prepares a response accepting the order and stores it in the data warehouse 36, and an email is automatically generated and transmitted as described above via one of the email systems of the E-commerce system or the supplier, as controlled by the supplier. In step 1160, the buyer receives the supplier's response that agreement has been reached by the buyer and the supplier, and that the purchase of the items has been completed. The buyer is provided, in one embodiment of this invention, the option to make minor changes, as long as they do effect the final compensation to the buyer. Further, the final emails from the supplier are stored in the data warehouse 252.

Further, the supplier in step 1144 may click a RFP button on the home page, whereby the process 1140 moves to step 1150, wherein each RFP, that designates the items of this supplier and has been stored in the data warehouse 36, is drawn from the data warehouse 36 and a list thereof is constructed and displayed in step 1170 on the RFP page on the supplier's terminal 14 (FIG. 1). Next in step 1172, the supplier selects and reviews each of the RFPs, before deciding whether or not to make any response to the RFP, to accept the RFP or to make in step 1174*a* counter offer to the originating buyer. The buyer receives the supplier's response in step 1168, and if the buyer accepts the supplier's counter offer in step 1166, an email is automatically sent to each of the buyer and the supplier informing them that the terms of RFP have been accepted by both parties. This communication is also stored in the data warehouse 36 in step 1162.

Further, the supplier may in step 144 click onto a chat room button appearing on the supplier home page, whereby the process moves to step 1176, wherein the data warehouse may be searched to identify which of the buyers are currently in the chat room and available to communicate with, and to construct and display a list of the available buyers. Then in step 1178, the supplier may click on a selected one of the listed buyers and start in step 1178*a* session in the chat room with the selected buyer.

Figure 17C:
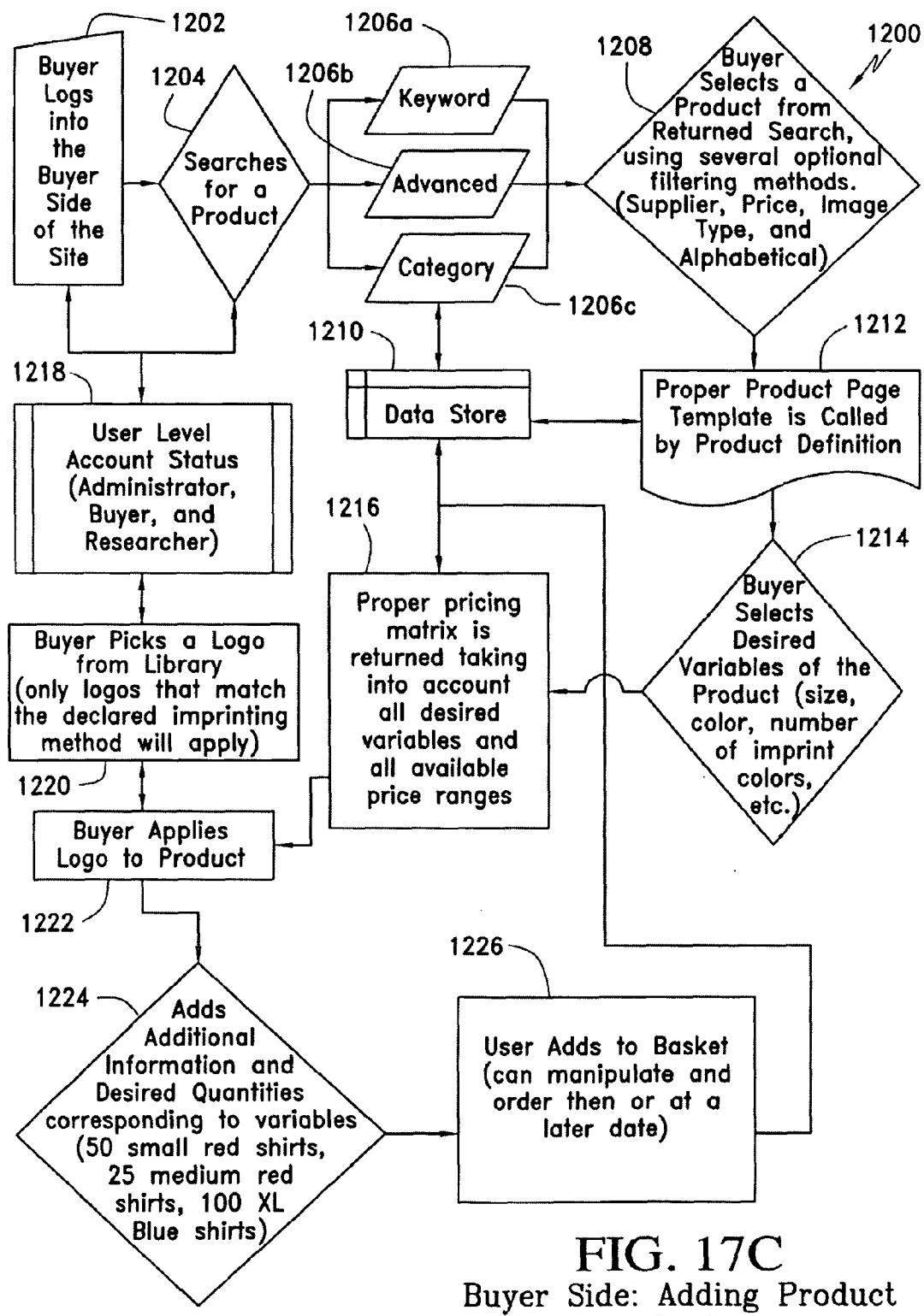
FIG. 17C is a flow diagram that illustrates a process for the buyer to select a particular item and to generate a template for that item including the price matrix associated with the item.

Referring now to FIG. 17C, there is shown a detailed flow diagram of a process 1200 for facilitating a buyer to search the data warehouse 36 for those items that satisfy the buyer's criteria, and to select at least one of the set of items to be purchased. Initially in step 1202, the buyer logs in into the buyer's side 22*a* of the Internet information server 20 by entering its user name and password in to the buyer's home page. Then the buyer initiates a search for the items stored in the data warehouse 36 that match the buyer's criteria. In particular, the buyer may initiate a key word search 1206*a*, an advanced search 1206*b* or a category search 1206*c*, as explained above. The set of items identified by the selected search is filtered to reduce and refine the results of the search by the name of the desired supplier, the price, the image type (2D or 3D) and the alphabetic order. In the following steps, the process 1200 proceeds to construct a web page or screen that displays the item along with information about the item. In step 1212, a template is called according to the definition of that item. Thus, the selected template will have boxes to receive the buyer's values of the variables defined by the definition. For example if the item was a shirt, the variables of this items may include size data, style data and color data. To select a particular item, the buyer would need to enter small, medium or large into the size box, red into the color box and button-down into the style box. Of course, other items would have difference variables and, thus, require their own particular template. Next in step 1214, a page representing the item's particular template is displayed on the buyer's terminal 17, whereby the buyer can enter the desired value into each variable data input box. Next in step 1216, a price matrix corresponding to the item values entered in step 1214 is added to the selected template. As described above with respect to FIG. 5, a plurality of price matrixes were defined by the supplier, one for each different set of variables. and are stored in the data warehouse 36. In particular, step 1216 defines the price matrix for each different set of variable by searching the data warehouse 36 to find the same set variables and then add the corresponding price matrix found in the data warehouse 36 to the matching set of variables.

To complete the screen, a marking such as a logo or trade mark may added to the template for a particular product in an illustrative embodiment of this invention. Next in step 1218, the status of a particular buyer is examined to determine which markings that this buyer is authorized by owner to use. Next in step 1220, the buyer selects from the set of markings that he/she is authorized to use, that marking that is to be combined with or superimposed on the selected item. The image data of the selected marking is then added to the template in step 1222. Next in step 1224, the buyer adds to the template any special instructions that the buyer may want to give to the supplier as to how the item should be made or the marking superimposed thereon. The directions may also include the quantity of the items to be supplied. Finally in step 1226, the user can add the particular item to its basket, whereby the item can order the item at this time or later.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, objects, and solutions to problems have been described above with regard to specific embodiments. However, the benefits, advantages, solutions to problems, objects, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method of managing sales of a plurality of items from a plurality of suppliers to at least one buyer, the buyer determining descriptions of items to be purchased, the method comprising:
   enabling each of the plurality of suppliers to store at least one respective catalogue of its items in a database; and
   responding to a search request of the buyer by identifying items in each of the catalogues stored in the database corresponding to items of each of the suppliers with descriptions that match the descriptions of the item determined by the buyer.

2. The method of claim 1, wherein responding to the search request includes providing to the buyer, for display to the buyer, a list of all of the items that match the descriptions of the items determined by the buyer.

3. The method of claim 2, wherein responding to the search request includes providing to the buyer, for each of the items in the list, an identity of the respective supplier who is supplying the respective item in the list.

4. The method of claim 2, wherein the catalogues include images of the suppliers' items, the images being a 2D (two dimensional) image or a 3D (three dimensional) image, and the list of all of the items provided to the buyer are provided in an order wherein items having 3D images are provided with display preference over items having 2D images.

5. A method of operating an E-commerce system for marketing of a plurality of items provided variously by a plurality of suppliers to selected ones of a plurality of purchasers, the E-commerce system having a searchable database, a server, a purchaser network, a plurality of purchaser terminals, a supplier network and a plurality of supplier terminals, the server being programmed to transmit data bidirectionally via the supplier network between the database and each of the plurality of supplier terminals, to transmit data bidirectionally via the purchaser network between the database and each of the plurality of purchaser terminals, and to facilitate at least one of a plurality of buyers to purchase items from various ones of the plurality of suppliers, each of the plurality of suppliers having a dictionary of definitions of items, the method comprising:
   constructing orders for selected items by selected ones of the purchasers, each of the orders having a unique ID identifying the respective purchaser;
   transmitting each of the purchaser's orders to a corresponding supplier, who formulates a response to the transmitted order, each supplier response including the unique ID of the respective purchaser and an indication of whether the supplier accepts the purchaser's order or provides a counter offer by modifying the terms of the order;
   receiving the supplier's response from the corresponding supplier's terminal via the supplier's network for storage in the database;
   forwarding a communication to the purchaser identified by the unique ID in the supplier's response;
   accessing the database for all of the supplier responses stored therein and constructing a list of all of the supplier responses for display by the purchaser's terminal;
   enabling the purchaser to select one of the listed supplier responses for display by the purchaser's terminal;
   enabling the purchaser to forward a purchaser response to the respective supplier corresponding to the selected supplier response;
   storing each of the purchasers' responses in the database.

6. The method of claim 5, wherein an order of at least one of the buyers is an RFP (request for proposal), transmitting each of the purchaser's orders comprises transmitting the RFP to each of a plurality of the suppliers, receiving the supplier's response comprising receiving responses from a plurality of the suppliers regarding the RFP for storage in the database, and enabling the purchaser to respond to one of the responses regarding the RFP.

7. The method of claim 2, further comprising constructing a list of orders for items of a particular supplier from a plurality of buyers for display to the particular supplier by a terminal of the particular supplier.

* * * * *